United States Patent
Park et al.

(10) Patent No.: US 12,360,436 B2
(45) Date of Patent: Jul. 15, 2025

(54) LENS DRIVING APPARATUS, AND CAMERA MODULE AND OPTICAL DEVICE COMPRISING SAME

(71) Applicant: LG INNOTEK CO., LTD., Seoul (KR)

(72) Inventors: Sang Ok Park, Seoul (KR); Young Ho Kim, Seoul (KR); Seong Min Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 692 days.

(21) Appl. No.: 17/630,092

(22) PCT Filed: Jul. 29, 2020

(86) PCT No.: PCT/KR2020/009968
§ 371 (c)(1),
(2) Date: Jan. 25, 2022

(87) PCT Pub. No.: WO2021/025361
PCT Pub. Date: Feb. 11, 2021

(65) Prior Publication Data
US 2022/0252961 A1 Aug. 11, 2022

(30) Foreign Application Priority Data

Aug. 2, 2019 (KR) .................. 10-2019-0094183
Sep. 26, 2019 (KR) .................. 10-2019-0119199

(51) Int. Cl.
*G03B 13/36* (2021.01)
*G02B 7/04* (2021.01)
(Continued)

(52) U.S. Cl.
CPC .............. *G03B 13/36* (2013.01); *G02B 7/04* (2013.01); *H02K 11/215* (2016.01); *H02K 41/0354* (2013.01)

(58) Field of Classification Search
CPC .. G03B 13/36; H02K 11/215; H02K 41/0354; G02B 7/04
(Continued)

(56) References Cited

U.S. PATENT DOCUMENTS

2013/0050828 A1* 2/2013 Sato ................. H04N 23/54
359/557
2017/0146813 A1* 5/2017 Park ................. G03B 3/10
(Continued)

FOREIGN PATENT DOCUMENTS

CN 102879973 A 1/2013
CN 109477999 A 3/2019
(Continued)

OTHER PUBLICATIONS

International Search Report dated Nov. 6, 2020 in International Application No. PCT/KR2020/009968.
(Continued)

*Primary Examiner* — Sharrief I Broome
(74) *Attorney, Agent, or Firm* — SALIWANCHIK, LLOYD & EISENSCHENK

(57) ABSTRACT

A lens moving apparatus is provided, including a housing, a bobbin disposed inside the housing, a coil disposed around the bobbin, a magnet disposed in the housing, an elastic member coupled to the housing and the bobbin, and a damper disposed on the elastic member and the housing. The elastic member includes an inner part coupled to the bobbin, an outer part coupled to the housing, and a connection part for coupling the inner part and the outer part. The connection part is disposed on first to fourth quadrants of a plane having a first axis and a second axis, and is symmetrical with reference to the first axis. The plane includes first and second sides facing each other in a direction in parallel to the first (Continued)

axis and third and fourth sides facing each other in a direction in parallel to the second axis.

19 Claims, 32 Drawing Sheets

(51) Int. Cl.
*H02K 11/215* (2016.01)
*H02K 41/035* (2006.01)

(58) Field of Classification Search
USPC .......................................................... 359/824
See application file for complete search history.

(56) References Cited

U.S. PATENT DOCUMENTS

| | | | |
|---|---|---|---|
| 2019/0041602 A1* | 2/2019 | Lee | .......................... G02B 7/02 |
| 2021/0294067 A1* | 9/2021 | Park | ..................... H02K 41/035 |

FOREIGN PATENT DOCUMENTS

| | | | | |
|---|---|---|---|---|
| EP | 3489749 A1 | * | 5/2019 | ........... G02B 27/646 |
| KR | 10-2011-0088402 A | | 8/2011 | |
| KR | 10-2015-0128263 A | | 11/2015 | |
| KR | 10-2016-0012435 A | | 2/2016 | |
| KR | 10-2016-0045382 A | | 4/2016 | |
| KR | 10-2017-0126165 A | | 11/2017 | |
| KR | 10-2018-0000964 A | | 1/2018 | |
| KR | 10-2018-0010472 A | | 1/2018 | |
| KR | 10-2018-0013286 A | | 2/2018 | |
| KR | 10-2018-0113024 A | | 10/2018 | |
| KR | 10-2018-0116965 A | | 10/2018 | |

OTHER PUBLICATIONS

Supplementary European Search Report dated Aug. 2, 2023 in European Application No. 20849284.3.
Office Action dated Aug. 12, 2023 in Chinese Application No. 202080054639.1.
Office Action dated May 29, 2024 in Chinese Application No. 202080054639.1.

* cited by examiner

LENS DRIVING APPARATUS, AND CAMERA MODULE AND OPTICAL DEVICE COMPRISING SAME

CROSS-REFERENCE TO RELATED APPLICATIONS

This application is the U.S. national stage application of International Patent Application No. PCT/KR2020/009968, filed Jul. 29, 2020 which claims the benefit under 35 U.S.C. § 119 of Korean Application Nos. 10-2019-0094153, filed Aug. 2, 2019; and 10-2019-0119199, filed Sep. 26, 2019; the disclosures of each of which are incorporated herein by reference in their entirety.

TECHNICAL FIELD

Embodiments relate to a lens moving apparatus and a camera module and an optical device each including the same.

BACKGROUND ART

It is difficult to apply technology of a voice coil motor (VCM) used in existing general camera modules to a sub-miniature, low-power camera module, and therefore research related thereto has been actively conducted.

Demand for and production of electronic products, such as smartphones and mobile phones equipped with cameras have increased. Cameras for mobile phones are trending toward increased resolution and miniaturization. As a result, an actuator has also been miniaturized, increased in diameter, and been made multifunctional. In order to realize a high-resolution camera for mobile phones, improvement in performance of the camera for mobile phones and additional functions thereof, such as autofocusing, handshake correction, and zooming, are required.

DISCLOSURE

Technical Problem

Embodiments provide a lens moving apparatus and a camera module and an optical device each including the same, which are capable of suppressing or inhibiting oscillations of an AF operation unit during AF operation.

Furthermore, embodiments provide a lens moving apparatus including a closed loop auto focus module (CLAF) which is minimized in height in an optical-axis direction, and a camera module and an optical device each including the same.

Technical Solution

A lens moving apparatus according to an embodiment includes a housing, a bobbin disposed inside the housing, a coil disposed on the bobbin, a magnet disposed on the housing, an elastic member coupled both to the housing and to the bobbin, and a damper disposed both at the elastic member and at the housing, wherein the elastic member includes an inner portion coupled to the bobbin, an outer portion coupled to the housing, and a connector connecting the inner portion to the outer portion, wherein the connector is disposed in first to fourth quadrants of a plane defined by a first axis and a second axis and is symmetrical based on the first axis, wherein the damper is disposed on the connector, wherein the plane includes first and second sides, which face each other in a direction parallel to the first axis, and third and fourth sides, which face each other in a direction parallel to the second axis, wherein the damper is disposed closer to the third and fourth sides than to the first and second sides, and wherein the first axis is perpendicular to an optical axis and extends through a center of the elastic member, the second axis is parallel to the first axis and extends through the center of the elastic member, and the center of the elastic member is a spatial center thereof when viewed from above.

The connector may be symmetrical based on the first axis.

The damper may be symmetrical based on the first axis.

The housing may include a protrusion corresponding to the connector, and the damper may be disposed both at the protrusion and at the connector.

The housing may have an escape groove configured to avoid spatial interference with the connector, at least a portion of the connector may be disposed in the escape groove, and the protrusion may be disposed on the bottom surface of the escape groove.

The connector may include a plurality of frame connectors, which are spaced apart from each other, the damper may include a plurality of dampers, which are disposed on the plurality of frame connectors, and the housing may include protrusions corresponding to the plurality of frame connectors.

The plurality of frame connectors and the plurality of dampers may be symmetrical based on the first axis.

The protrusions of the housing may be symmetrical based on the first axis.

The plurality of frame connectors and the plurality of dampers may not be rotationally symmetrical based on the center of the elastic member.

The plurality of frame connectors and the plurality of dampers may be symmetrical based on the second axis, and the second axis may be perpendicular both to the optical axis and to the first axis, and may extend through the center of the elastic member.

The plurality of frame connectors and the plurality of dampers may not be symmetrical based on the second axis, and the second axis may be perpendicular both to the optical axis and to the first axis, and may extend through the center of the elastic member.

The lens moving apparatus may include a sensing magnet disposed on the bobbin, and a position sensor, which is disposed on the housing so as to correspond to the sensing magnet, and the sensing magnet and the position sensor may be disposed so as to be aligned with or correspond to the first axis.

The first axis may be an axis parallel to a direction toward a second side portion from a first side portion of the housing.

A lens moving apparatus according to another embodiment includes a housing, a bobbin disposed inside the housing, a coil disposed on the bobbin, a magnet disposed on the housing, an elastic member coupled both to the housing and to the bobbin, and a damper disposed both at the elastic member and at the housing, wherein the elastic member includes an inner portion coupled to the bobbin, an outer portion coupled to the housing, and a connector connecting the inner portion to the outer portion, wherein the connector is symmetrical relative to a first axis, which is perpendicular to the optical axis and extends through the center of the elastic member, wherein a second axis is parallel to the first axis and extends through the center of the elastic member, and wherein the center of the elastic member is a spatial center of the elastic member when viewed from above.

A lens moving apparatus according to a further embodiment includes a housing, a bobbin disposed inside the housing, a coil disposed on the bobbin, a magnet disposed on the housing, an elastic member coupled both to the housing and to the bobbin, and a damper disposed both at the elastic member and at the housing, wherein the elastic member includes portions that are symmetrical with each other relative to a first axis, wherein the damper is disposed on the symmetrical portions of the elastic member, wherein the first axis is an axis that is perpendicular to an optical axis, extends through the center of the elastic member, and is parallel to a direction toward a second side portion from a first side portion of the housing, and wherein the center of the elastic member is a spatial center of the elastic member when viewed from above.

Advantageous Effects

Embodiments are constructed such that the elastic force in the x-axis direction and the elastic force in the y-axis direction of an elastic member are asymmetrically generated so as to increase the difference between second and third resonant frequencies, thereby inhibiting or suppressing oscillation of an AF operation unit during AF operation.

According to the embodiment, the lens moving apparatus, which is of a CLAF module type, is applicable to a front camera of a smartphone so as to improve the photographing speed, AF speed, position difference and image quality of the front camera of the smartphone. Furthermore, the lens moving apparatus according to the embodiment is also applicable to a rear camera of a smartphone.

BEST MODE

Figure 1:
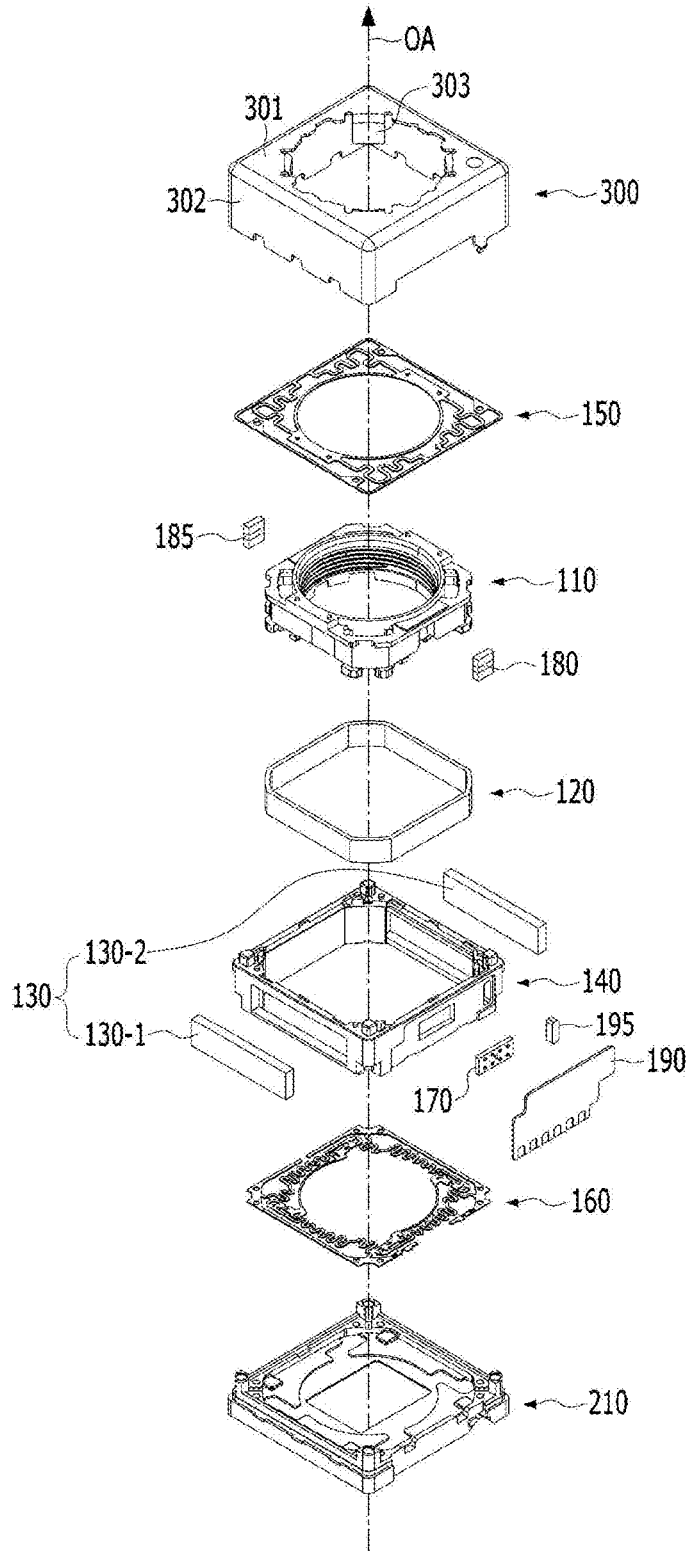
FIG. 1 is an exploded perspective view of a lens moving apparatus according to an embodiment.

Hereinafter, embodiments of the present invention will be described in detail with reference to the accompanying drawings.

The technical idea of the present invention may be embodied in many different forms, and should not be construed as being limited to the following embodiments set forth herein. One or more of components of the embodiments may be selectively combined with each other or replaced without departing from the technical spirit and scope of the present invention.

Unless otherwise particularly defined, terms (including technical and scientific terms) used in the embodiments of the present invention have the same meanings as those commonly understood by one of ordinary skill in the art to which this invention belongs. It will be further understood that commonly used terms, such as those defined in dictionaries, should be interpreted as having meanings consistent with their meanings in the context of the relevant art.

The terminology used in the embodiments of the present invention is for the purpose of describing particular embodiments only, and is not intended to limit the present invention. As used in the disclosure and the appended claims, the singular forms are intended to include the plural forms as well, unless the context clearly indicates otherwise. The phrase "at least one (or one or more) of A, B and C" may be interpreted as including one or more of all combinations of A, B and C.

Furthermore, when describing the components of the present invention, terms such as "first", "second", "A", "B", "(a)" or "(b)" may be used. Since these terms are provided merely for the purpose of distinguishing the components from each other, they do not limit the nature, sequence or order of the components.

It should be understood that, when an element is referred to as being "linked", "coupled" or "connected" to another element, the element may be directly "linked", "coupled" or "connected" to the another element, or may be "linked", "coupled" or "connected" to the another element via a further element interposed therebetween. Furthermore, it will be understood that, when an element is referred to as being formed "on" or "under" another element, it can be directly "on" or "under" the other element, or can be indirectly disposed with regard thereto, with one or more intervening elements therebetween. In addition, it will also be understood that "on" or "under" the element may mean an upward direction or a downward direction based on the element.

Hereinafter, the lens moving apparatus may alternatively be referred to as a lens moving unit, a voice coil motor (VCM), an actuator, or a lens moving device. The term "coil" may interchangeably be used with "coil unit", and the term "elastic member" may interchangeably be used with "elastic unit" or "spring".

In the follow description, the "terminal" may be alternatively referred to as a "pad", "electrode", "conductive layer" or "bonding portion".

For convenience of description, although the lens moving apparatus according to an embodiment is described using a Cartesian coordinate system (x, y, z), the lens moving apparatus may be described using some other coordinate systems, and the embodiments are not limited thereto. In the respective drawings, the X-axis direction and the Y-axis direction mean directions perpendicular to an optical axis, i.e. the Z-axis. The Z-axis direction, which is the direction of the optical axis OA, may be referred to as a "first direction", the X-axis direction may be referred to as a "second direction", and the Y-axis direction may be referred to as a "third direction".

The "auto-focusing function" serves to automatically focus an image of a subject on the surface of an image sensor. The lens moving apparatus according to an embodiment may move an optical module, which is constituted of at least one lens, in the first direction, so as to perform auto-focusing.

Figure 2:
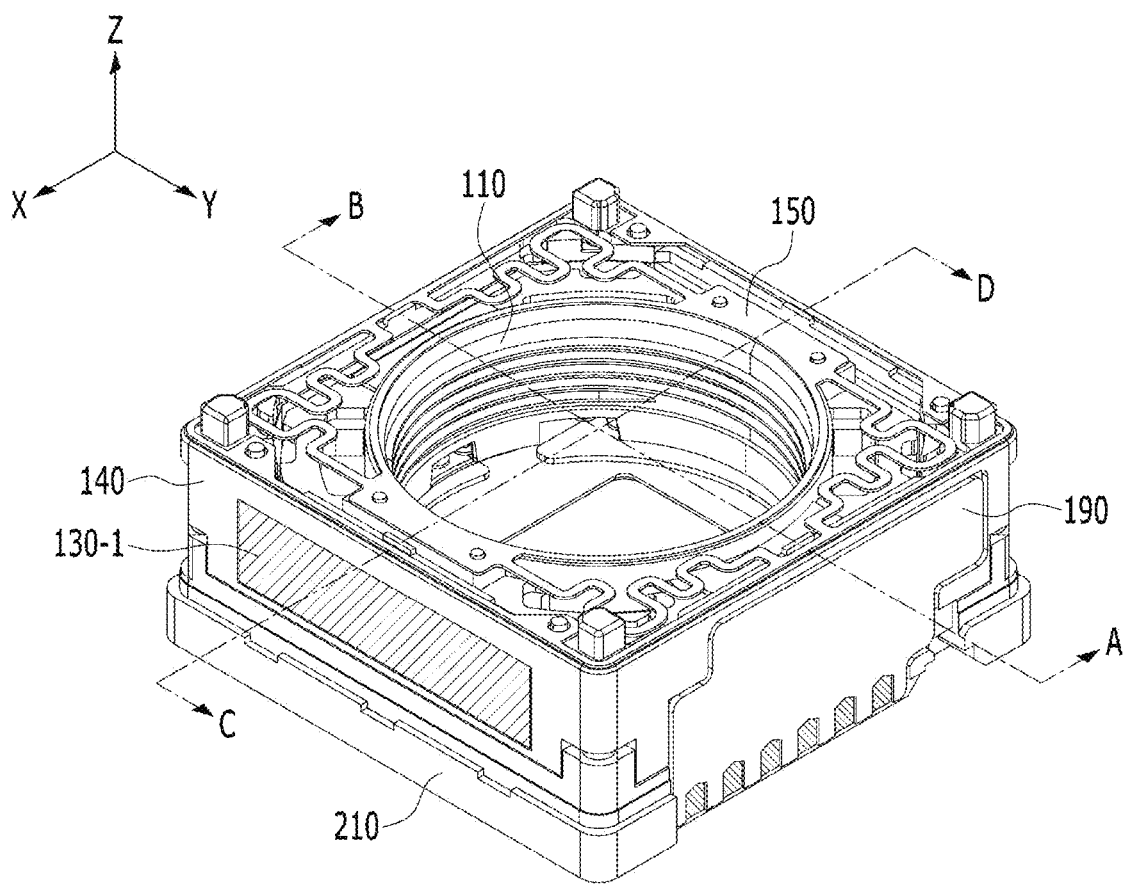
FIG. 2 is an assembled perspective view of the lens moving apparatus shown in FIG. 1, from which a cover member is removed.
Figure 3A:
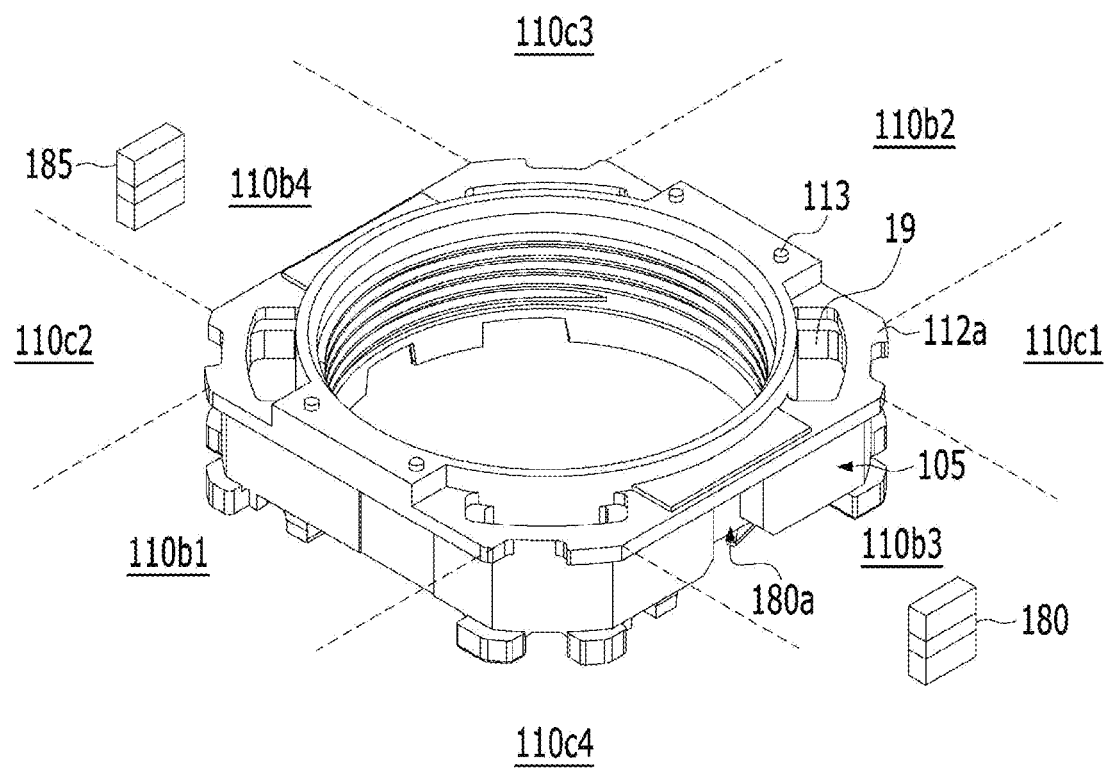
FIG. 3A is an exploded perspective view of a bobbin, a sensing magnet, and a balancing magnet.
Figure 3B:
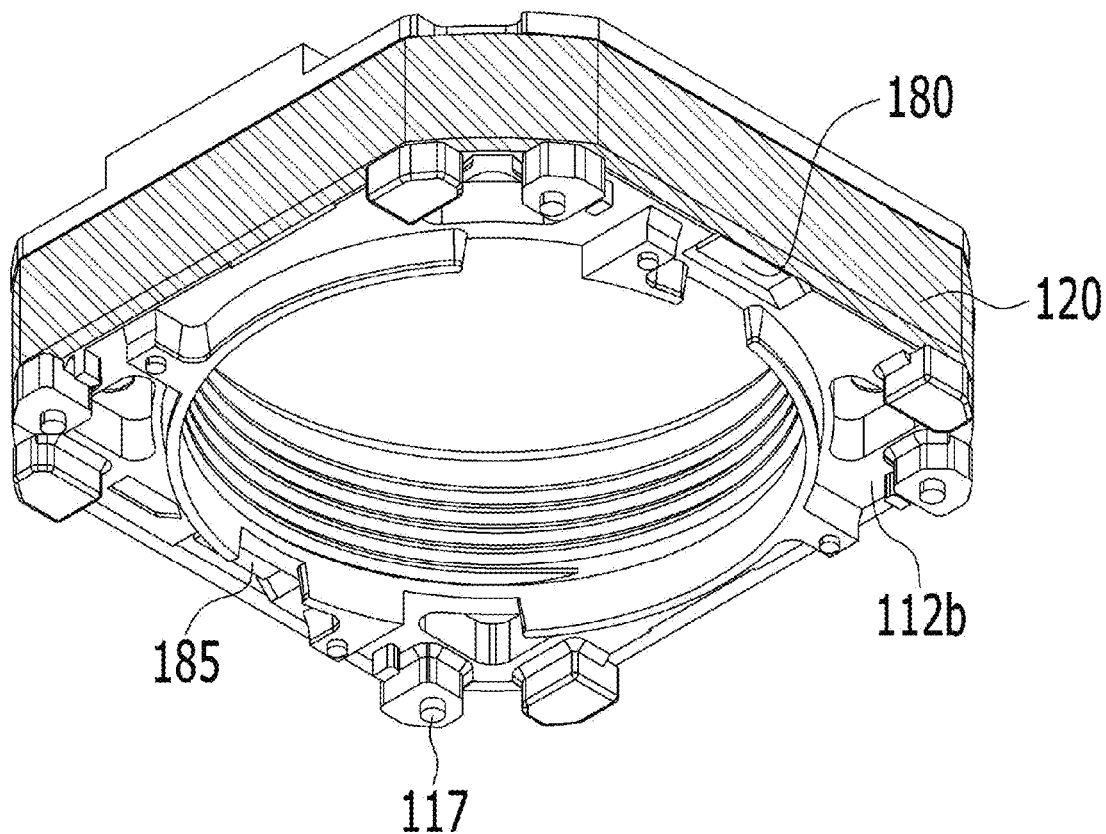
FIG. 3B is an assembled perspective view of the bobbin, a coil, and the sensing magnet.
Figure 4A:
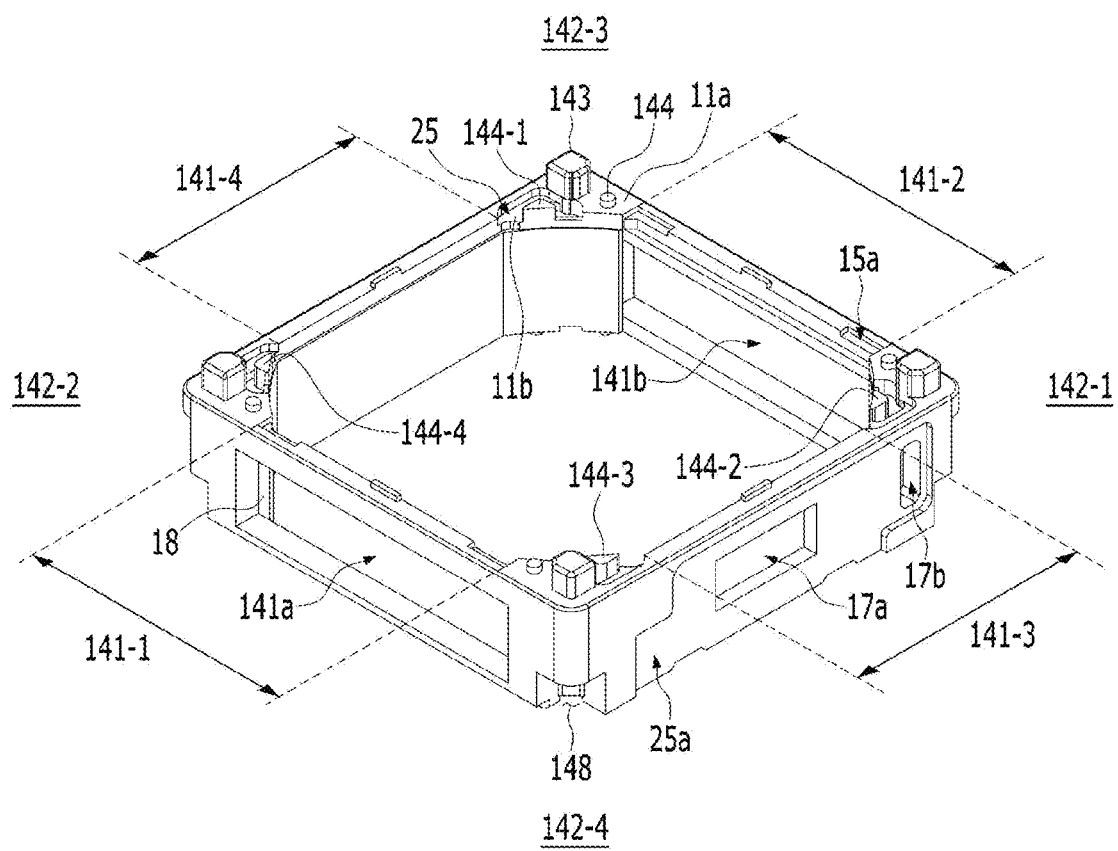
FIG. 4A is a perspective view of a housing.
Figure 4B:
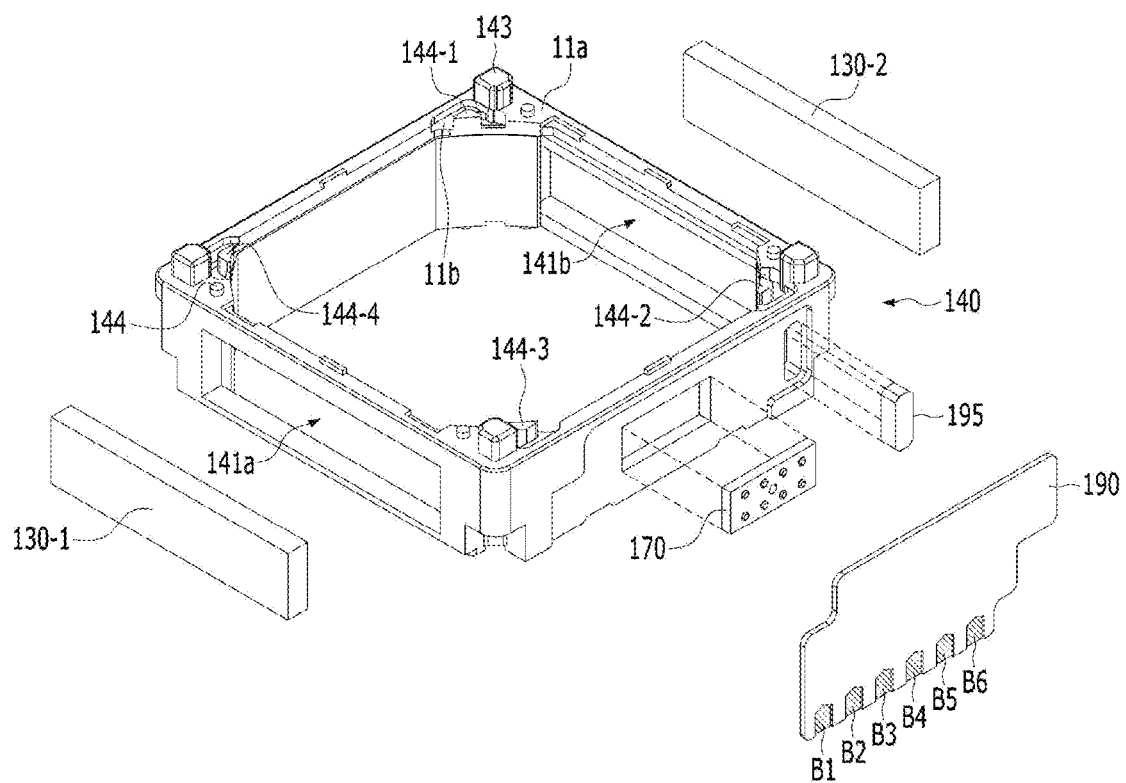
FIG. 4B is a perspective view of the housing, a magnet, a position sensor, a capacitor, and a circuit board.
Figure 4C:
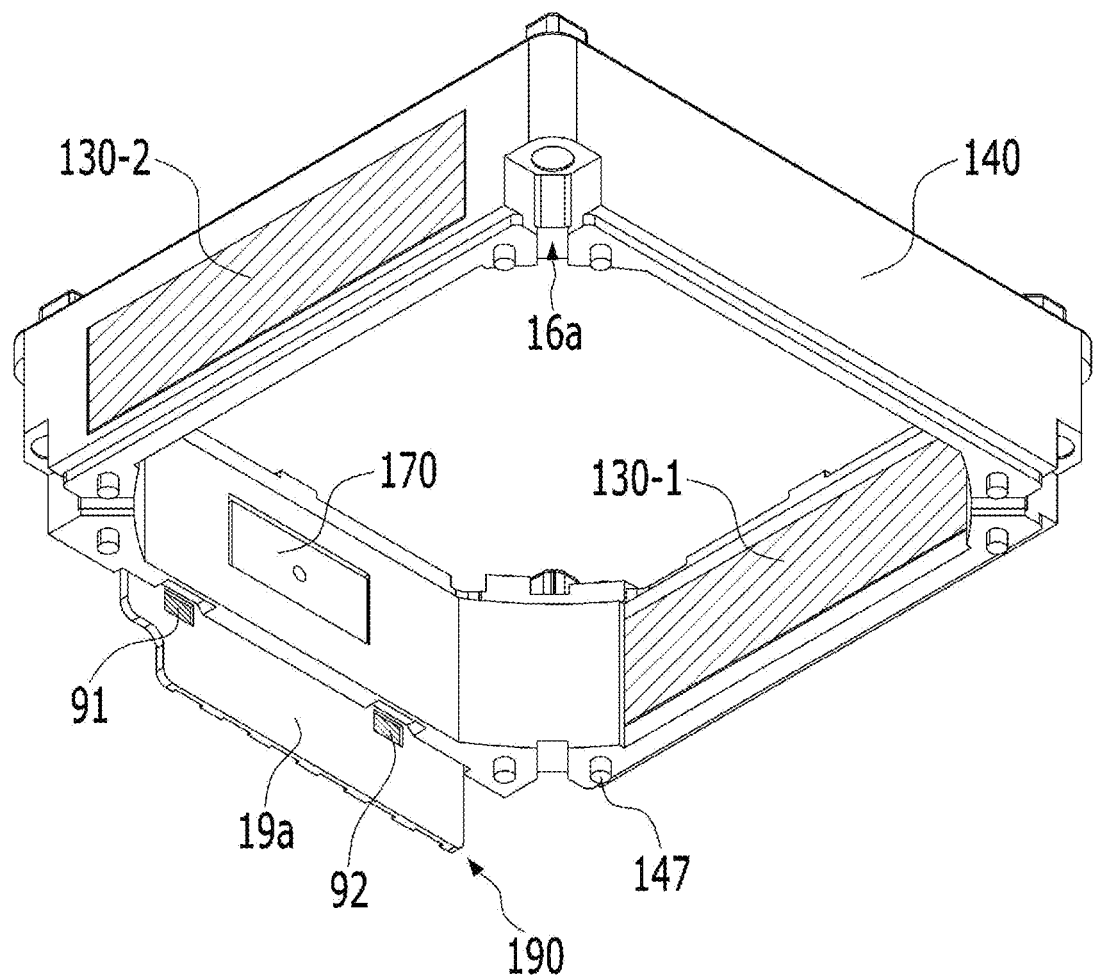
FIG. 4C is an assembled perspective view of the housing, the magnet, the position sensor, the capacitor, and the circuit board.
Figure 5:
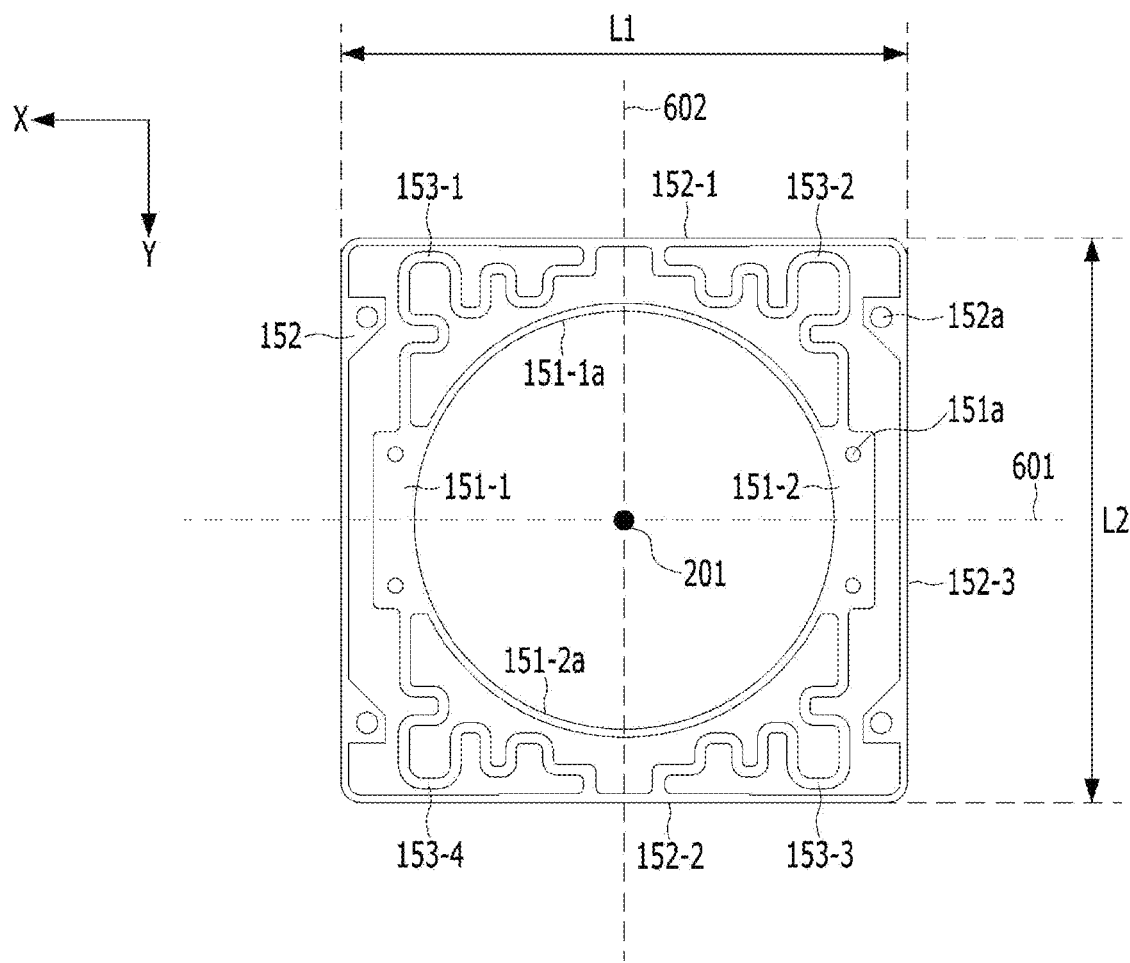
FIG. 5 is a plan view of an upper elastic member.
Figure 6:
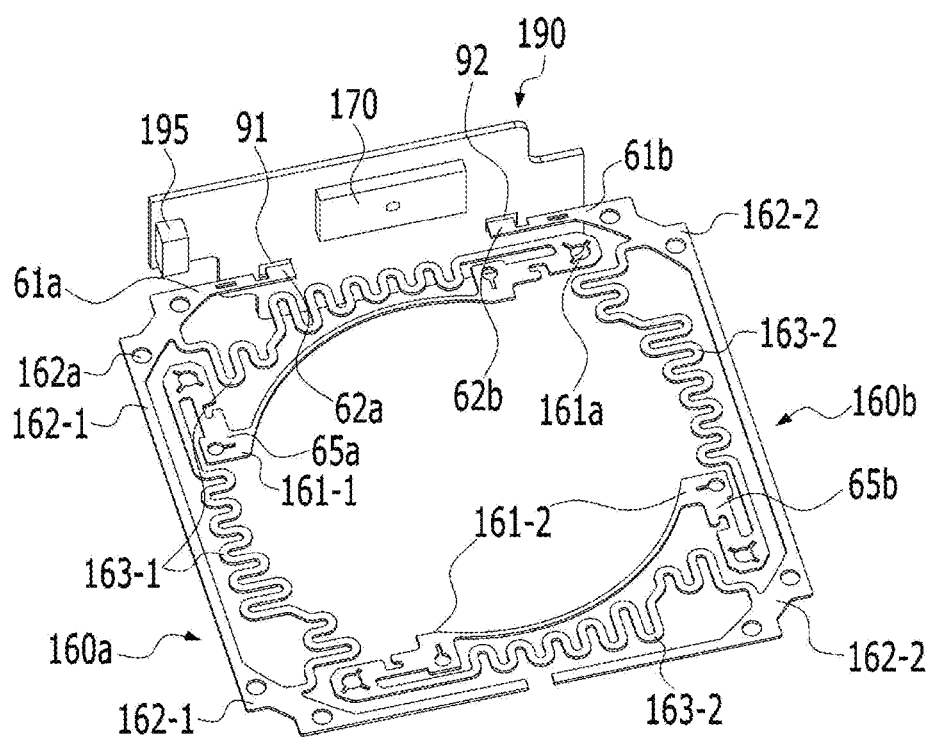
FIG. 6 is an assembled perspective view of a lower elastic member, the circuit board, the position sensor, and the capacitor.
Figure 7:
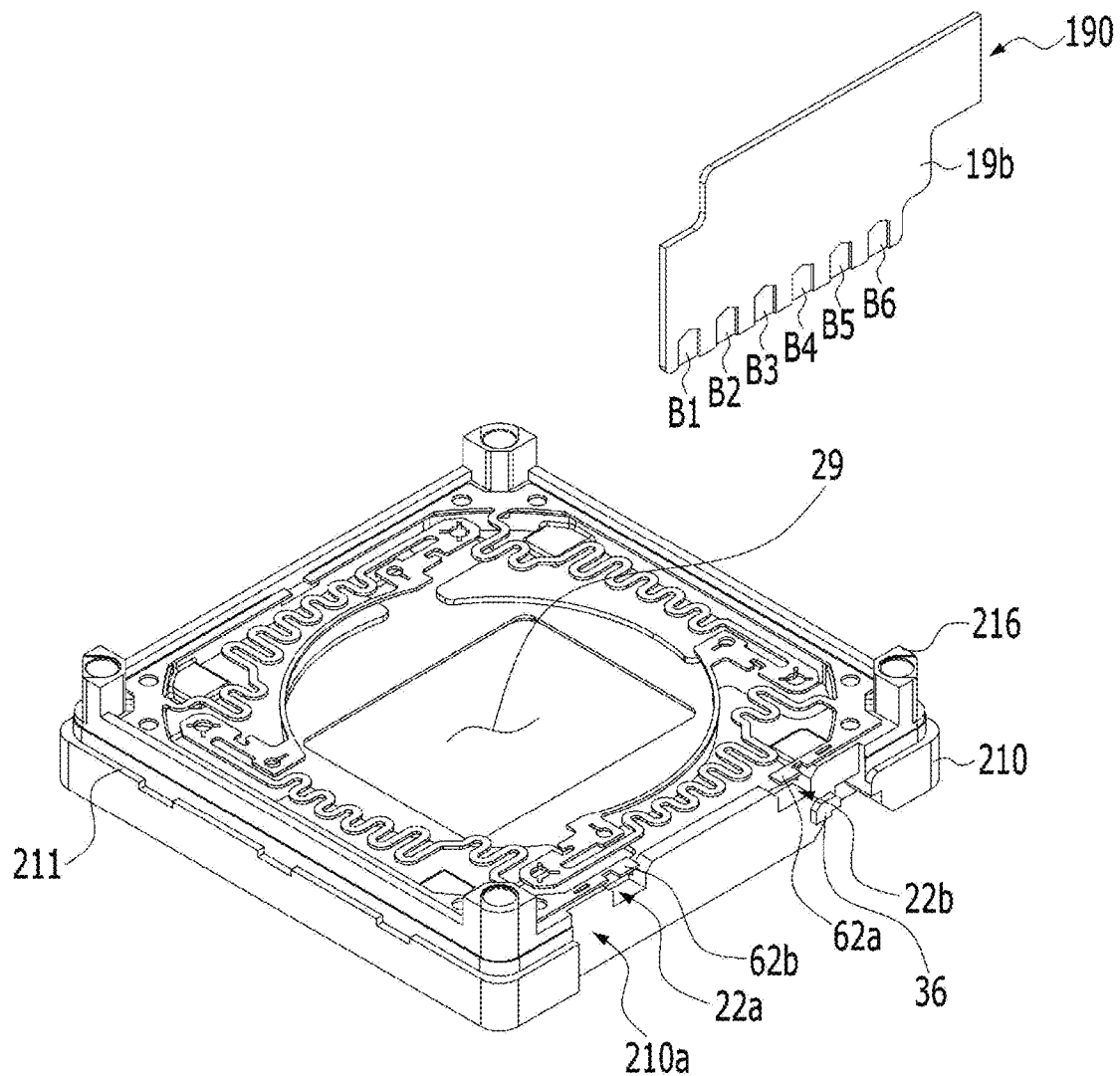
FIG. 7 is a perspective view of a base, the lower elastic member, and the circuit board.
Figure 8A:
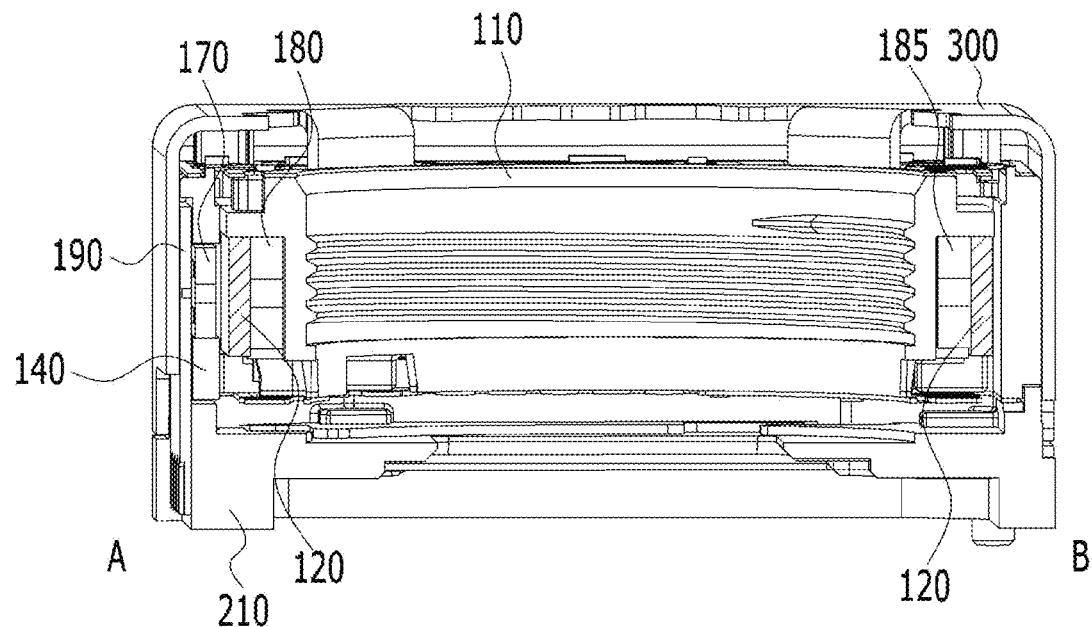
FIG. 8A is a cross-sectional view of the lens moving apparatus shown in FIG. 2, taken along line A-B.
Figure 8B:
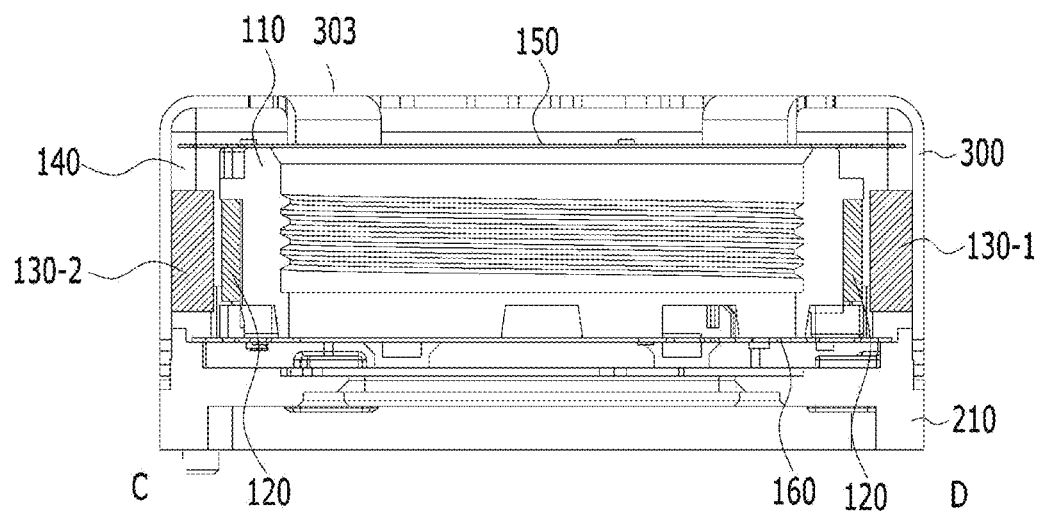
FIG. 8B is a cross-sectional view of the lens moving apparatus shown in FIG. 2, taken along line C-D.
Figure 9:
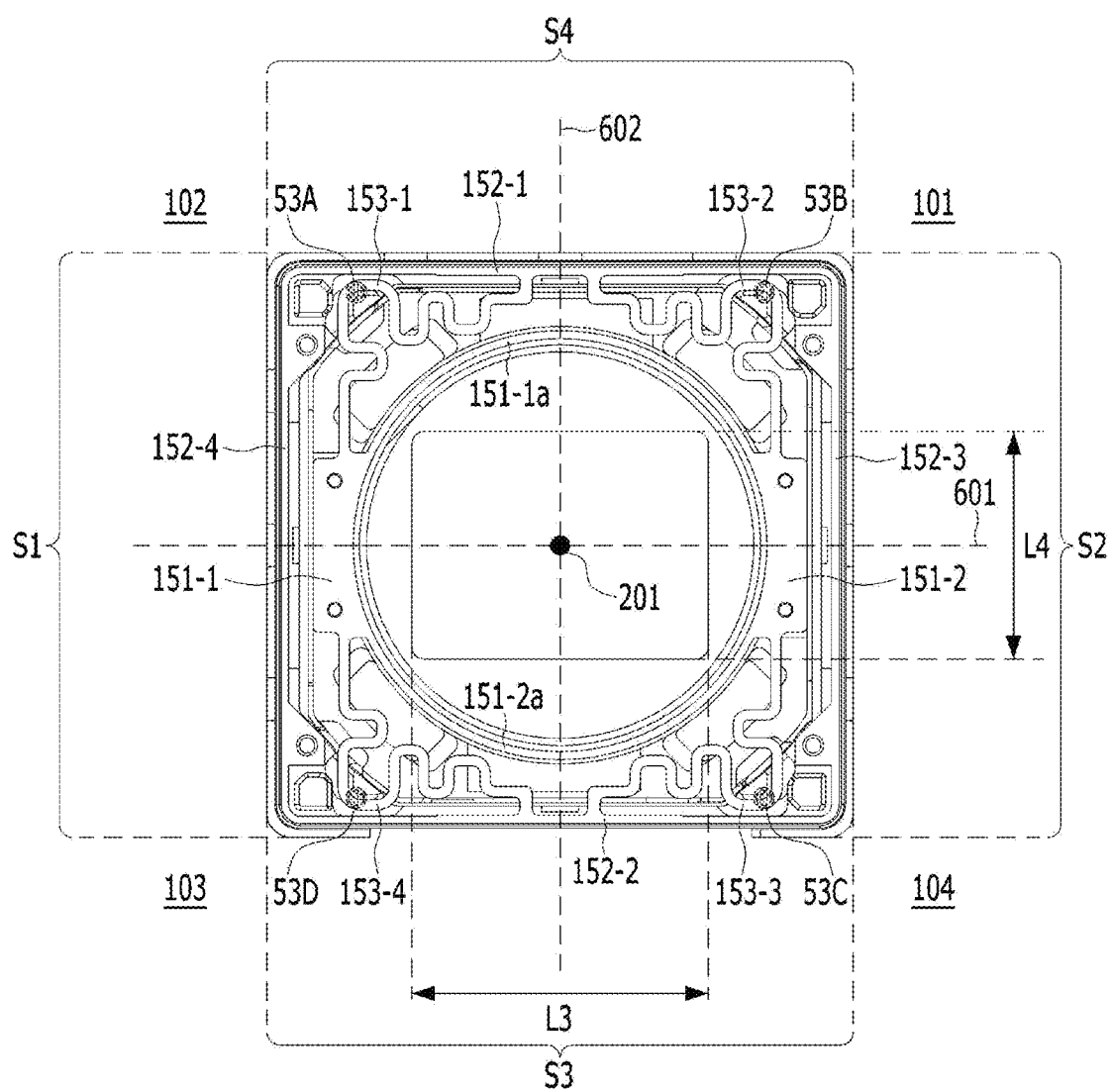
FIG. 9 illustrates the arrangement of dampers according to an embodiment.

FIG. 1 is an exploded view of the lens moving apparatus 100 according to an embodiment. FIG. 2 is an assembled perspective view of the lens moving apparatus 100 shown in FIG. 1 from which a cover member 300 is removed. FIG. 3A is an exploded perspective view of a bobbin 110, a sensing magnet 180, and a balancing magnet 185. FIG. 3B is an assembled perspective view of the bobbin 110, a coil 120, and the sensing magnet 180. FIG. 4A is a perspective view of a housing 140. FIG. 4B is a perspective view of the housing 140, a magnet 130, a position sensor 170, a capacitor 195, and a circuit board 190. FIG. 4C is an assembled perspective view of the housing 140, the magnet 130, the position sensor 170, the capacitor 195, and the circuit board 190. FIG. 5 is a plan view of an upper elastic member 150. FIG. 6 is an assembled perspective view of a lower elastic member 160, the circuit board 190, the position sensor 170, and the capacitor 195. FIG. 7 is a perspective view of a base 210, the lower elastic member 160, and the circuit board 190. FIG. 8A is a cross-sectional view of the lens moving apparatus shown in FIG. 2, taken along line A-B. FIG. 8B is a cross-sectional view of the lens moving apparatus shown in FIG. 2, taken along line C-D. FIG. 9 illustrates the arrangement of dampers 53A to 53D according to an embodiment.

Referring to FIGS. 1 to 9, the lens moving apparatus 100 may include the bobbin 110, the coil 120, the magnet 130, the housing 140, the upper elastic member 150, and the dampers 53A to 53D.

The lens moving apparatus 100 may further include the sensing magnet 180, for AF feedback operation, and the position sensor 170. In addition, the lens moving apparatus 100 may further include the capacitor 195 configured to eliminating noise from the output of the position sensor 170.

Furthermore, the lens moving apparatus 100 may further include a circuit board 190 conductively connected to the position sensor 170. Furthermore, the lens moving apparatus 100 may further include a balancing magnet 185.

The lens moving apparatus 100 may further include at least one of a lower elastic member 160, a cover member 300 and a base 210.

First, the bobbin 110 will be described.

The bobbin 110, which is configured to allow a lens or a lens barrel to be mounted thereon, may be disposed in the housing 140 so as to be movable in the optical-axis direction OA or in the first direction (for example, the Z-axis direction) by the electromagnetic interaction between the coil 120 and the magnet 130.

Referring to FIGS. 3A and 3B, the bobbin 110 may be disposed inside the housing 140.

The bobbin 110 may have a bore in which a lens or a lens barrel is mounted. For example, the bore in the bobbin 110 may be a through hole, and may have a circular shape, an elliptical shape or a polygonal shape, without being limited thereto.

The bobbin 110 may include a first coupler 113, which is disposed on the upper portion, the upper surface or the upper end thereof and is coupled or secured to the first inner frame of the upper elastic member 150, and a second coupler 117, which is disposed on the lower portion, the lower surface or the lower end thereof and is coupled or secured to the second inner frame 161 of the lower elastic member 160. The first and second couplers 113 and 117 may be coupled to the upper and lower elastic members 150 and 160 via an adhesive or heat fusion.

Although each of the first and second couplers 113 and 117 is illustrated in FIGS. 3A and 3B as being configured to have the form of a protrusion, the disclosure is not limited thereto. In another embodiment, each of the first and second couplers 113 and 117 may have the form of a groove or a flat surface.

The bobbin 110 may have a first escape groove 112a formed in a region of the upper surface thereof that corresponds to or overlaps the first frame connectors 153-1 to 153-4 of the upper elastic member 150 in the optical-axis direction. The first escape groove 112a may be configured to be depressed from the upper surface of the bobbin 110.

Furthermore, the bobbin 110 may have a second escape groove 112b formed in a region of the lower surface thereof that corresponds to or overlaps the second frame connectors 163-1 and 163-2 of the lower elastic member 160 in the optical-axis direction. The second escape groove 112*b* may be configured to be depressed from the lower surface of the bobbin 110.

By virtue of the first escape groove 112*a* and the second escape groove 112*b* in the bobbin 110, when the bobbin 110 is moved in the first direction, spatial interference between the first frame connectors 153-1 to 154-4 and the second frame connectors 163-1 and 163-2 and the bobbin 110 is avoided, thereby allowing the frame connector 153 to be elastically deformed with ease.

The bobbin 110 may include a plurality of side surfaces or outer surfaces.

For example, the bobbin 110 may include side portions 110*b*1 to 110*b*4 and corner portions 110*c*1 to 110*c*4.

For example, each of the first to fourth corner portions 110*c*1 to 110*c*4 of the bobbin 110 may be disposed between two adjacent side portions of the bobbin 110. The side surfaces or outer surfaces of the first to fourth side portions 110*b*1 to 110*b*4 of the bobbin 110 may be referred to as "first to fourth side surfaces" or "first to fourth outer surfaces".

The bobbin 110 may have at least one groove 105 formed in the side surface or the outer surface thereof in which the coil 120 is disposed or seated.

For example, the coil 120 may be disposed or seated in the groove 105 in the bobbin 110, or may be directly wound in the groove 105 in the bobbin 110 in a clockwise direction or in a counterclockwise direction about the optical axis OA so as to have a closed loop shape, without being limited thereto.

The number and shape of grooves 105 in the bobbin 110 may correspond to the number and shape of coils disposed on the outer surface of the bobbin 110. In another embodiment, the bobbin 110 may not have the groove in which the coil is seated, and the coil may be directly wound around the outer surface of the bobbin 110, and may be secured thereto.

For seating the sensing magnet 180, the bobbin 110 may have a groove 180*a* formed in the outer surface of one of the side portions (for example, 110*b*3). For easily seating the sensing magnet 180, the groove 180*a* may have an opening formed in the lower surface of the bobbin 110. Although the groove 180*a* for accommodating the sensing magnet 180 may also be formed in the bottom of the groove 105 for accommodating the coil 120, the disclosure is not limited thereto.

For seating the balancing magnet 185, the bobbin 110 may have a groove (not shown) formed in the outer surface of the side portion 110*b*4 that faces the side portion (for example, 110*b*3) having therein the groove 180*a*. Although the groove, in which the balancing magnet 185 is seated, may be formed in, for example, the bottom of the groove 105, the disclosure is not limited thereto.

The bobbin 110 may include a first stopper (not shown), which projects upwards from the upper surface thereof, and a second stopper (not shown), which projects downwards from the lower surface thereof.

The first and second stoppers of the bobbin 110 may serve to inhibit the upper surface or the lower surface of the bobbin 110 from directly colliding with the inner wall of the cover member 300 or the upper surface of the base 210 even when the bobbin 110 is moved beyond a specified range due to an external impact or the like while the bobbin 110 is being moved in the first direction to perform an autofocusing function.

The upper surface of the bobbin 110 may be provided therein with at least one groove 19 in which a projection 303 of the cover member 300 is disposed. For example, the at least one groove 19 may be depressed from the upper surface of the bobbin 110.

Next, the coil 120 will be described.

The coil 120 may be disposed on the outer surface of the bobbin 110, and may be a AF drive coil configured to electromagnetically interact with the magnet 130 disposed on the housing 140.

For example, the coil 120 may be disposed or wound in the groove 105 in the bobbin 110.

In order to create electromagnetic force from the interaction with the magnet 130, a drive signal (for example, drive current or voltage) may be supplied or applied to the coil 120.

The drive signal applied to the coil 120 may be a DC signal, without being limited thereto. The drive signal may be an AC signal or a signal containing both DC and AC components.

An AF operation unit may be moved in the first direction, for example, in an upward direction (in the +z-axis direction) or in a downward direction (in the −z-axis direction) by virtue of the electromagnetic force resulting from the interaction between the coil 120 and the magnet 130.

By controlling the intensity and/or polarity of a drive signal applied to the first coil 120 (for example, the direction in which current flows) and thus controlling the intensity and/or direction of the electromagnetic force resulting from the interaction between the coil 120 and the first and second magnets 130, it is possible to control the movement of the AF operation unit in the first direction, thereby performing an autofocus function.

The AF operation unit may be driven unidirectionally or bidirectionally by the electromagnetic force resulting from the interaction between the coil 120 and the magnet 130. Here, unidirectional driving means that the AF operation unit is moved in one direction, for example, in an upward direction (that is, in a +z-axis direction) from the initial position of the AF operation unit, and bidirectional driving means that the AF operation unit is moved in two directions (for example, in upward and downward directions) based on the initial position of the AF operation unit.

For example, the initial position of the AF operation unit (for example, the bobbin 110) may be the original position of the AF operation unit (for example, the bobbin) in the state in which no electric power or drive signal is applied to the coil 120 or the position at which the AF operation unit is located as the result of the upper and lower elastic members 150 and 160 being elastically deformed due only to the weight of the AF operation unit.

In addition, the initial position of the AF operation unit (for example, the bobbin 110) may be the position at which the AF operation unit is located when gravity acts in the direction from the bobbin 110 to the base 210 or when gravity acts in the direction from the base 210 to the bobbin 110.

The AF operation unit may include the bobbin 110, which is elastically supported by the upper elastic member 150 and the lower elastic member 160, and components which are mounted on the bobbin 110 and are moved therewith. For example, the AF operation unit may include at least one of the bobbin 110, the coil 120, the sensing magnet 180 and the balancing magnet 185, and may further include a lens or a lens barrel when the lens or the lens barrel is mounted on the AF operation unit. The AF operation unit may alternatively be referred to as an AF moving unit.

The coil 120 may be disposed on the bobbin 110 so as to have a closed curve shape, for example, a ring shape.

For example, the coil 120 may be wound in a clockwise direction or in a counterclockwise direction about the optical axis so as to have a closed loop shape, and may be wound or disposed on the outer surface of the bobbin 110.

In another embodiment, the coil 120 may be embodied as a coil ring, which is wound or disposed in a clockwise direction or in a counterclockwise direction about an axis perpendicular to the optical axis. Although the number of coil rings may be the same as the number of magnets 130, the disclosure is not limited thereto. In another embodiment, the coil 120 may include a first coil unit that faces the first magnet 130-1 and a second coil unit that faces the second magnet 130-2. In this case, the first coil unit may be disposed on the side portion of the bobbin 110 that faces the first magnet 130-1, and the second coil unit may be disposed on the side portion of the bobbin 110 that faces the second magnet 130-2.

The coil 120 may be conductively connected to at least one of the upper elastic member 150 and the lower elastic member 160, and may be conductively connected to the circuit board 190 via at least one of the upper elastic member 150 or the lower elastic member 160.

For example, by means of solder or conductive adhesive, the coil 120 may be coupled to the lower elastic units of the lower elastic member 160. For example, the coil 120 be coupled to two lower elastic units 160a and 160b.

For example, at the initial position of the AF operation unit (for example, the bobbin 110), the coil 120 disposed on the bobbin 110 may overlap the magnet 130 in a direction that intersects the optical axis OA and is perpendicular to the optical axis.

Furthermore, at the initial position of the AF operation unit (for example, the bobbin 110), the coil 120 disposed on the bobbin 110 may overlap the position sensor 170 in a direction that intersects the optical axis and is perpendicular to the optical axis, without being limited thereto. In another embodiment, the coil 120 may not overlap the position sensor 170.

For example, although the coil 120 disposed on the bobbin 110 may overlap the sensing magnet 180 (and the balancing magnet 185) in a direction that extends through the optical axis OA and is perpendicular to the optical axis OA at the initial position of the AF operation unit (for example, the bobbin 110), the disclosure is not limited thereto. In another embodiment, the coil 120 may not overlap the sensing magnet 180 (or the balancing magnet 185).

Next, the housing 140 will be described.

The housing 140 receives therein at least a portion of the bobbin 110.

Referring to FIGS. 4A to 4C, the housing 140 supports the magnet 130, the position sensor 170, the capacitor 195, and the circuit board 190, and accommodates therein the bobbin 110 such that the bobbin 110 is movable in the optical-axis direction.

The housing 140 may have the shape of a column having a bore for receiving therein the bobbin 110. Here, the bore in the housing 140 may be a through hole, which is formed through the housing 140 in the optical-axis direction.

The housing 140 may include a plurality of side portions (for example, 141-1 to 141-4) and a plurality of corner portions (for example, 142-1 to 142-4). Here, the corner portions (for example, 142-1 to 142-4) of the housing 140 may be alternatively referred to as "column portions".

For example, the housing 140 may include the side portions (for example, 141-1 to 141-4) and the corner portions (for example, 142-1 to 142-4), which collectively define a bore having a polygonal shape (for example, a square shape or an octagonal shape) or a circular (or elliptical) shape.

The housing 140 may include the first and second side portions 141-1 and 141-2, which face each other, and the third and fourth side portions 141-3 and 141-4, which face each other. Furthermore, the housing 140 may include the first and fourth corner portions 142-1 and 142-4, which face each other, and the second and third corner portions 142-2 and 142-3, which face each other.

For example, the housing 140 may include the first to fourth side portions 141-1 to 141-4, which are spaced apart from one another, the first corner portion 142-1 positioned between the second side portion 141-2 and the third side portion 141-3, the second corner portion 142-2 positioned between the first side portion 141-1 and the third side portion 141-3, the third corner portion 142-3 positioned between the second side portion 141-2 and the fourth side portion 141-4, and the fourth corner portion 142-4 positioned between the first side portion 141-1 and the fourth side portion 141-4.

The third side portion 141-3 and the fourth side portion 141-4 of the housing 140 may be disposed between the first side portion 141-2 and the second side portion 141-2 of the housing 140.

The housing 140 may include a first side surface (or a first outer surface) corresponding to the first side surface (or the first outer surface) of the bobbin 110, a second side surface (or a second outer surface) corresponding to the second side surface (or the second outer surface) of the bobbin 110, a third side surface (or a third outer surface) corresponding to the third side surface (or the third outer surface) of the bobbin 110, and a fourth side surface (or a fourth outer surface) corresponding to the fourth side surface (or the fourth outer surface) of the bobbin 110. The third and fourth side surfaces (or the third and fourth outer surfaces) of the housing 140 may be disposed between the first and second side surfaces (or the first and second outer surfaces) of the housing 140.

For example, each of the first to fourth side surfaces (or the first to fourth outer surfaces) of the housing 140 may be one side surface or outer surface of a corresponding one among the first to fourth side portions 141-1 to 141-4 of the housing 140.

Each of the first to fourth side portions 141-1 to 141-4 of the housing 140 may be disposed parallel to a corresponding one among the side plates 302 of the cover member 300.

Each of the first to fourth side portions 141-1 to 141-4 of the housing 140 may correspond to one of the side portions 110b1 to 110b4 of the bobbin 110, and each of the first to fourth corner portions 142-1 to 142-4 of the housing 140 may correspond to one of the first to fourth corner portions 110c1 to 110c4 of the bobbin 110.

The inner surface of each of the corner portions 142-1 to 142-4 of the housing 140 may be a flat surface, a chamfer, or a curved surface.

The housing 140 may include a seating portion 141 formed in the first side portion 141-1 of the housing 140 in order to mount the first magnet unit 130-1, and may include a seating portion 141b formed in the second side portion 141-2 of the housing 140 in order to mount the second magnet unit 130-2.

Although each of the seating portions 141a and 141b is illustrated in FIG. 4A as having a bore or a through hole, which is formed through the first or second side portion 141-1 or 141-2 of the housing 140, the disclosure is not limited thereto. In another embodiment, each of the seating portions may have a groove or recess shape.

The housing 140 may include supports 18, which are disposed adjacent to the seating portions 141a and 141b so as to support first surfaces of the peripheral surfaces of the first and second magnet units 130-1 and 130-2. The supports 18 may be positioned adjacent to the inner surface of the housing 140, and may project in a horizontal direction from side surfaces of the seating portions 141a and 141b. For example, each of the supports 18 may include a tapered portion or a sloped surface. In another embodiment, the housing 140 may not include the supports 18.

In order to inhibit the housing 140 from colliding with the inner surface of the upper plate 301 of the cover member 300, the housing 140 may be provided on the upper portion, the upper surface or the upper end thereof with a stopper 143. Here, the stopper 142 may be alternatively referred to as a "boss" or a "protrusion".

For coupling to a hole 152a in the first outer frame 152 of the upper elastic member 150, the housing 140 may include at least one first coupler 144 provided on the upper portion, the upper surface or the upper end thereof Although the first coupler 144 of the housing 140 may have a protruding shape in FIG. 4A, the disclosure is not limited thereto. In another embodiment, the first coupler 144 may have a groove shape or a flat surface shape.

Furthermore, for coupling to a hole 162a in the second outer frame 162 of the lower elastic member 160, the housing 140 may include at least one second coupler 147 provided on the lower portion, the lower surface or the lower end of the housing 140. Although the second coupler 147 is illustrated in FIG. 4C as having a protruding shape, the disclosure is not limited thereto. In another embodiment, the second coupler 147 may have a groove shape or a flat surface shape.

Although the first and second couplers 144 and 147 are disposed on at least one of the corner portions 142-1 to 142-4 of the housing 140 in FIGS. 4A to 4C, the disclosure is not limited thereto. In another embodiment, the first and second couplers 144 and 147 may be disposed on at least one of the side portions 141-1 to 141-4 and the corner portions 142-1 to 142-4.

In order to inhibit the lower surface or the bottom of the housing 140 from colliding with the base 210, which will be described later, the housing 140 may include at least one stopper (not shown) projecting from the lower portion, the lower surface or the lower end thereof.

The lower portion, the lower surface or the lower end of at least one of the first to fourth corner portions 142-1 to 142-4 of the housing 140 may be provided therein with a guide groove 148 corresponding to a projection 216 of the base 210.

For example, the guide groove 148 in the housing 140 may be coupled to the projection 216 of the base 210 using an adhesive member or a shielding member, and the housing 140 may be coupled to the base 210 using an adhesive member.

In order to avoid spatial interference with a portion at which the first frame connectors 153-1 to 153-4 of the upper elastic member 150 is connected to the first outer frame 152, the upper portion, the upper surface or the upper end of at least one of the first to fourth side portions 141-1 to 141-4 of the housing 140 may be provided therein with at least one escape groove 15a.

Furthermore, in order to avoid spatial interference with a portion at which the second frame connectors 163-1 and 163-2 of the lower elastic member 160 is connected to the second outer frame 161, the lower portion, the lower surface or the lower end of at least one of the first to fourth corner portions 142-1 to 142-4 of the housing 140 may be provided therein with at least one escape groove 16a.

In another embodiment, one or more of each of the escape groove 15a and/or the escape groove 16a in the housing 140 may be disposed on at least one of the side portions 141-1 to 141-4 or the corner portions 142-1 to 142-4 of the housing 140.

The upper surface of the housing 140 may be provided therein with an escape groove 25 for avoiding spatial interference with the first frame connectors 153-1 to 153-4 of the upper elastic member 150.

For example, at least portions of the first frame connectors 153-1 to 153-4 of the upper elastic member 150 are disposed in the escape groove 25.

Referring to FIG. 4A, the upper surface of the housing 140 may include a first surface 11a, and a second surface 11b, which has a height difference with respect to the first surface 11a in the optical-axis direction. The second surface 11b may be positioned lower than the first surface 11a.

For example, the escape groove 25 in the housing 140 may be depressed from the first surface 11a of the housing 140, and the bottom surface of the escape groove 25 in the housing 140 may be the second surface 11b of the housing 140.

At least one of the stopper 143 and the coupler 144 of the housing 140 may project from the first surface 11a of the housing 140 in the optical-axis direction.

The housing 140 may include protrusions 144-1 to 144-4, which guide the first frame connectors 153-1 to 153-4 of the upper elastic member 150 and support the dampers 53A to 53D.

The protrusions 144-1 to 144-4 may correspond to the frame connectors.

For example, each of the protrusions 144-1 to 144-4 may be disposed adjacent to a portion of a corresponding one of the frame connectors.

For example, the protrusions 144-1 to 144-4 may be disposed on the corner portions 142-1 to 142-4 of the housing 140.

For example, the protrusions 144-1 to 144-4 may be positioned on the bottom surface of the escape groove 25 in the housing 140.

Although the protrusions 144-1 to 144-4 may project in the optical-axis direction with respect to the frame connectors 153-1 to 153-4 of the upper elastic member 150, the disclosure is not limited thereto.

For example, the height of the upper ends or the upper surfaces of the protrusions 144-1 to 144-4 may be higher than the height of the upper surfaces of the frame connectors 153-1 to 153-4. In another embodiment, the height of the upper ends or the upper surfaces of the protrusions 144-1 to 144-4 may be equal to or lower than the height of the upper surfaces of the frame connectors 153-1 to 153-4.

For example, at least portions of the first frame connectors 153-1 to 153-4 of the upper elastic member 150 may be disposed between the side wall of the escape groove 25 and the protrusions 144-1 to 144-4 of the housing 140.

For example, although the escape groove 25 and the protrusions 144-1 to 144-4 may be disposed on the corner portions 142-1 to 142-4 of the housing 140, the disclosure is not limited thereto. In another embodiment, the protrusions 144-1 to 144-4 may also be disposed on the side portions 141-1 to 141-4.

For example, although the protrusions 144-1 to 144-4 may be disposed adjacent to or in contact with the inner surface of the housing 140, the disclosure is not limited thereto. In another embodiment, the protrusions may be disposed so as to be spaced apart from the inner surface of the housing 140.

For example, although the shape of each of the protrusions 144-1 to 144-4 may be a triangular shape when viewed from above, the disclosure is not limited thereto. In another embodiment, each of the protrusions may have a polygonal shape, such as a square shape, a circular shape, or an elliptical shape.

One side portion (for example, the third side portion 141-3) of the housing 140 may be provided with a structure (for example, a protrusion or a groove) configured to be coupled to the circuit board 190.

The outer surface of the third side portion 141-3 of the housing 140 may be provided with a groove 25a, in which the circuit board 190 is disposed. The groove 25a may have a shape that coincides with or corresponds to the shape of the circuit board 190.

For example, the circuit board 190 may be attached to the third side portion 141-3 (or the groove 25a) of the housing 140 using an adhesive or the like.

For seating of disposing the position sensor 170, the housing 140 may include a first seating portion 17a formed in the third side portion 141-3.

Furthermore, for seating of disposing the capacitor 195, the housing 140 may include a second seating portion 17b formed in the first corner portion 142-1 (or the first column portion).

The first seating portion 17a and the second seating portion 17b in the housing 140 may be formed in a side surface of the groove 25a in the housing 140 so as to be spaced apart from each other.

For example, the first seating portion 17a formed in the third side portion 141-3 of the housing 140 may be positioned between the first corner portion 142-1 and the second corner portion 142-2, and the second seating portion 17b may be formed in the first corner portion 142-1 of the housing 140.

For example, the first seating portion 17a may be formed in the central area of the outer surface of the third side portion 141-3 of the housing 140. For example, the first seating portion 17a may be formed at a location that is spaced apart from both the first corner portion 142-1 and the second corner portion 142-2 by the same distance.

In another embodiment, the first seating portion 17a may be formed from the second corner portion 142-2 of the housing 140 to the third side portion 141-3 of the housing 140.

The second seating portion 17b may be formed in the first corner portion 142-1 or may be formed adjacent to the first corner portion 142-1.

In FIG. 4A, the first seating portion 17a may have the form of an opening or a through hole, which is formed through the third side portion 141-3 of the housing 140 such that the housing 140 is not interposed between the sensing magnet 180 and the position sensor 170, thereby increasing the output of the position sensor 170 and thus enhancing the sensitivity of the position sensor 170. In another embodiment, the first seating portion may have the form of a groove.

For example, although the first seating portion 17a may be formed in the center of the third side portion 141-3 or may be located so as to be spaced apart from the first corner portion 142-1 and the second corner portion 142-2 by the same distance, the disclosure is not limited thereto.

In another embodiment, the first seating portion may be located closer to one of the first corner portion 142-1 and the second corner portion 142-2 than to the other thereof.

The second seating portion 17b may not have the through-hole shape but may have a groove depressed from the outer surface of the first corner portion 142-1 of the housing 140.

In the case in which the first seating portion accommodates both the position sensor 170 and the capacitor 195 without additionally forming the second seating portion, the size of the opening in the first seating portion increases, thereby allowing contaminants to enter the housing 140 through the opening. However, since the second seating portion 17b is formed to have a groove shape independently of the first seating portion 17a and the first seating portion is formed so as to have a size corresponding precisely to the size of the position sensor 170 in this embodiment, it is possible to reduce the possibility of contaminants entering the housing 140 through the first seating portion 17a.

In another embodiment, the second seating portion 17b may be configured to have an opening or through-hole shape.

For example, although the first seating portion 17a of the housing 140 may have a shape that corresponds to or coincides with the shape of the position sensor 170, the disclosure is not limited thereto.

Although the second seating portion 17b of the housing 140 may have a shape that corresponds to or coincides with the shape of the capacitor 195, the disclosure is not limited thereto.

A corner portion (for example, 142-1) of the housing 140 may include a first region having a greater thickness than the thickness of the side portions 141-1 to 141-4 of the housing 140.

The capacitor 195 may be disposed in the first region of the first corner portion 142-1 of the housing 140. Accordingly, since the embodiment is able to allow the capacitor 195 to be easily disposed on the housing without increasing the size of the housing 140 or decreasing the size of the bore in the bobbin 110, it is possible to eliminate a restriction on mounting of the capacitor 195 due to the size of the capacitor 195.

Next, the magnet 130, the sensing magnet 180 and the balancing magnet 185 will be described.

The magnet 130 may be a magnet that is disposed on the housing 140 and is capable of generating electromagnetic force resulting from the interaction between the coil 120 and thus of moving the bobbin 110 using the electromagnetic force.

The magnet 130 may include a plurality of magnet units. For example, the magnet may include two or more magnet units.

For example, the magnet 130 may include a first magnet unit 130-1 and a second magnet unit 130-2.

The first magnet unit 130-1 and the second magnet unit 130-2 may be disposed on the two facing side portions (for example, 141-1 and 141-2) of the housing 140.

For example, the first magnet unit 130-1 may be disposed on the side surface or the outer surface of the first side portion 141-1 of the housing 140, and the second magnet unit 130-2 may be disposed on the side surface or the outer surface of the second side portion 141-2 of the housing 140.

For example, the first and second magnet units 130-1 and 130-2 may be disposed on the seating portions 141a and 141b in the housing 140.

In another embodiment, the first and second side portions 141-1 and 141-2 of the housing 140 may not be provided with the opening, and the first and second magnet units 130-1 and 130-2 may be disposed on the outer surfaces or the inner surfaces of the side portions 141-1 and 141-2 of the housing 140.

Although each of the first and second magnet units 130-1 and 130-2 may have a shape corresponding to the outer surfaces of the side portions 141-1 and 141-2 of the housing 140, for example, a polyhedral shape (for example, a rectangular parallelepiped shape), the disclosure is not limited thereto.

Each of the first and second magnet units 130-1 and 130-2 may be a monopolar magnetized magnet, which includes two different poles and an interface plane naturally formed between the two different poles. For example, each of the first and second magnet units 130-1 and 130-2 may be a monopolar magnetized magnet in which a first surface thereof that faces the coil 120 is the N pole and a second surface thereof opposite the first surface is the S pole. However, the disclosure is not limited thereto, and the reverse disposition of the N pole and the S pole is also possible.

In another embodiment, in order to increase the electromagnetic force, each of the first and second magnet units 130-1 and 130-2 may be a bipolar magnetized magnet divided into two parts in a direction perpendicular to the optical axis. Here, the first and second magnet units 130-1 and 130-2 may be embodied by a ferrite magnet, an alnico magnet, a rare-earth magnet or the like.

When each of the first and second magnets 130-1 and 130-2 is a bipolar magnetized magnet, each of the first and second magnets 130-1 and 130-2 may include a first magnet part, a second magnet part, and a partition wall disposed between the first magnet part and the second magnet part.

The first magnet part may include an N pole, an S pole, and a first interface plane between the N pole and the S pole. Here, the first interface plane may be a portion that has substantially no magnetism and has a zone having almost no polarity, and may be a portion that is naturally formed in order to form a magnet composed of one N pole and one S pole.

The second magnet part may include an N pole, an S pole, and a second interface plane between the N pole and the S pole. Here, the second interface plane may be a portion that has substantially no magnetism and has a zone having almost no polarity, and may be a portion that is naturally formed in order to form a magnet composed of one N pole and one S pole.

The partition wall may separate or isolate the first magnet part and the second magnet part from each other, and may be a portion having substantially no magnetism or polarity. For example, the partition wall may be a nonmagnetic material, air or the like. That is, the partition wall may be considered a "neutral zone".

The partition wall may be a portion that is artificially formed when the first magnet part and the second magnet part are magnetized, and the width of the partition wall may be greater than the width of each of the first interface and the second interface. Here, the width of the partition wall may be the length of the partition wall in a direction toward the second magnet part from the first magnet part.

For example, although the first magnet part and the second magnet part may be disposed such that opposite poles thereof face each other in the optical-axis direction, the disclosure is not limited thereto.

For example, the first magnet part and the second magnet part may be disposed such that the N pole of the first magnet part and the S pole of the second magnet part face the coil 120. However, the disclosure is not limited thereto, and the reverse disposition is also possible.

Although the first surface of each of the first and second magnet units 130-1 and 130-2 may be configured as a flat surface, the disclosure is not limited thereto. The first surface of each of the first and second magnet units 130-1 and 130-2 may be configured to have a curved surface, a sloped surface or a tapered surface.

For example, the first surface of each of the first and second magnet units 130-1 and 130-2 may be a surface that faces the outer surface of the bobbin 110 and/or the coil 120.

In another embodiment, at least one magnet unit may be disposed on at least one of other side portions 141-3 and 141-4 of the housing 140.

In a further embodiment, the magnet unit may be disposed on at least one of the corner portions of the housing 140 rather than being disposed on the side portions of the housing 140. For example, magnet units may be disposed on two corner portions of the housing 140, which are located opposite each other, or may be disposed on respective corner portions of the housing 140.

Next, the sensing magnet 180 and the balancing magnet 185 will be described.

The sensing magnet 180 may be disposed on the outer surface of the bobbin 110 that faces the position sensor 170, and the balancing magnet 185 may be disposed on another outer surface of the bobbin 110, opposite the outer surface of the bobbin 110 on which the sensing magnet 180 is disposed.

The sensing magnet 180 may be disposed on one of the third and fourth side portions 110$b$3 and 110$b$4 or the third and fourth outer surfaces of the bobbin 110, and the balancing magnet 185 may be disposed on the other of the third and fourth side portions 110$b$3 and 110$b$4 or the third and fourth outer surfaces of the bobbin 110.

For example, the sensing magnet 180 may be disposed on the third side portion 110$b$3, the third side surface or the third outer surface of the bobbin 110, and the balancing magnet 185 may be disposed on the fourth side portion 110$b$4, the fourth side surface or the fourth outer surface of the bobbin 110. For example, the sensing magnet 180 may be disposed in the groove 180$a$ in the bobbin 110, and the balancing magnet 185 may be disposed in a groove (not shown) formed in the fourth side portion 110$b$4 of the bobbin 110.

Although the sensing magnet 180 and the balancing magnet 185 are respectively disposed on the side portions 110$b$3 and 110$b$4 of the bobbin 110 in the embodiment shown in FIG. 1, the sensing magnet 180 and the balancing magnet 185 may be respectively disposed on the corner portions of the bobbin 110 in another embodiment. For example, in the embodiment shown in FIG. 18, a second magnet 1230 and a third magnet 1240 are respectively disposed on the corners of the bobbin 1210, and the description of the second magnet 1230 and the third magnet 1240 may be applied to the sensing magnet and the balancing magnet shown in FIG. 1 with or without modification.

For example, although each of the sensing magnet 180 and the balancing magnet 185 may be configured to have the form of a polyhedron (for example, a hexahedron), a circular column, or a circular cylinder, the disclosure is not limited thereto.

Although the sensing magnet 180 (or the balancing magnet 185) may overlap the coil 120 in a direction that intersects the optical axis and is parallel to a line perpendicular to the optical axis, the disclosure is not limited thereto. In another embodiment, the sensing magnet 180 (or the balancing magnet 185) may not overlap the coil 120.

The sensing magnet 180 (or the balancing magnet 185) may be positioned inside the coil 120. Here, the inside of the coil 120 may be a direction toward the center of the bobbin 110 with respect to the coil 120. In other words, since the coil 120 is positioned outside the sensing magnet 180 and the balancing magnet 185, it is possible to increase the electromagnetic force between the coil 120 and the first and second magnet units 130-1 and 130-2.

Although a portion of one surface of the sensing magnet 180 mounted in the groove 180a in the bobbin 110 may project from the outer surface of the bobbin 110, the disclosure is not limited thereto. In another embodiment, the portion may not project from the outer surface of the bobbin 110.

For example, the sensing magnet 180 may be fitted into the groove 180a through the opening in the groove 180a, which is formed in the lower surface of the bobbin 110. For example, the sensing magnet 180 may be fixed or attached to the groove 180a in the bobbin 110 using an adhesive such as epoxy.

Each of the sensing magnet 180 and the balancing magnet 185 may be a monopolar magnetized magnet, which is disposed such that the upper portion thereof has an N pole and the lower portion thereof has an S pole. However, the disclosure is not limited thereto, and the polarities may be arranged in the opposite manner.

For example, each of the sensing magnet 180 and the balancing magnet 185 may be disposed such that the interface between the N pole and the S pole is parallel to a direction perpendicular to the optical axis. However, the disclosure is not limited thereto, and the interface between the N pole and the S pole may be parallel to the optical axis in another embodiment.

In another embodiment, each of the sensing magnet 180 and the balancing magnet 185 may be a bipolar magnetized magnet. The bipolar magnetized magnet may include a first magnet part including an N pole and an S pole, a second magnet part including an N pole and an S pole, and a nonmagnetic partition wall disposed between the first magnet part and the second magnet part.

By virtue of the electromagnetic force resulting from the interaction between the coil 120 and the magnet 130, the sensing magnet 180 may be moved together with the bobbin 110 in the optical-axis direction OA. At this time, the position sensor 170 may detect the intensity of the magnetic field of the sensing magnet 180, which is moved in the optical-axis direction, and may output an output signal corresponding to the detected intensity.

For example, a controller 830 of a camera module 200 or a controller 780 of an optical device 200A may sense or detect displacement of the bobbin 110 in the optical-axis direction using the output signal output from the position sensor 170.

The balancing magnet 185 may be disposed on the bobbin 110 so as to counteract the influence of the magnetic field of the sensing magnet 180 on the coil 120 and the magnet 130 and to attain weight equilibrium with respect to the AF operation unit.

At the initial position of the AF operation unit (for example, the bobbin 110), the position sensor 170 and the sensing magnet 180 may overlap each other at at least a portion thereof in a direction that intersects the optical axis and is perpendicular to the optical axis.

Furthermore, the first magnet unit 130-1 and the second magnet unit 130-2 may overlap each other in a direction that intersects the optical axis and is parallel to a line perpendicular to the optical axis and in a direction toward the second side portion 141-2 from the first side portion 141-1.

Next, the position sensor 170, the circuit board 190 and the capacitor 195 will be described.

The circuit board 190 and the position sensor 170 may be disposed on one of the side portions of the housing 140. For example, although the circuit board 190 and the position sensor 170 may be disposed on the side portion of the housing 140 at which the magnet 130 is not disposed, the disclosure is not limited thereto.

For example, the circuit board 190 and the position sensor 170 may be disposed on the third side portion 141-3, the third side surface, or the third outer surface of the housing 140 in order to avoid spatial interference with the magnet 130.

For example, the circuit board 190 may be disposed in the groove 25a formed in the third side portion 141-3 of the housing 140. At least a portion of the first surface 19a of the circuit board 190 may be in contact with the surface of the groove 25a in the housing 140.

The circuit board 190 may include a plurality of terminals (or "outer terminals") B1 to B6 to be conductively connected to the outside and terminals 91 and 92, which are conductively connected to the lower elastic member 160 and receive drive signals for driving the coil 120 from the position sensor 170.

For example, the circuit board 190 may be a PCB or an FPCB.

For example, the first and second terminals 91 and 92 may be formed on the first surface 19a of the circuit board 190, and the plurality of outer terminals B1 to B6 may be formed on the second surface 19b of the circuit board 190.

For example, although the plurality of outer terminals B1 to B2 may be arranged in a line at the lower end of the second surface 19b of the circuit board 190, the disclosure is not limited thereto. Here, the second surface 19b of the circuit board 190 may be a surface opposite the first surface 19a of the circuit board 190.

Although the circuit board 190 shown in FIG. 4B includes six outer terminals B1 to B6, the disclosure is not limited thereto.

The circuit board 190 may include a circuit pattern or a wire for conductively connecting the position sensor 190 to the terminals 91, 92 and B1 to B6.

The position sensor 170 may be mounted or disposed on a first surface 19a of the circuit board 190, and may be conductively connected to the circuit board 190.

For example, the position sensor 170 may be disposed inside the circuit board 190 disposed on the third side portion 141-1 of the housing 140. Here, the inside of the circuit board 180 may be the side toward the center of the housing 140 based on the circuit board 190.

The position sensor 170 may be disposed on the first seating portion 17a formed in the third side portion 141-3 of the housing 140.

At the initial position of the bobbin 110, the position sensor 170 disposed on the third side portion 141-3 of the housing 140 may overlap the sensing magnet 180, disposed on the bobbin 110, in a direction toward the fourth side portion 141-4 of the housing 140 from the third side portion 141-3 of the housing 140. However, the disclosure is not limited thereto, and the position sensor 170 may not overlap the sensing magnet 180 in another embodiment.

At the initial position of the bobbin 110, the position sensor 170 disposed on the housing 140 may overlap the coil 120 in the direction of the fourth side portion 141-4 of the housing 140 from the third side portion 141-3 of the housing 140. However, the disclosure is not limited thereto, and the position sensor 170 may not overlap the coil 120.

For example, at the initial position of the bobbin 110, the capacitor 195 disposed on the housing 140 may overlap the coil 120 in a direction toward the fourth side portion 141-4 of the housing 140 from the third side portion 141-3 of the housing 140. Here, the capacitor 195 may overlap a portion of the coil 120 disposed on the corner portion 110c1 of the bobbin 110 that corresponds to or faces the first corner portion 142-1 of the housing 140.

The sensor 170 disposed on the housing 140 may not overlap the first and second magnet units 130-1 and 130-2 in a direction toward the fourth side portion 141-4 of the housing 140 from the third side portion 141-3 of the housing 140.

The position sensor 170 may detect the intensity of the magnetic field of the third magnet 180 mounted on the bobbin 110 during movement of the bobbin 110, and may output a signal (for example, an output signal) corresponding to the result of the detection.

The position sensor 170 may be embodied as a Hall sensor alone, or may be embodied as a driver including a Hall sensor. The driver-type position sensor may include a temperature-sensing element.

For example, when the position sensor 170 is embodied as a Hall sensor, the position sensor 170 may include two input terminals, to which a drive signal or power is supplied, and two output terminals, through which a sensed voltage (or an output voltage) is output.

For example, when the position sensor 170 is a driver-type position sensor including a Hall sensor, the position sensor 170 may include first to fourth terminals for transmitting and receiving data to and from an external device through data communication using a protocol such as I2C communication and fifth and sixth terminals for supplying a drive signal to the coil 120.

For example, the driver of the position sensor 170 may receive power signals from the controller 830 or 780 via the first to fourth terminals, and may transmit and receive a clock signal and a data signal to and from the controller 830 or 780. For example, the power signals may include a ground power (GND) component and a predetermined power (VDD) component for driving the driver of the position sensor 170.

The capacitor 195 may be disposed on the first corner portion 142-1 of the housing 140. For example, the capacitor 195 may be disposed in the seating portion 17b in the housing 140.

The capacitor 195 may be disposed or mounted on the first surface 19a of the circuit board 190, and may be conductively connected to the circuit board 190.

The capacitor 195 may be of a chip type, and may include a first terminal conductively connected to one end thereof and a second terminal conductively connected to the other end thereof. The capacitor 195 may be alternatively referred to as a capacitive device or a condenser.

In another embodiment, the capacitor 195 may be embodied as being included in the circuit board 190. For example, the circuit board 190 may include a capacitor including a first conductive layer, a second conductive layer, and an insulation layer (for example, a dielectric layer) interposed between the first conductive layer and the second conductive layer.

The capacitor 195 may be conductively connected in parallel to the two terminals of the position sensor 170, through which the power signals are supplied.

For example, the capacitor 195 may be conductively connected in parallel to the outer terminals (for example, B1 and B2) of the circuit board 190, through which the power signals are supplied to the position sensor 170.

The capacitor 195 may be conductively connected in parallel to the two outer terminals B1 and B2 of the circuit board 190 so as to serve as a smoothing circuit for eliminating a ripple component contained in the power signals, which are supplied to the position sensor 170 from the outside, thereby providing the position sensor 170 with stable and constant power signals.

For example, the capacitor 195 is capable of inhibiting high-frequency noise component introduced from the outside or overcurrent caused by ESD or the like to be applied to the position sensor 170 and of inhibiting a phenomenon in which a calibration value relating to the displacement of the bobbin obtained based on the output signal of the position sensor 170 is reset due to the overcurrent.

Although the position sensor 170 is disposed on the housing 140 in the embodiment shown in FIG. 1, the position sensor may be disposed on the base 210 in another embodiment. For example, a sensor 1600 is disposed on the base 1400 in the embodiment shown in FIG. 18, and the description of the sensor 1600 shown in FIG. 18 may be applied to the embodiment shown in FIG. 1, with or without modification.

Furthermore, although the circuit board 190 is conductively connected to the position sensor 170 in the embodiment shown in FIG. 1, the circuit board 190 may be omitted in another embodiment. For example, in the embodiment shown in FIG. 18, the circuit board is not provided and the sensor 1600 is conductively connected to a terminal 450 disposed on the base 1400. The description of the sensor 1600 and the terminal 450 may be applied to the embodiment shown in FIG. 1.

Furthermore, although the first and second lower elastic members 160a and 160b, to which the first coil 120 is connected, are conductively connected to the circuit board 190, the disclosure is not limited thereto. In another embodiment, the circuit board 190 may be omitted, and each of the first and second lower elastic members may include a terminal portion, which is conductively connected to an external component. For example, in the embodiment shown in FIG. 18, the lower elastic member 1520 includes the terminal portion 1524, and the description of the terminal portion 1524 may be applied to the first and second lower elastic members 160a and 160b shown in FIG. 1 with or without modification.

Next, the upper elastic member 150 and the lower elastic member 160 will be described.

The upper elastic member 150 and the lower elastic member 160 may be coupled to the bobbin 110. For example, the upper elastic member 150 and the lower elastic member 160 may be coupled both to the bobbin 110 and to the housing 140 so as to support the bobbin 110.

For example, the upper elastic member 150 may be coupled both to the upper portion, the upper surface or the upper end of the bobbin 110 and to the upper portion, the upper surface or the upper end of the housing 140, and the lower elastic member 160 may be coupled both to the lower portion, the lower surface or the lower end of the bobbin 110 and to the lower portion, the lower surface or the lower end of the housing 140.

At least one of the upper and lower elastic members 150 and 160 may be divided or separated into two or more. For example, the lower elastic member 160 may include a first lower elastic unit 160a and a second lower elastic unit 106b, which are spaced apart from each other.

Although each of the upper elastic member 150 and the lower elastic member 160 may be embodied as a leaf spring, the disclosure is not limited thereto. Each of the upper and lower elastic members 150 and 160 may be embodied as a coil spring, a suspension wire, or the like.

Although the upper elastic member 150 is illustrated in FIG. 5 as having a single elastic unit, which is not divided, the disclosure is not limited thereto. In another embodiment, the upper elastic member may include a plurality of elastic units, and the plurality of elastic units may be conductively connected to the coil 120.

The upper elastic member 150 may include a first inner frame coupled to the upper portion, the upper surface or the upper end of the bobbin 110, a first outer frame coupled to the upper portion, the upper surface or the upper end of the housing 140, and a first frame connector connecting the first inner frame to the first outer frame. Here, the term "inner frame" may be interchangeably used with "inner portion", the term "outer frame" may be interchangeably used with "outer portion", and the term "frame connector" may be interchangeably used with "connector".

For example, although the first inner frame of the upper elastic member 150 may include first coupling frames 151-1 and 151-2, which are coupled to the bobbin 110, and first connecting frames 151-1a and 151-2a, which connect the first coupling frames 151-1 and 151-2 to each other, the disclosure is not limited thereto. In a first inner frame according to another embodiment, the first connecting frames may be omitted.

Although the first inner frame of the upper elastic member 150 includes two first coupling frames, which face each other, and two first connecting frames, which face each other, in the embodiment shown in FIG. 5, the disclosure is not limited thereto. The number of first coupling frames may be one or more, and the number of first connecting frames may be one or more.

Although the first outer frame of the upper elastic member 150 may include second coupling frames 152-1 to 152-4, which are coupled to the housing 140, and second connecting frames 152-1a to 152-4a, which connect the second coupling frames 152-1 to 152-4 to each other, the disclosure is not limited thereto. In a first outer frame according to another embodiment, the second connecting frames may be omitted.

In the embodiment shown in FIG. 5, although the first outer frame of the upper elastic member 150 includes four second coupling frames and four second connecting frames, the disclosure is not limited thereto. The number of second coupling frames may be one or more, and the number of second connecting frames may be one or more.

The upper elastic member 150 may include a plurality of first frame connectors 153-1 to 153-4. For example, although the upper elastic member 150 may include four first frame connectors 153-1 to 153-4, the disclosure is not limited thereto. The number of first frame connectors may be one or more.

The first frame connectors 153-1 to 153-4 may connect the first coupling frames 151-1 and 151-2 to the first outer frame.

For example, the first frame connectors 153-1 to 153-4 may connect the first coupling frames 151-1 and 151-2 of the first inner frame to two connecting frames 152-1a and 152-2a of the first outer frame, which face each other.

In another embodiment, the first frame connectors may connect the first coupling frames of the first inner frame to the second coupling frames of the first outer frame.

In a further embodiment, the first frame connectors may connect one of the first coupling frames and the first connecting frames of the first inner frame to one of the second coupling frames and the second connecting frames of the first outer frame.

Each of the first frame connectors 153-1 to 153-4 may be bent or curved (or rounded) at least once so as to define a predetermined pattern.

For example, each of the first frame connectors 153-1 to 153-4 may include a plurality of bent portions or curved portions.

The bobbin 110 may be flexibly (or elastically) supported through positional variation and fine deformation of the first frame connectors 153-1 to 153-4.

The first inner frame of the upper elastic member 150 may have formed therein a first hole 151a, to which the first coupler 113 of the bobbin 110 is coupled, and the first outer frame may have formed therein a second hole 152a, to which the first coupler 144 of the housing 140 is coupled. Although each of the hole 151a and 152a may have a slit connected thereto, no slit may be formed in another embodiment.

For example, although the first couplers 144, each of which has the form of a protrusion, may be positioned at the corner portions 142-1 to 142-4 of the housing 140 so as to be spaced apart from the protrusions 144-1 to 144-4, the disclosure is not limited thereto. The height of the upper ends or the upper surfaces of the protrusions 144-1 to 144-4 may be higher than the height of the first protrusion-shaped couplers 144. In another embodiment, the height of the upper ends or the upper surfaces of the protrusions 144-1 to 144-4 may be equal to or lower than the height of the first protrusion-shaped couplers 144.

The diameter of each of the protrusions 144-1 to 144-4 or the cross-sectional area of each of the protrusions 144-1 to 144-4, which is taken in a direction perpendicular to the optical axis, may be larger than the diameter of each of the couplers 144 or the cross-sectional area of each of the couplers 144, which is taken in a direction perpendicular to the optical axis. In another embodiment, the diameter of each of the protrusions 144-1 to 144-4 or the cross-sectional area of each of the protrusions 144-1 to 144-4, which is taken in a direction perpendicular to the optical axis, may be equal to or smaller than the diameter of each of the couplers 144 or the cross-sectional area of each of the couplers 144, which is taken in a direction perpendicular to the optical axis.

For example, the first hole 151a may be formed in the first coupling frames 151-1 and 151-2, and the second hole 152a may be formed in the second coupling frames 152-1 to 152-4.

At least a portion of the upper elastic member 150 may be symmetrical relative to a first axis 601, and the position sensor 170 and/or the sensing magnet 180 may be disposed in the direction of a second axis 602.

Furthermore, at least a portion of the lower elastic member may be symmetrical based on the first axis 601, and the position sensor 170 and/or the sensing magnet 180 may be disposed in the direction of the second axis 602.

The first frame connectors 153-1 to 153-4 may be symmetrical, line-symmetrical or bilaterally symmetrical based on the first axis 601.

Furthermore, the first frame connectors 153-1 to 153-4 may not be disposed so as to be rotationally symmetrical based on the center of the upper elastic member 150.

For example, the first axis 601 may be an axis that extends through the center of the upper elastic member 150 in a direction that is perpendicular to the optical axis OA and is parallel to the direction toward the second side portion 141-2 from the first side portion 141-1 of the housing 140. For example, the center 201 of the upper elastic member 150 may be the spatial center of the upper elastic member 150 when viewed from above. For example, the center 201 may be the center of the disposition or arrangement structure of the first frame connectors 153-1 to 153-4 when the upper elastic member 150 is viewed from above.

In another embodiment, the center 201 may be the center of the housing 140, and may be the spatial center with respect to the four sides or side portions of the housing 140. For example, the center 201 may be the point at which a first line intersects a second line.

For example, the first line may be a line that extends between the centers of two side portions 141-1 and 141-2 of the housing 140, which face each other, and the second line may be a line that extends between the centers of the two other side portions 141-3 and 141-4 of the housing 140, which face each other.

In another embodiment, the first line may be a line that extends between two corners 142-1 and 142-2 (or the protrusions 143 of the two corners 142-1 and 142-2) of the housing 140, which face each other, and the second line may be a line that extends between the two other corners 142-3 and 142-4 (or the protrusions 143 of the two other corners 142-3 and 142-4, which face each other.

For example, the first axis 601 may be an axis that is parallel to a direction toward the second of first coupling frame 151-2 from the first of first coupling frame 151-1. For example, the first axis 601 may be an axis that is parallel to the X-axis in FIG. 5.

For example, although the first coupling frames 151-1 and 151-2 may be bilaterally symmetrical based on the first axis 601, the disclosure is not limited thereto. In another embodiment, the first coupling frames may not be bilaterally symmetrical based on the first axis.

For example, although the second coupling frames 152-1 to 152-4 may be bilaterally symmetrical based on the first axis 601, the disclosure is not limited thereto. In another embodiment, the second coupling frames may not be bilaterally symmetrical based on the first axis 601.

At least a portion of the upper elastic member 150 may be symmetrical based on the second axis 602. In another embodiment, the position sensor and/or the sensing magnet may be disposed in the direction of the second axis 601. Furthermore, at least a portion of the lower elastic member may be symmetrical based on the second axis 602.

For example, the upper elastic member 150 may be symmetrical, line-symmetrical or bilaterally symmetrical based on the second axis 602.

The first frame connectors 153-1 to 153-4 may be symmetrical, line-symmetrical or bilaterally symmetrical based on the second axis 602.

For example, the second axis 601 may be an axis that extends through the center 201 of the upper elastic member 150 in a direction that is perpendicular to the optical axis OA and is parallel to a direction toward the fourth side portion 141-4 from the third side portion 141-3 of the housing 140.

Furthermore, the second axis 602 may be an axis that extends through the center 201 of the upper elastic member 150 in a direction that is perpendicular both to the optical axis OA and to the first axis 601. For example, the second axis 602 may be an axis parallel to the Y-axis in FIG. 5.

In another embodiment, the positions and shapes of the first frame connectors may be different from those shown in FIG. 5. Accordingly, the first axis may be an axis that extends through the center 201 of the upper elastic member 150 in a direction that is perpendicular to the optical axis OA and parallel to a direction toward the second corner portion 142-2 from the first corner portion 142-1 of the housing 140, and the second axis may be an axis perpendicular to the first axis.

For example, although the first axis 601 may be parallel to line C-D in FIG. 2 and the second axis 602 may be parallel to line A-B in FIG. 2, the disclosure is not limited thereto.

For example, although the first coupling frames 151-1 and 151-2 may be symmetrical based on the second axis 601, the disclosure is not limited thereto. In another embodiment, the first coupling frames may not be bilaterally symmetrical based on the second axis.

For example, although the second coupling frames 152-1 to 152-4 may be bilaterally symmetrical based on the second axis 602, the disclosure is not limited thereto. In another embodiment, the second coupling frames may not be bilaterally symmetrical based on the second axis 602.

The upper elastic member 150 may be symmetrical, line-symmetrical or bilaterally symmetrical based on the second axis 602.

Although the upper elastic member 150 according to the embodiment shown in FIG. 5 may be bilaterally symmetrical with respect both to the first axis 601 and the second axis 602, the disclosure is not limited thereto.

In another embodiment, the first frame connectors of the upper elastic member may be symmetrical, line-symmetrical or bilaterally symmetrical relative to at least one of the first axis 601 and the second axis 602.

For example, the first frame connectors of the upper elastic member may be symmetrical, line-symmetrical or bilaterally symmetrical relative to one of the first axis 601 and the second axis 602 but may not be symmetrical, line-symmetrical or bilaterally symmetrical based on the other of the first axis 601 and the second axis 602.

In another embodiment, the first coupling frames of the upper elastic member may be symmetrical, line-symmetrical or bilaterally symmetrical relative to at least one of the first axis 601 and the second axis 602.

For example, the first coupling frames may be symmetrical, line-symmetrical or bilaterally symmetrical relative to one of the first axis 601 and the second axis 602 but may not be symmetrical, line-symmetrical or bilaterally symmetrical based on the other of the first axis 601 and the second axis 602.

In a further embodiment, the second coupling frames of the upper elastic member may be symmetrical, line-symmetrical or bilaterally symmetrical relative to at least one of the first axis 601 and the second axis 602.

For example, the second coupling frames may be symmetrical, line-symmetrical or bilaterally symmetrical relative to one of the first axis 601 and the second axis 602 but may not be symmetrical, line-symmetrical or bilaterally symmetrical based on the other of the first axis 601 and the second axis 602.

In a further embodiment, the first connecting frames of the upper elastic member may be symmetrical, line-symmetrical or bilaterally symmetrical relative to at least one of the first axis 601 and the second axis 602.

For example, the first connecting frames may be symmetrical, line-symmetrical or bilaterally symmetrical relative to one of the first axis 601 and the second axis 602 but may not be symmetrical, line-symmetrical or bilaterally symmetrical based on the other of the first axis 601 and the second axis 602.

In a further embodiment, the second connecting frames of the upper elastic member may be symmetrical, line-symmetrical or bilaterally symmetrical relative to at least one of the first axis 601 and the second axis 602.

For example, the second connecting frames may be symmetrical, line-symmetrical or bilaterally symmetrical relative to one of the first axis 601 and the second axis 602 but may not be symmetrical, line-symmetrical or bilaterally symmetrical based on the other of the first axis 601 and the second axis 602.

In FIG. 5, the length L1 of the upper elastic member 150 in a direction parallel to the first axis 601 may be less than the length L2 of the upper elastic member 150 in a direction parallel to the second axis 602 (L1<L2). In another embodiment, the length L1 of the upper elastic member 150 in a direction parallel to the first axis 601 may be equal to or greater than the length L2 of the upper elastic member 150 in a direction parallel to the second axis 602. For example, the length L1 may be the length of each of the second coupling frames 152-1 and 152-2, and the length L2 may be the length of each of the second coupling frames 152-3 and 152-4.

Because the circuit board 190 is disposed on the third side portion 141-3 of the housing 140 and the first and second magnet units 130-1 and 130-2 are respectively disposed on the first and second side portions 141-1 and 141-2 of the housing 140, the length L2 may be greater than the length L1 (L2>L1). The reason for this is to inhibit the lengths of the first and second magnet units 130-1 and 130-2 from being limited.

Although the lower elastic member 160 may include a plurality of lower elastic units, the disclosure is not limited thereto. In another embodiment, the lower elastic member 160 may be embodied as a single elastic unit, which is not divided.

For example, the lower elastic member 160 may include a first lower elastic unit 160a and a second lower elastic unit 160b.

The first and second lower elastic units 160a and 160b may be coupled to the bobbin 110. Alternatively, the first and second lower elastic units 160a and 160b may be coupled both to the bobbin 110 and to the housing 140.

The first and second lower elastic units 160a and 160b may be disposed between the bobbin 110 and the base 210.

At least one of the first and second lower elastic units 160a and 160b may include the second inner frame 161-1, 161-2 coupled to the lower portion, the lower surface or the lower end of the bobbin 110, the second outer frame 162-1, 162-2 coupled to the lower portion, the lower surface or the lower end of the housing 140, and the second frame connector 163-1, 163-2, connecting the second inner frame 161-1, 161-2 to the second outer frame 162-1, 162-2.

The second inner frame 161, 161-2 of at least one of the first and second lower elastic units 160a and 160b may have formed therein a hole 161a for coupling the second coupling portion 117 of the bobbin 110 using solder or a conductive adhesive member.

The second outer frame 162-1, 162-2 of at least one of the first and second lower elastic units 160a and 160b may have formed therein a hole 162a for coupling the second coupler 147 of the housing 140.

For example, by means of solder or a conductive member, one end of the coil 120 may be connected to one end of the second inner frame 161-1 of the first lower elastic unit 160a, and the other end of the coil may be connected to one end of the second inner frame 161-2 of the second lower elastic unit 160b.

For example, the second inner frame 161-1 of the first lower elastic unit 160a may be provided with a bonding portion 65a, to which one end of the coil 120 is coupled, and the second inner frame 161-2 of the second lower elastic unit 160b may be provided with a bonding portion 65b, to which the other end of the coil 120 is coupled.

For example, each of the bonding portions 65a and 65b of the first and second lower elastic units 160a and 160b may have a fitting groove for guiding the coil 120.

The second outer frame 162-1 of the first lower elastic unit 160a may be provided with a first bonding portion 62a, to which a first terminal 91 of the circuit board 190 is coupled.

For example, the first bonding portion 62a may be positioned at one end of the second outer frame 162-1 of the first lower elastic unit 160a disposed on the third side portion 141-3 of the housing 140.

For example, the second outer frame 162-1 of the first lower elastic unit 160a may include a first extended portion 61a, which extends toward the third side portion 141-3 from the first corner portion 142-1 of the housing 140, and the first bonding portion 62a may be provided at one end of the first extended portion 61a.

For example, the first bonding portion 62a may be positioned at the lower surface of the third side portion 141-3 of the housing 140 or below the lower portion of the third side portion 141-3 of the housing 140. For example, the first bonding portion 62a may project toward the circuit board 190 from the outer surface of the second outer frame 162-1 of the first lower elastic unit 160a, positioned at the third side portion 141-3, so as to be easily coupled to the first terminal 91 of the circuit board 190.

The second outer frame 162-2 of the second lower elastic unit 160b may be provided with a second bonding portion 62b, to which the second terminal 92 of the circuit board 190 is coupled.

For example, the second bonding portion 62b may be disposed on one end of the second outer frame 162-2 of the second lower elastic unit 160b, disposed on the third side portion 141-3 of the housing 140.

For example, the second outer frame 162-2 of the second lower elastic unit 160b may include the second extended portion 61b, which extends toward the third side portion 141-3 from the fourth corner portion 142-4 of the housing 140, and the second bonding portion 62b may be provided at one end of the second extended portion 61b.

For example, the second bonding portion 62b of the second lower elastic unit 160b may be spaced apart from the first bonding portion 62a of the first lower elastic unit 160a, and may be disposed on one end of the second outer frame 162-2 of the second lower elastic unit 160a adjacent to the third side portion 141-3 of the housing 140.

For example, the second bonding portion 62b may be positioned at the lower surface of the third side portion 141-3 of the housing 140 or below the lower portion of the third side portion 141-3 of the housing 140. For example, the second bonding portion 62b may project toward the circuit board 190 from the outer surface of the second outer frame 162-2 of the second lower elastic unit 160b positioned at the third side portion 141-3 so as to be easily coupled to the second connection terminal 92 of the circuit board 190.

The coil 120 may be conductively connected to the first and second terminals 91 and 92 of the circuit board 190 via the first lower elastic unit 160a and the second lower elastic unit 160b.

The drive signal may be supplied to the coil 120 via the first and second terminals 91 and 92 of the circuit board 190 and the first and second lower elastic units 160a and 160b.

The second frame connectors 163-1 and 163-2 of the lower elastic member 160 may be bent or curved (or may be formed into a curved line) at least once so as to define a predetermined pattern. The bobbin 110 may be flexibly (or elastically) supported through changes in position and fine deformation of the first and second frame connectors.

In order to absorb and dampen oscillations of the bobbin 110, the lens moving apparatus 100 may further include a damper (not shown) disposed between the upper elastic member 150 and the housing 140.

The damper (not shown) may be disposed in the space between the first frame connectors 153-1 to 153-4 of the upper elastic member 150 and the bobbin 110 and/or the housing 140.

For example, the dampers 53A to 53D may be disposed between the first frame connectors 153-1 to 153-4 and the housing 140.

For example, the dampers 53A to 53D may be disposed between the first frame connectors 153-1 to 153-4 and the protrusions 144-1 to 144-4 of the housing 140.

For example, at least portions of the dampers 53A to 53D may be disposed in the escape groove 25 in the housing 140.

For example, a damper (not shown) may also be disposed between the inner surface of the housing 140 and the outer surface of the bobbin 110 in another embodiment.

Next, the base 210 will be described.

Referring to FIG. 7, the base 210 may have a bore 29 corresponding to the bore in the bobbin 110 and/or the bore in the housing 140, and may have a shape corresponding to or coinciding with that of the cover member 300, for example, a square shape.

The base 210 may include a step 211 at the lower end of the side surface thereof, to which an adhesive is applied when the cover member 300 is secured to the base 210 via adhesion. Here, the step 211 may guide the cover member 300, which is coupled to the upper side of the base, and may face the lower end of the side plate 302 of the cover member 300. An adhesive member and/or a sealing member may be disposed or applied between the lower end of the side plate of the base 210 and the step 211 of the base 210.

The base 210 may be disposed below the bobbin 110 and the housing 140.

For example, the base 210 may be disposed below the lower elastic member 160.

The projection 216, which corresponds to the guide groove 148 in the housing 140, may be provided at a corner of the upper surface of the base 210. Although the projection 216 may have the form of a polygonal column, which projects perpendicularly from the upper surface of the base 210, the disclosure is not limited thereto. The projection 216 may alternatively be referred to as a column.

The projection 216 may be fitted into the guide groove 148 in the housing 140, and may be fastened or coupled to the guide groove 148 using an adhesive member (not shown) such as epoxy or silicone.

In order to inhibit the lower surface or the lower end of the bobbin 210 from directly colliding with the upper surface of the base 210 in the event of occurrence of an external impact, the base 210 may include a stopper (not shown) projecting from the upper surface thereof, and the stopper of the base may be disposed so as to correspond to the projection of the base, without being limited thereto.

In order to avoid spatial interference between the bobbin 110 and the lower elastic member 160, the stoppers of the base 210 may be positioned higher than the second frame connectors 163 of the lower elastic units 160a and 160b coupled to the base 210.

The base 210 may include a seating groove 210a formed in the side surface corresponding to the side portion (for example, 141-3) of the housing 140, at which the circuit board 190 is disposed, so as to allow the lower end of the circuit board 190 to be seated in the seating groove 210a. The seating groove 210a in the base 210 may be configured to be depressed from the outer surface of the side portion of the base 210 corresponding to the side portion (for example, 141-3) of the housing 140.

For example, the terminals B1 to B6 of the circuit board 190 may be disposed on the lower end of the second surface 19b of the circuit board 190, and may be positioned in the seating groove 210a in the base 210.

The base 210 may have therein grooves 22a and 22b configured to inhibit spatial interference with the bonding portions 62a and 62b of the first and second lower elastic units 160a and 160b disposed on the base 210 and to make it easy to perform soldering. The grooves 22a and 22b in the base 210 may have a form depressed from the upper surface of the base 210, and may be connected to the seating groove 210a. However, the disclosure is not limited thereto, and the grooves 22a and 22b may not be connected to the seating groove 210a.

For example, the seating groove 210a in the base 210 may be provided with a protrusion 36 for supporting the circuit board 190. In another embodiment, the protrusion may be omitted.

The protrusion 36 of the base 210 may be configured to project from the bottom of the seating groove 210a so as to support a portion of the circuit board 190, for example, a portion of the lower end or the lower surface of the circuit board 190, without being limited thereto.

Next, the cover member 300 will be described.

The cover member 300 accommodates other components 110, 120, 130, 140, 150, 160a, 160b, 170, 180, 190 and 195 in the space defined between the cover member 300 and the base 210.

The cover member 300 may be configured to have a box shape, which is open at the lower face thereof and includes the upper plate 301 and the side plates 302. The lower ends of the side plates 302 of the cover member 300 may be coupled to the upper portion of the base 1210. The upper plate 301 of the cover member 300 may have a polygonal shape, for example, a square shape, an octagonal shape, or the like, and may have a bore through which a lens (not shown) is exposed to external light.

The cover member 300 may be made of a nonmagnetic material such as stainless steel or plastic in order to inhibit the cover member 1300 from being attracted to the magnets 130, and may be made of a magnetic material so as to serve as a yoke.

Referring to FIG. 9, the lens moving apparatus 100 may include a plurality of dampers 53A to 53D. Each of the plurality of dampers 53A to 53D may be disposed both at a corresponding one of the first frame connectors 153-1 to 153-4 of the upper elastic member 150 and at a corresponding one of the protrusions of the housing 140.

For example, the dampers 53A to 53D may be disposed both at portions of the first frame connectors 153-1 to 153-4 and at portions of the corner portions 142-1 to 142-4 of the housing 140.

For example, the dampers 53A to 53D may be disposed closer to the first outer frame than to the first inner frames 151-1, 151-2, 151-1a and 151-2a. In another embodiment, the dampers may be disposed closer to the first inner frames than to the first outer frame. In a further embodiment, the dampers may be disposed on locations that are spaced apart from the first inner frames 151-1, 151-2, 151-1a and 151-2a and the first outer frame by the same distance.

For example, each of the dampers 53A to 53D may be spaced apart from at least one of the first inner frames 151-1, 151-2, 151-1a and 151-2a and the first outer frame.

For example, the dampers 53A to 53D may be disposed closer to second connecting points than to first connecting points. For example, the first connecting points may be points at which the inner frame meets the connectors (for example, the frame connectors 153-1 to 153-4), and the second connecting points may be points at which the outer frame (for example, the coupling frames 152-1 to 152-4) meet the connector (for example, the frame connectors 153-1 to 153-4).

In another embodiment, the dampers 53A to 53D may be disposed closer to the first connecting points than to the second connecting points. In a further embodiment, the dampers may be disposed on locations, which are spaced apart from both the first connecting points and the second connecting points by the same distance.

For example, the dampers 53A to 53D may be disposed so as to be symmetrical, line-symmetrical or bilaterally symmetrical based on the first axis 601.

For example, the protrusions 144-1 to 144-4 of the housing 140 may be disposed so as to be symmetrical, line-symmetrical or bilaterally symmetrical based on the first axis 601.

For example, the dampers 53A to 53D may not be disposed so as to be rotationally symmetrical based on the center 201 of the upper elastic member 150. For example, the dampers 53A to 53D may be disposed so as not to be rotationally symmetrical by 90 degrees based on the center 201 of the upper elastic member 150.

For example, the protrusions 144-1 to 144-4 of the housing 140 may not be disposed so as to be rotationally symmetrical based on the center 201 of the upper elastic member 150. For example, the protrusions 144-1 to 144-4 of the housing 140 may be disposed so as not to be rotationally symmetrical by 90 degrees based on the center 201 of the upper elastic member 150.

For example, the dampers 53A to 53D may be disposed so as to be symmetrical, line-symmetrical or bilaterally symmetrical based on the second axis 602.

For example, the protrusions 144-1 to 144-4 of the housing 140 may be disposed so as to be symmetrical, line-symmetrical or bilaterally symmetrical based on the second axis 602.

Although each of the dampers 53A to 53D is represented as having a circular shape in FIG. 9, the damper is not limited to the shape, and may be embodied so as to have any of various shapes.

The first axis 601 and the second axis 602 may define a plane perpendicular to the optical axis OA. Here, the plane may be divided into first to fourth quadrants 101 to 104 by the first axis 601 and the second axis 602. The sequence of the quadrants shown in FIG. 9 is merely an example, and the quadrants may be defined in another sequence.

The dampers 53A to 53D may be disposed in at least one of the first to fourth quadrants 101 to 104. For example, at least one damper may be disposed in each of the first to fourth quadrants 101 to 104.

For example, the dampers 53B and 53c, which are disposed in the first and fourth quadrants 101 and 104, may be disposed on locations corresponding to the locations of the dampers 54A and 54D, which are disposed in the second and third quadrants 102 and 103, in a direction parallel to the first axis 601.

For example, the dampers 53B and 53A, which are disposed in the first and second quadrants 101 and 102, may be disposed on locations corresponding to the locations of the dampers 54D and 54C, which are disposed in the third and fourth quadrants 103 and 104, in a direction parallel to the second axis 602.

The plane, which is defined by the first axis 601 and the second axis 602, may include first to fourth sides S1 to S4.

For example, the first side S1 may be a side corresponding to the first side portion 141-1 of the housing 140, and the second side S2 may be a side corresponding to the second side portion 141-2 of the housing 140. Furthermore, the third side S3 may be a side corresponding to the third side portion 141-3 of the housing 140, and the fourth side S4 may be a side corresponding to the fourth side portion 141-4 of the housing 140. The first side S1 and the second side S2 may face each other in a direction parallel to the first axis 601, and the third side S3 and the fourth side S4 may face each other in a direction parallel to the second axis 602.

Each of the dampers 53A to 53D may be disposed close to one of two sides included in each of the quadrants 101 to 104. For example, the dampers 53A to 53D may be disposed closer to the third side S3 and the fourth side S4 than to the first side S1 and the second side S3. In another embodiment, the dampers may be disposed closer to the first side S1 and the second side S2 than to the third side S3 and the fourth side S4.

In another embodiment, each of the dampers 53A to 53D may be disposed on a location spaced apart from two sides included in each of the quadrants 101 to 104 by the same distance.

Each of the protrusions 144-1 to 144-4 of the housing 140 may be disposed adjacent to one of the two sides of a corresponding one of the quadrants 101 to 104. For example, the protrusions 144-1 to 144-4 may be disposed closer to the third side S3 and the fourth side S4 than to the first side S1 and the second side S2. In another embodiment, the protrusions may be disposed closer to the first side S1 and the second side S2 than to the third side S3 and the fourth side S4.

In another embodiment, each of the protrusions 144-1 to 144-4 may be disposed on a location that is spaced apart from both sides of a corresponding one of the quadrants 101 to 104 by the same distance.

For example, the damper 53B may be disposed closer to the fourth side S4 than to the second side S2, among the second side S2 and the fourth side S4, which are included in the first quadrant, and the damper 53A may be disposed closer to the fourth side S4 than to the first side S1, among the first side S1 and the fourth side S4, which are included in the second quadrant.

Furthermore, the damper 53D may be disposed closer to the third side S3 than to the first side S1, among the first side S1 and the third side S3, which are included in the third quadrant, and the damper 53C may be disposed closer to the third side S3 than to the second side S2, among the second side S2 and the third side S3, which are included in the fourth quadrant.

Referring to FIGS. 5 and 9, the length L3 of the rectangular bore 29 in the base 210 in a direction parallel to the first axis 601 may be greater than the length L4 of the bore 29 in the base 210 in a direction parallel to the second axis 601 (L3>L4).

Furthermore, the length L3 may be less than the length L1, and the length L4 may be less than the length L2.

In FIG. 9, the bore 29 in the base 210 may be positioned inside or in the inner area in the second coupling frames 152-1 to 152-4 of the upper elastic member 150.

Figure 10A:
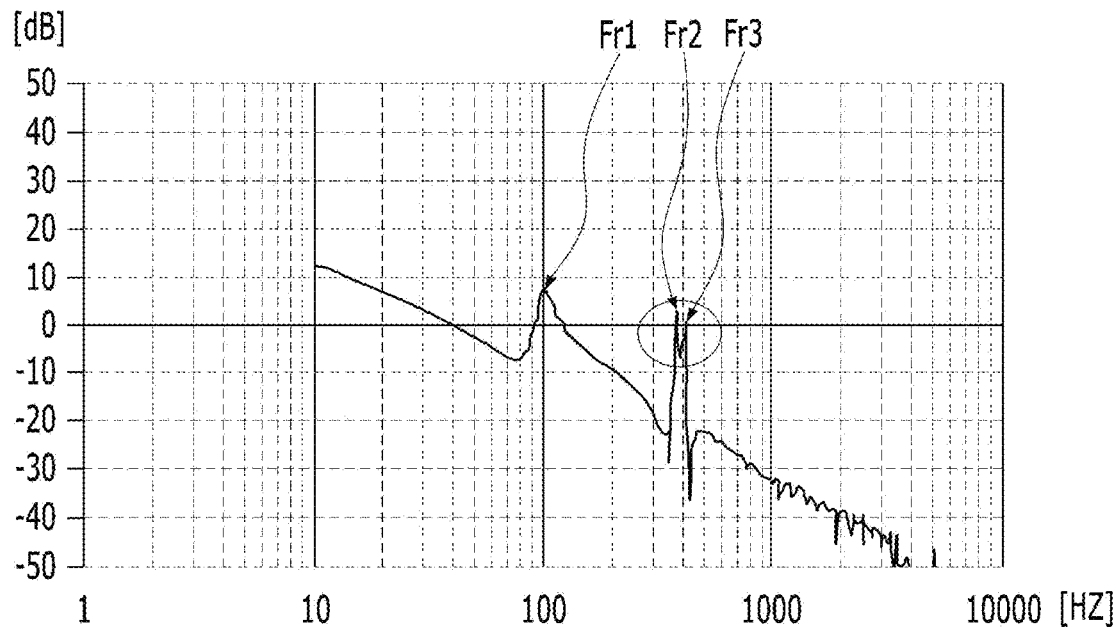
FIG. 10A illustrates frequency response characteristics in the case in which the elastic members and the dampers are rotationally symmetrical.
Figure 10B:
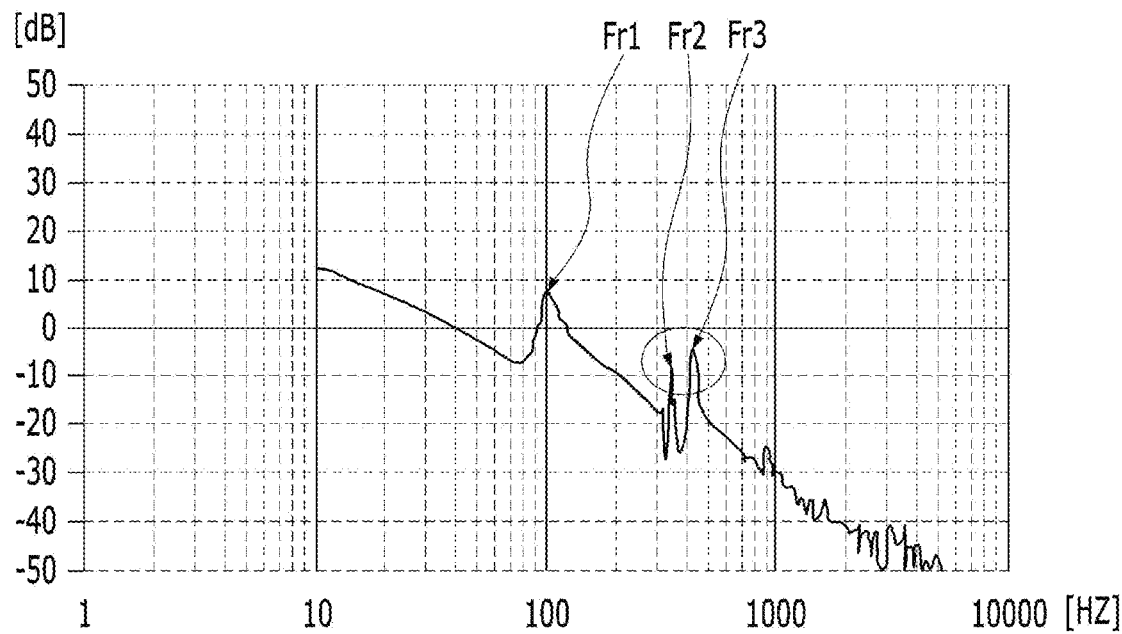
FIG. 10B illustrates the frequency response characteristics in the case in which the elastic members and the dampers according to the embodiment are provided.

FIG. 10A illustrates the frequency response characteristics in the case in which the elastic members and the dampers are rotationally symmetrical. FIG. 10B illustrates the frequency response characteristics in the case in which the elastic members and the dampers according to the embodiment are provided.

In FIGS. 10A and 10B, the frequency response characteristics may be frequency response characteristics as a function of a drive signal applied to the drive coil and the output of the position sensor. For example, the drive coil may correspond to the coil 120 in the embodiment, and the output of the position sensor may correspond to the output of the position sensor 170 in the embodiment. Each of FIGS. 10A and 10B may illustrate frequency response characteristics as a function of gain. Here, the gain may relate to the input and the output. For example, the input may be a drive signal, and the output may be the output of the position sensor.

In each of FIGS. 10A and 10B, the elastic force of the elastic member in a direction parallel to the first axis 601 (for example, the X-axis direction) and the elastic force of the elastic member in a direction parallel to the second axis 602 (for example, the Y-axis direction) may be the same as or similar to each other.

In FIGS. 10A and 10B, Fr1 denotes a first resonant frequency, Fr2 denotes a second resonant frequency, and Fr3 denotes a third resonant frequency.

In FIGS. 10A and 10B, the first resonant frequency Fr1 may relate to a movement or shift mode of the lens moving apparatus in the direction of the optical axis OA, and the second and third resonant frequencies Fr2 and Fr3 may relate to a tilt or shift mode of the lens moving apparatus in the X-axis direction and/or Y-axis direction.

In FIG. 10A, it will be appreciated that the second resonant frequency and the third resonant frequency are positioned near each other. For example, the difference between the second resonant frequency and the third resonant frequency in FIG. 10A may be lower than 50 Hz. Hence, because the first peak value of gain in the second resonant frequency and the second peak value of gain in the third resonant frequency in the range near the second and third resonant frequencies are added to each other, there may be a high risk of oscillations of the lens moving apparatus.

For example, although the first peak value may be higher than the second peak value in FIG. 10A, the disclosure is not limited thereto. In another embodiment, the reverse relationship may be possible.

In FIG. 10A, the peak value of gain in the second resonant frequency and the peak value of gain in the third resonant frequency may be 0 dB or higher.

Meanwhile, in FIG. 10B, the difference between the second resonant frequency and the third resonant frequency may be 50 Hz or higher. For example, each of the second resonant frequency and the third resonant frequency in FIG. 10B may range from 180 Hz to 500 Hz.

The first peak value of gain in the second resonant frequency and the second peak value of gain in the third resonant frequency in FIG. 10B may be less than the first peak value of gain in the second resonant frequency and the second peak value of gain in the third resonant frequency in FIG. 10A. Accordingly, compared to FIG. 10A, it may be easy to perform proportional integral derivation (PID) control with regard to the position sensor 170 for controlling the gain in FIG. 10B.

For example, the first peak value of gain in the second resonant frequency and the second peak value of gain in the third resonant frequency in FIG. 10B may be lower than 0 dB.

For example, although the second peak value may be higher than the first peak value in FIG. 10B, the disclosure is not limited thereto. In another embodiment, the reverse relationship may be possible.

Because the embodiment is constructed such that the upper elastic member 150 and the dampers 15A to 53D are not rotationally symmetrical but are line-symmetrical (or bilaterally symmetrical) relative to the first axis 601 or the second axis 602, the first elastic force and the second elastic force may be asymmetrically applied to the AF operation unit (for example, the bobbin 110). By virtue of the asymmetrical elastic force, it is possible to increase the interval (or the difference) between the second and third resonant frequencies of the frequency response characteristics of the AF operation unit, and thus it is possible to inhibit or suppress oscillation of the lens moving apparatus during AF operation.

Here, the first elastic force may be the elastic force of the upper elastic member 150, which is applied to the AF operation unit (for example, the bobbin 110) in a direction parallel to the first axis 601 (for example, the X-axis direction), and the second elastic force may be the elastic force of the upper elastic member 150, which is applied to the AF operation unit (for example, the bobbin 110) in a direction parallel to the second axis 602 (for example, the Y-axis direction).

Figure 11:
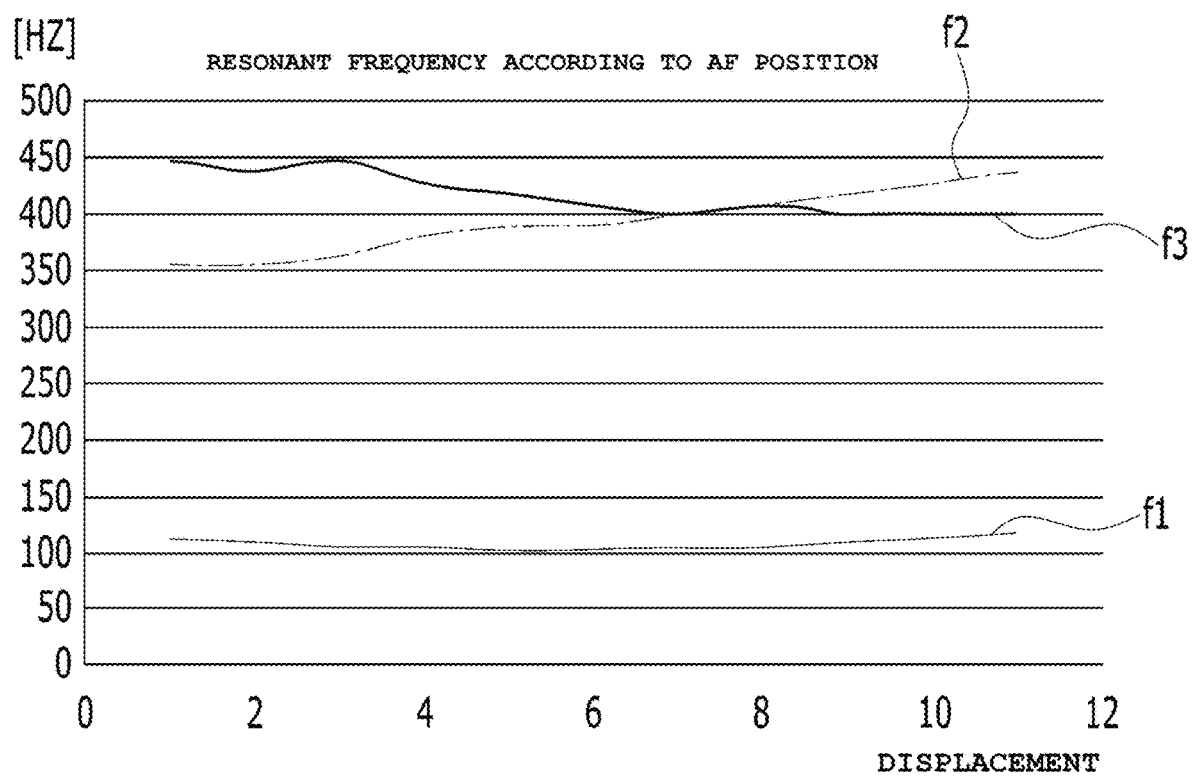
FIG. 11 illustrates the first to third resonant frequencies according to displacement of the bobbin or the position of the bobbin in the optical-axis direction caused by AF operation.

FIG. 11 illustrates the first to third resonant frequencies f1, f2 and f3 according to displacement of the bobbin or the position of the bobbin in the optical-axis direction caused by AF operation.

Referring to FIG. 11, the first resonant frequency according to the position of the bobbin has an almost constant value. The second resonant frequency and the third resonant frequency may intersect each other at a specific position, and then the interval between the frequencies may increase. The peak value of gain in the area at which the second resonant frequency and the third resonant frequency intersect each other may increase, and there may be a high risk of oscillation due to a deficient gain margin.

In the case shown in FIG. 10A, because the interval (or the difference) between the second resonant frequency and the third resonant frequency according to the position of the bobbin shown in FIG. 11 is small, there is a high risk of oscillation during AF operation. In contrast, in the case shown in FIG. 10B, because the interval (or the difference) between the second resonant frequency and the third resonant frequency according to the position of the bobbin is large, it is possible to inhibit and suppress oscillation during AF operation.

Figure 12:
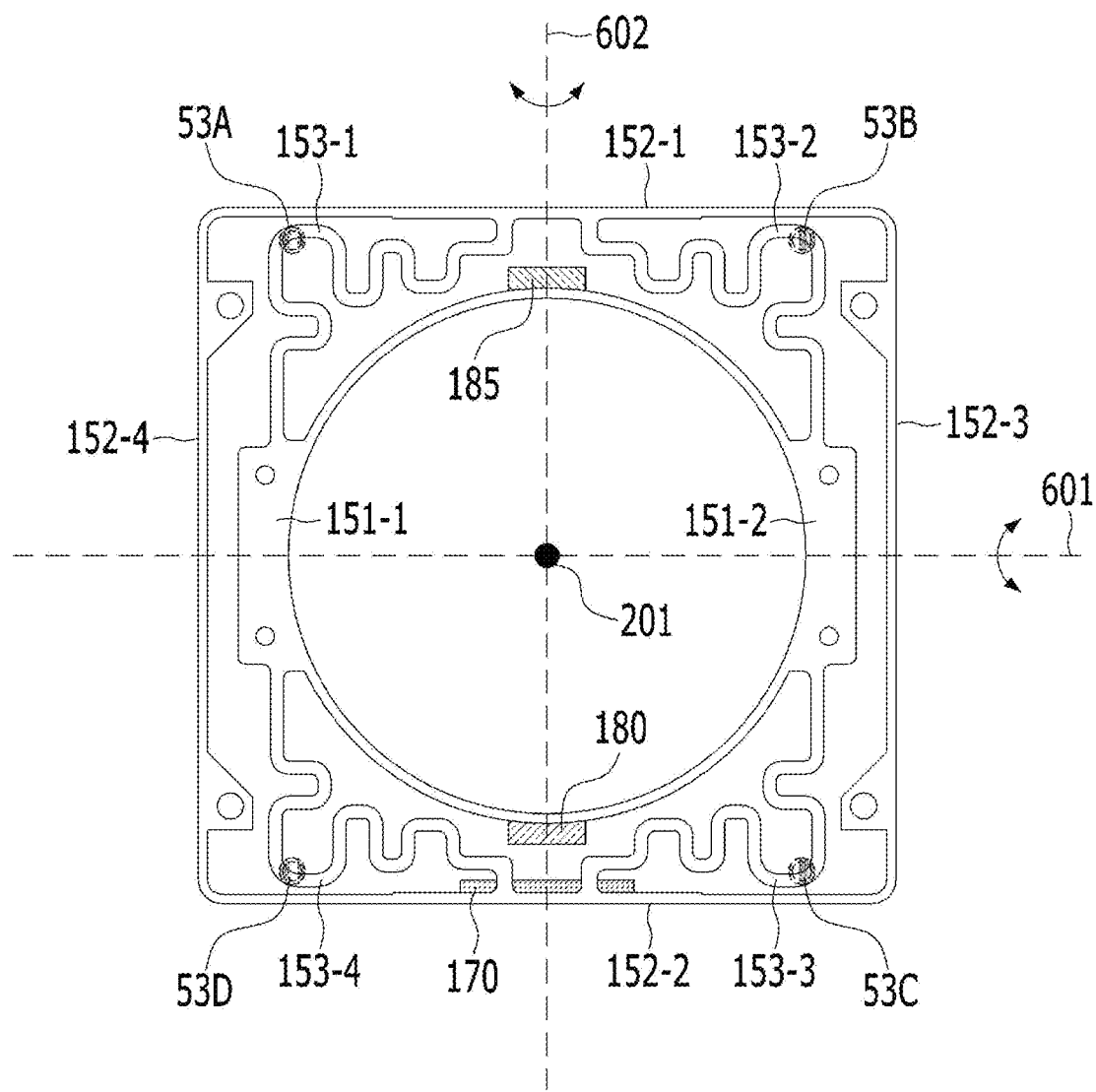
FIG. 12 illustrates an example of disposition of the sensing magnet and the position sensor.
Figure 13:
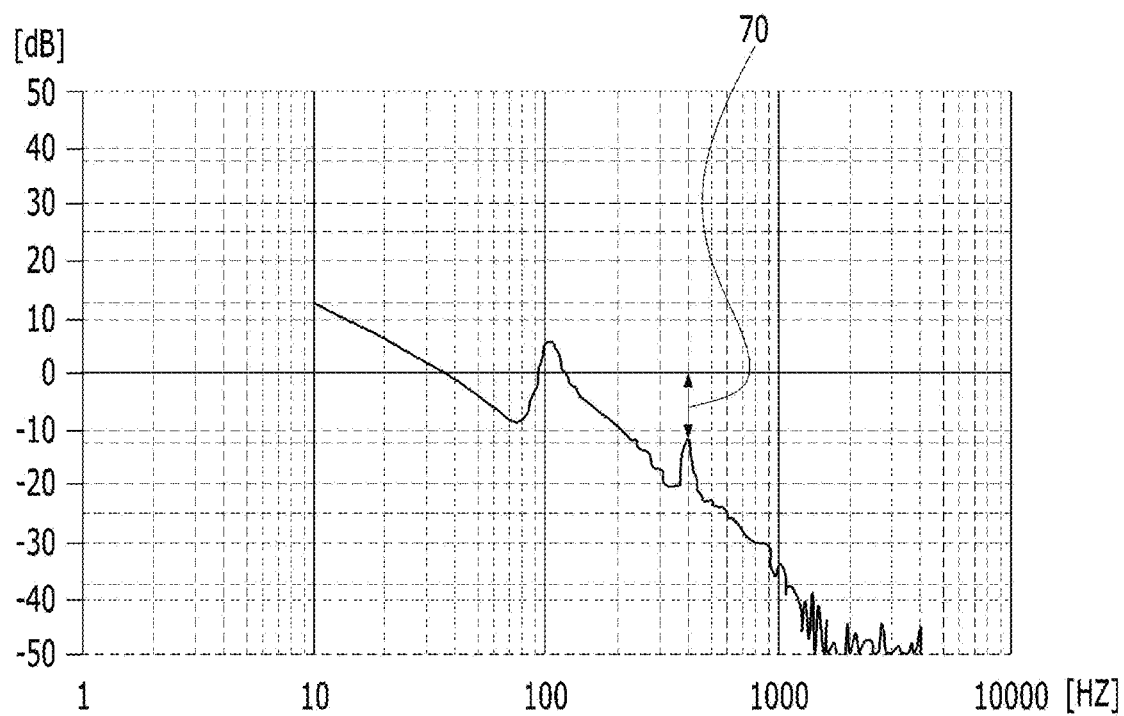
FIG. 13 illustrates frequency response characteristics of gain in the case shown in FIG. 12.

FIG. 12 illustrates an example of disposition of the sensing magnet 180 and the position sensor 170. FIG. 13 illustrates frequency response characteristics of gain in the case shown in FIG. 12. The frequency response characteristics of gain in the case shown in FIG. 12 may be frequency response characteristics as a function of a drive signal applied to the drive coil and the output of the position sensor, which are described in FIG. 10B.

Referring to FIGS. 12 and 13, the sensing magnet 180 may be disposed so as to be aligned with or correspond to the second axis 602. The position sensor 170 may be disposed so as to be aligned with or correspond to the second axis 602. By virtue of this disposition, it is possible to reduce the influence of tilting of the AF operation unit on the output of the position sensor 170, and thus it is possible to decrease the peak value of gain in the second and third resonant frequencies, among the frequency response characteristics shown in FIG. 10B.

For example, the center of the sensing magnet 180 may be aligned with or correspond to the second axis 602. The center of the position sensor 170 may be aligned with or correspond to the second axis 602.

For example, when the sensing magnet is viewed from the front, the center of the sensing magnet 180 may be the spatial center of the sensing magnet 180. For example, when the position sensor 170 is viewed from the front, the center of the position sensor 170 may be the spatial center of the position sensor 170.

As illustrated in FIG. 13, because the peak values of gain in the second and third resonant frequencies decrease, the gain margin 70 is increased, thereby inhibiting or suppressing oscillation of the lens moving apparatus during AF operation.

In the disposition of the sensing magnet 180 and the position sensor 170 shown in FIG. 12, the case of tilting relative to the first axis is referred to as "CASE 1", and the case of tilting relative to the second axis is referred to as "CASE 2".

Here, tilting relative to the first axis means that the AF operation unit is tilted relative to the first axis 601, and tilting relative to the second axis means that the AF operation unit is tilted relative to the second axis 602.

In CASE 1, positional variation of the sensing magnet 180 in the optical-axis direction due to the tilting relative to the first axis has an influence on the output value of the position sensor 170. Meanwhile, in CASE 2, the distance between the sensing magnet 180 and the position sensor 170 has almost no variation, and there is almost no influence on the output value of the position sensor 170 due to tilting of the AF operation unit. Accordingly, there is an effect of decreasing the peak value of gain, among the frequency response characteristics, due to tilting of the AF operation unit, thereby inhibiting or suppressing oscillation of the lens moving apparatus during AF operation.

In other words, although the output value of the position sensor 170 is affected due to the disposition of the sensing magnet 180 and the position sensor 170 shown in FIG. 12 when the AF operation unit is tilted relative to the first axis, there is almost no influence on the output value of the position sensor when the AF operation unit is tilted relative to the second axis. Accordingly, the peak value of gain in the second and third resonant frequencies, among the frequency response characteristics shown in FIG. 10B may decrease, thereby inhibiting or suppressing oscillation of the lens moving apparatus during AF operation.

In another embodiment, the sensing magnet 180 may be disposed so as to be aligned with or correspond to the first axis 601, and the position sensor 170 may be disposed so as to be aligned with or correspond to the first axis 601. Although the output value of the position sensor is affected due to this disposition when the AF operation unit is tilted relative to the second axis, there is almost no influence on the position sensor when the AF operation unit is tilted relative to the second axis. Accordingly, it is possible to reduce the influence on the output of the position sensor 170 due to tilting of the AF operation unit, to decrease the peak value of gain in the second and third resonant frequencies, among the frequency response characteristics shown in FIG. 10B, and to inhibit or suppress oscillation of the AF operation unit during AF operation.

Each of the connecting frames 153-1 to 153-4 may include a plurality of curved portions (or bent portions), and the damper may be disposed on at least one of the plurality of curved portions (or bent portions).

For example, the damper may be disposed on one of the plurality of curved portions of each of the connecting frames.

Figure 14:
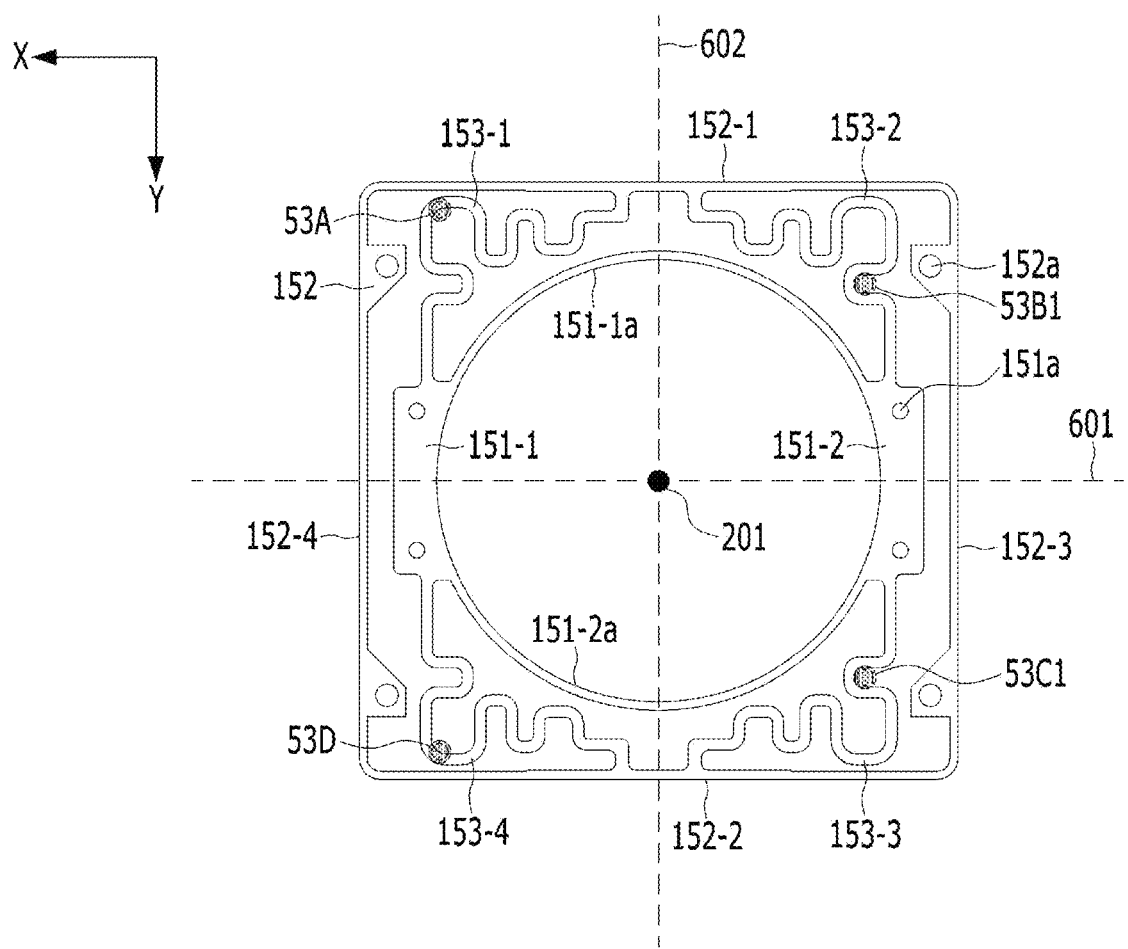
FIG. 14 illustrates the disposition of dampers according to another embodiment.

FIG. 14 illustrates the disposition of dampers 53A, 53B1, 53C1 and 53D according to another embodiment.

Referring to FIG. 14, the dampers 53A, 53B1, 53C1 and 53D may be disposed so as to be symmetrical, line-symmetrical or bilaterally symmetrical based on the first axis 601 but may be disposed so as not be symmetrical, line-symmetrical or bilaterally symmetrical based on the second axis 602.

For example, the first and second dampers 53A and 53B1 may be disposed so as to be line-symmetrical or bilaterally symmetrical with the third and fourth dampers 53C1 and 53D relative to the first axis 601. Meanwhile, the first and fourth dampers 53A and 53D may be disposed so as not to be line-symmetrical or bilaterally symmetrical with the second and third dampers 53B1 and 53C1 relative to the second axis 602.

Figure 15:
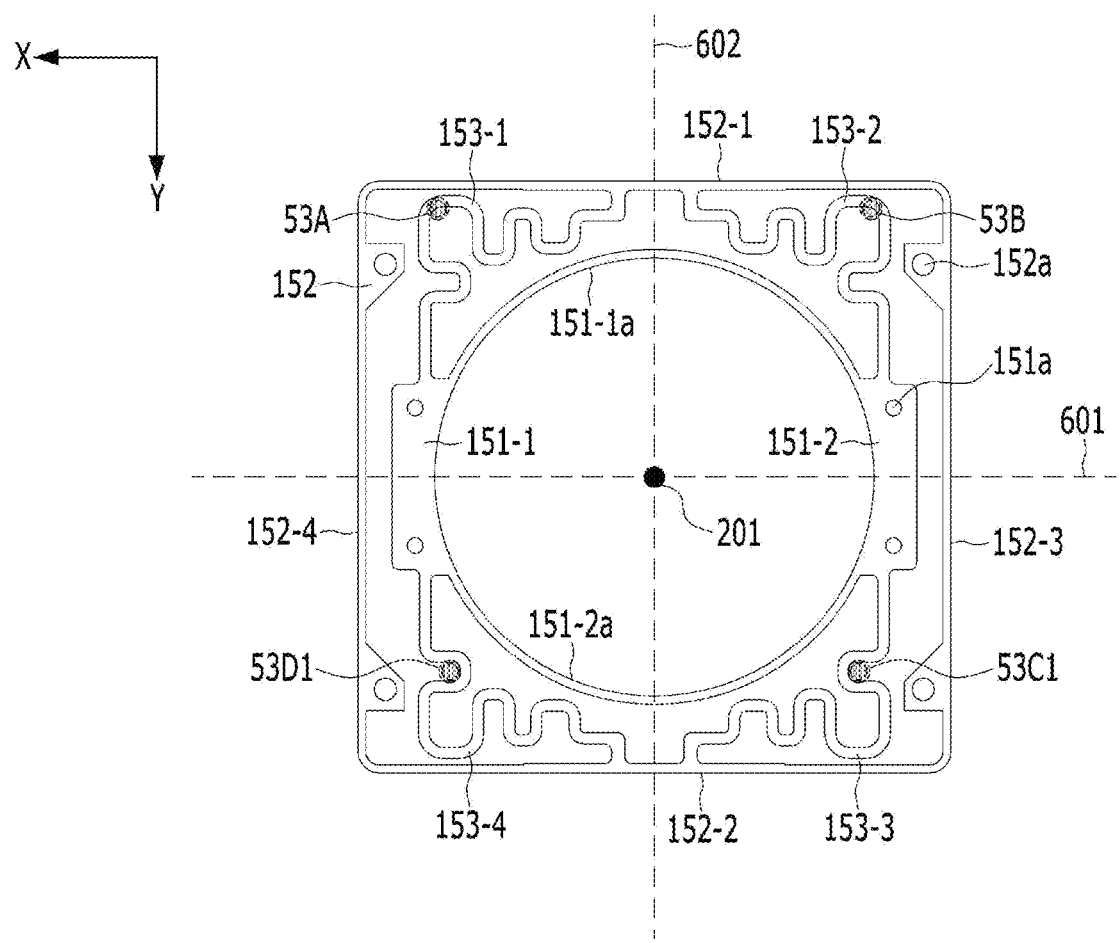
FIG. 15 illustrates disposition of dampers according to a further embodiment.

FIG. 15 illustrates the disposition of dampers 53A, 53B, 53C1 and 53D1 according to a further embodiment.

Referring to FIG. 15, the dampers 53A, 53B, 53C1 and 53D1 may be disposed so as not to be line-symmetrical or bilaterally symmetrical based on the first axis 601, but may be disposed so as to be line-symmetrical or bilaterally symmetrical based on the second axis 602.

For example, the first and second dampers 53A and 53B may be disposed so as to be line-symmetrical or bilaterally symmetrical with the third and fourth dampers 53C1 and 53D1 relative to the first axis 601. Meanwhile, the first and fourth dampers 53A and 53D1 may be disposed so as to be symmetrical or laterally symmetrical with the second and third dampers 53B and 53C1 relative to the second axis 602.

The upper elastic member 150 may be configured so as to have different spring constants K relative to the first axis 601. Alternatively, the upper elastic member 150 may be configured so as to have different constants K relative to the second axis 602.

For example, the upper elastic member 150 may have different spring lengths and widths relative to the first axis 601. Alternatively, the upper elastic member 150 may have different lengths and widths of spring relative to the second axis 602.

In another embodiment, the lower elastic member 160 may be configured so as to have different spring constants K relative to the first axis 601. Alternatively, the lower elastic member 160 may be configured so as to have different spring constants K relative to the second axis 602. For example, the lower elastic member may have different lengths and widths of spring relative to the first axis 601. Alternatively, the lower elastic member may have different lengths and widths of spring relative to the second axis 602.

Figure 16:
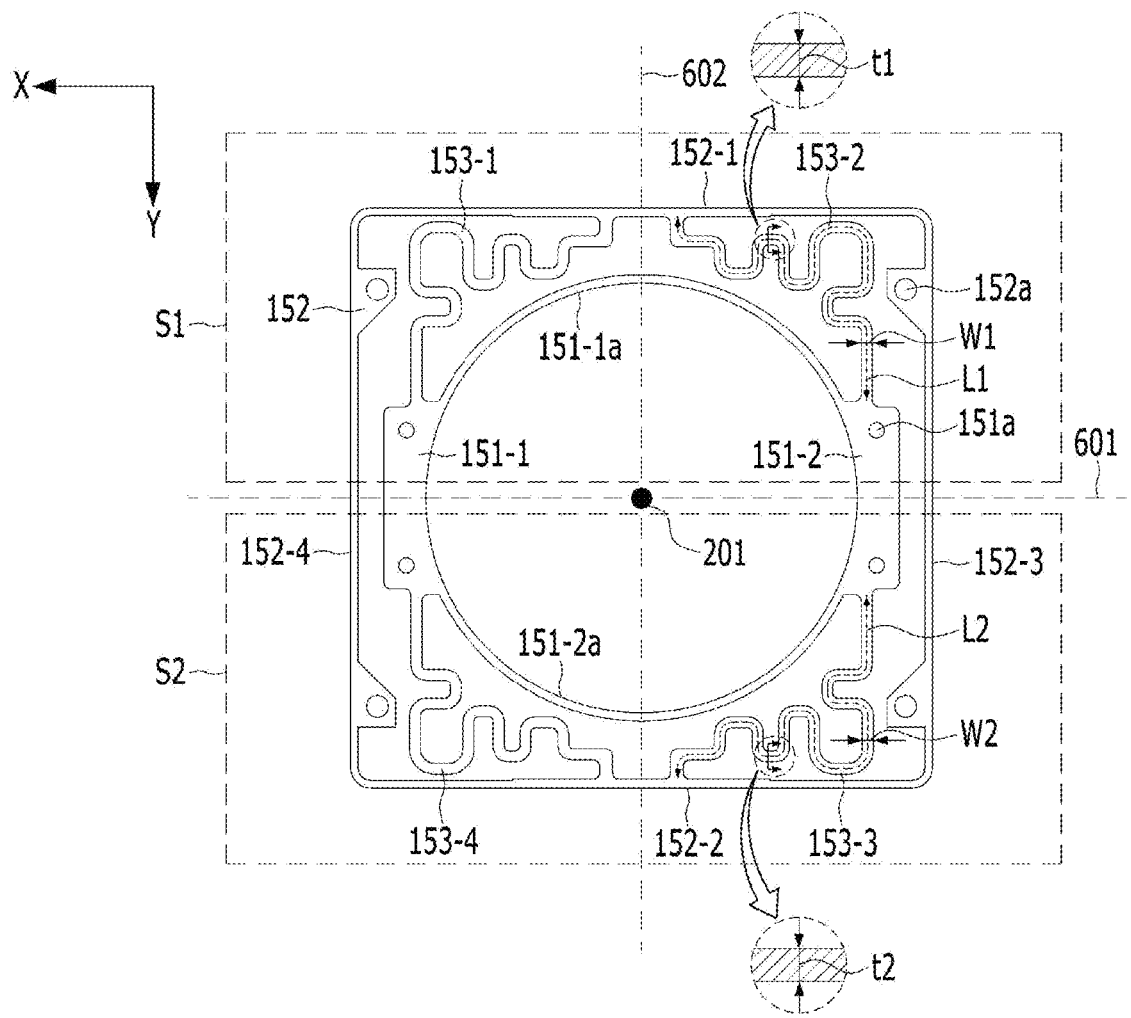
FIG. 16 illustrates widths, lengths, and thicknesses of the upper elastic member according to an embodiment.

FIG. 16 illustrates widths, lengths, and thicknesses of the upper elastic member 150 according to an embodiment.

Referring to FIG. 16, the width of the first region S1 of the upper elastic member 150 may be different from the width of the second region S2 of the upper elastic member 150.

The first region S1 may be a region of the upper elastic member 150 that is positioned at one side of the upper elastic member 150 relative to the first axis 601, and the second region S2 may be a region of the upper elastic member 150 that is positioned at another side of the upper elastic member 150 relative to the first axis 601. For example, the first region S1 may be positioned opposite the second region S2 relative to the first axis 601.

For example, the width of the first frame connectors 153-1 and 153-2 of the first region S1 may be different from the width of the first frame connector 153-3 and 153-4 of the second region S2.

The thickness t1 of the first region S1 of the upper elastic member 150 may be different from the thickness t2 of the second region S2 of the upper elastic member 150.

For example, the thickness of the first frame connectors 153-1 and 153-2 of the first region S1 may be different from the thickness of the first frame connectors 153-3 and 153-4 of the second region S2.

Furthermore, the length L1 of the first frame connectors 153-1 and 153-2 of the first region S1 of the upper elastic member 150 may be different from the length L2 of the first frame connectors 153-3 and 153-4 of the second region S2 of the upper elastic member 150.

In FIG. 16, at least one of the widths, the thicknesses and the lengths of the first region S1 and the second region S2 may be different from a corresponding one thereof such that the first elastic force and the second elastic force are asymmetrically applied to the AF operation unit (for example, the bobbin 110). By virtue of the asymmetrical elastic forces, it is possible to increase the interval (or the difference) between the second and third resonant frequencies of the AF operation unit, and thus it is possible to inhibit or suppress oscillation of the lens moving apparatus during AF operation.

Figure 17:
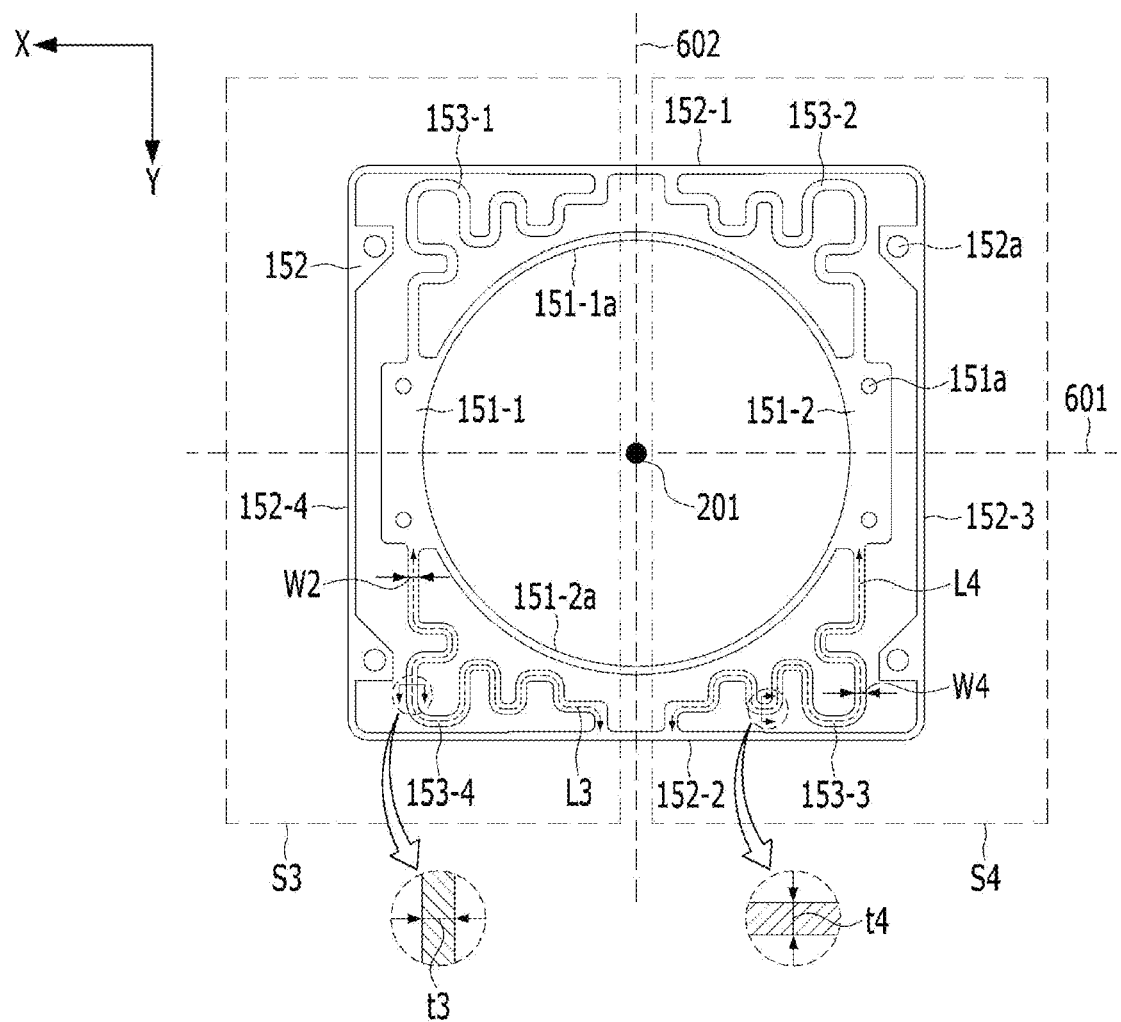
FIG. 17 illustrates widths, lengths and thicknesses of the upper elastic member according to another embodiment.

FIG. 17 illustrates widths, lengths, and thicknesses of the upper elastic member 150 according to another embodiment.

Referring to FIG. 17, the width W3 of the third region S3 of the upper elastic member 150 may be different from the width W2 of the fourth region S4 of the upper elastic member 150.

The third region S3 may be a region of the upper elastic member 150 that is positioned at one side of the upper elastic member 150 relative to the second axis 602, and the third region S4 may be a region of the upper elastic member 150 that is positioned at another side of the upper elastic member 150 relative to the second axis 602. For example, the third region S3 may be positioned opposite the fourth region S4 relative to the second axis 602.

For example, the width of the first frame connectors 153-1 and 153-4 of the third region S3 may be different from the width of the first frame connectors 153-2 and 153-3 of the fourth region S4.

The thickness t3 of the third region S3 of the upper elastic member 150 may be different from the thickness t4 of the fourth region S4 of the upper elastic member 150.

For example, the thickness of the first frame connectors 153-1 and 153-4 of the third region S3 may be different from the thickness of the first frame connectors 153-2 and 153-3 of the fourth region S4.

Furthermore, the length L3 of the first frame connectors 153-1 and 153-4 of the third region S3 of the upper elastic member 150 may be different from the length L4 of the first frame connectors 153-2 and 153-3 of the fourth region S4 of the upper elastic member 150.

In FIG. 17, at least one of the widths, the thicknesses and the lengths of the third region S3 and the fourth region S4 may be different from a corresponding one thereof such that the first elastic force and the second elastic force are asymmetrically applied to the AF operation unit (for example, the bobbin 110). By virtue of the asymmetrical elastic forces, it is possible to increase the interval (or the difference) between the second and third resonant frequencies of the AF operation unit, and thus it is possible to inhibit or suppress oscillation of the lens moving apparatus during AF operation.

In another embodiment, at least one of the widths, the lengths and the thicknesses of the two regions of the upper elastic members 150 may be different from a corresponding one thereof relative to the first axis 601 and the second axis 602.

In another embodiment, the upper elastic member and the lower elastic member may be applied in reverse. For example, the upper elastic member 150 shown in FIG. 5 may be applied in place of the lower elastic member 160, and the lower elastic member 160 may be applied in place of the upper elastic member 150.

In a further embodiment, like the upper elastic member, the lower elastic member may also be configured so as to be line-symmetrical or bilaterally symmetrical relative to at least one of the first axis and the second axis, and the description of the dampers 53A to 53D may also be applied to the lower elastic member.

The description of FIG. 5, FIG. 9 and FIGS. 12 to 17 may also be applied to an embodiment, in which the upper elastic member 150 is applied to the lower elastic member, with or without modification.

Figure 18:
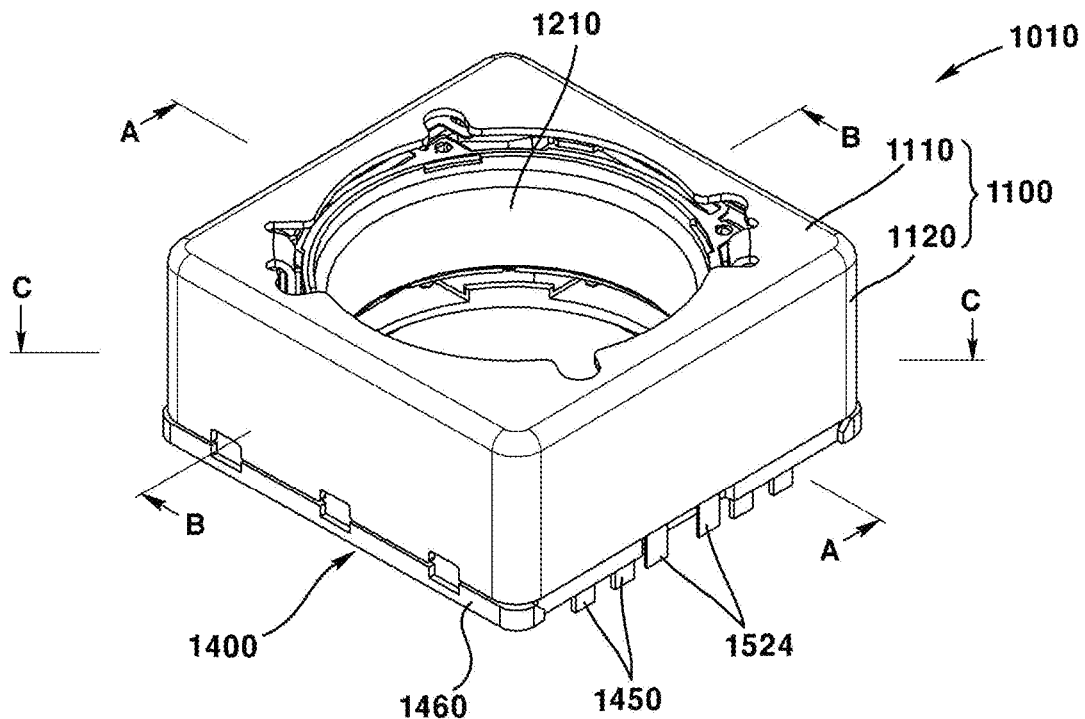
FIG. 18 is a perspective view of a lens moving apparatus according to another embodiment.
Figure 19:
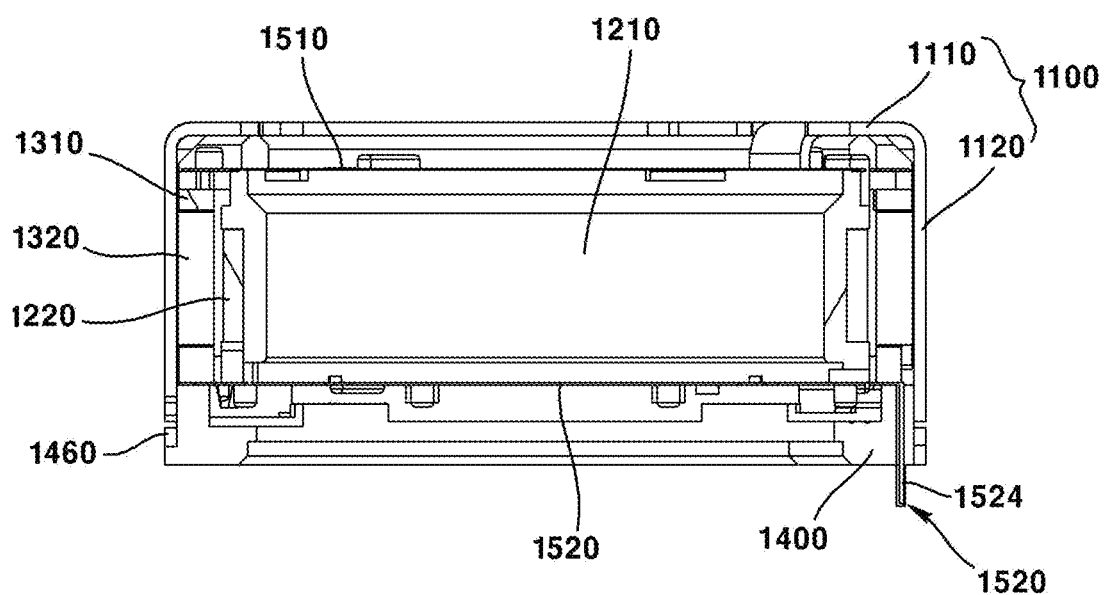
FIG. 19 is a cross-sectional view taken along line A-A in FIG. 18.
Figure 20:
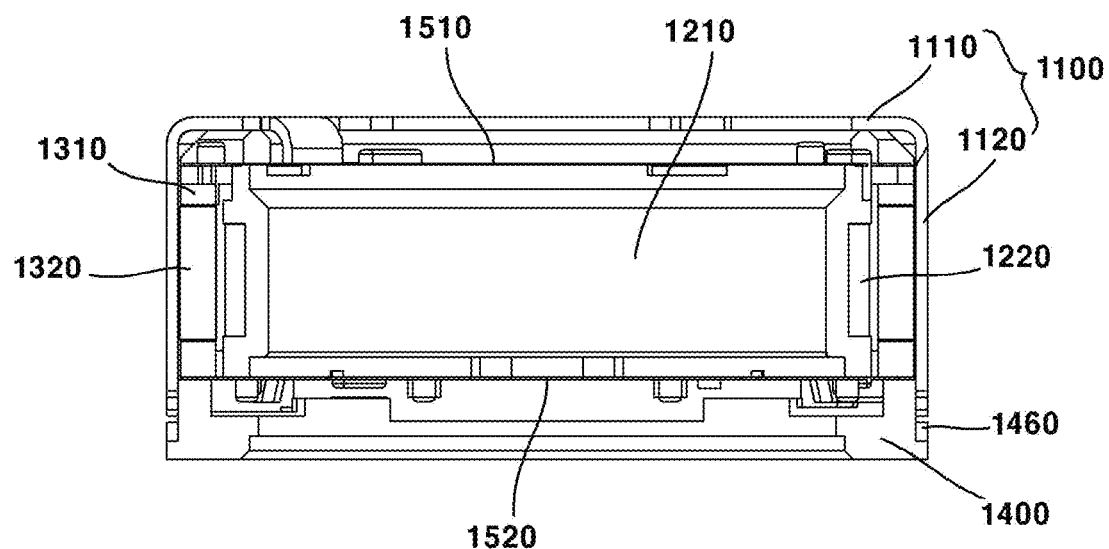
FIG. 20 is a cross-sectional view taken along line B-B in FIG. 18.
Figure 21:
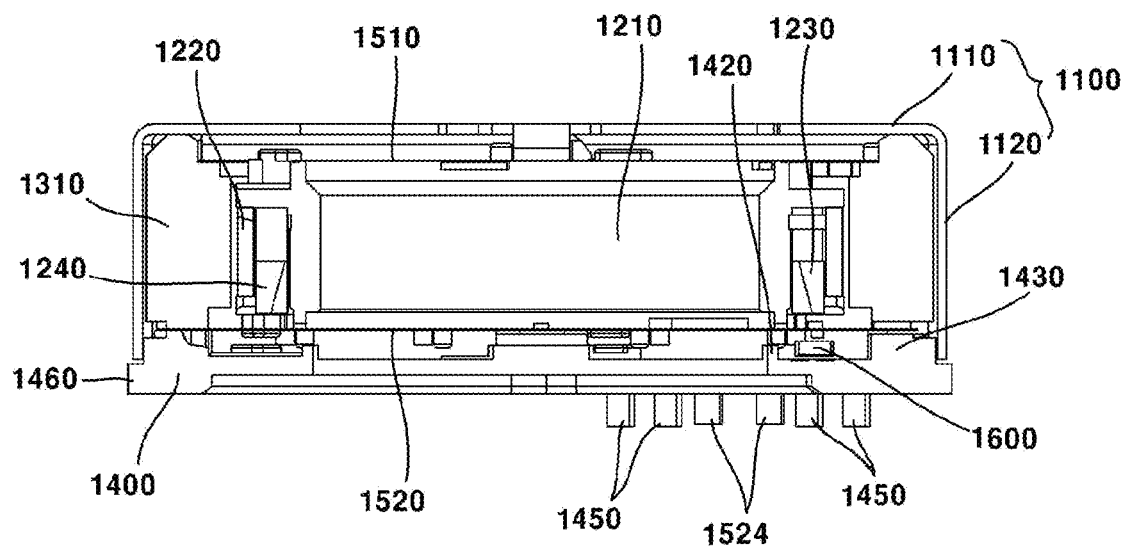
FIG. 21 is a cross-sectional view taken along line C-C in FIG. 18.
Figure 22:
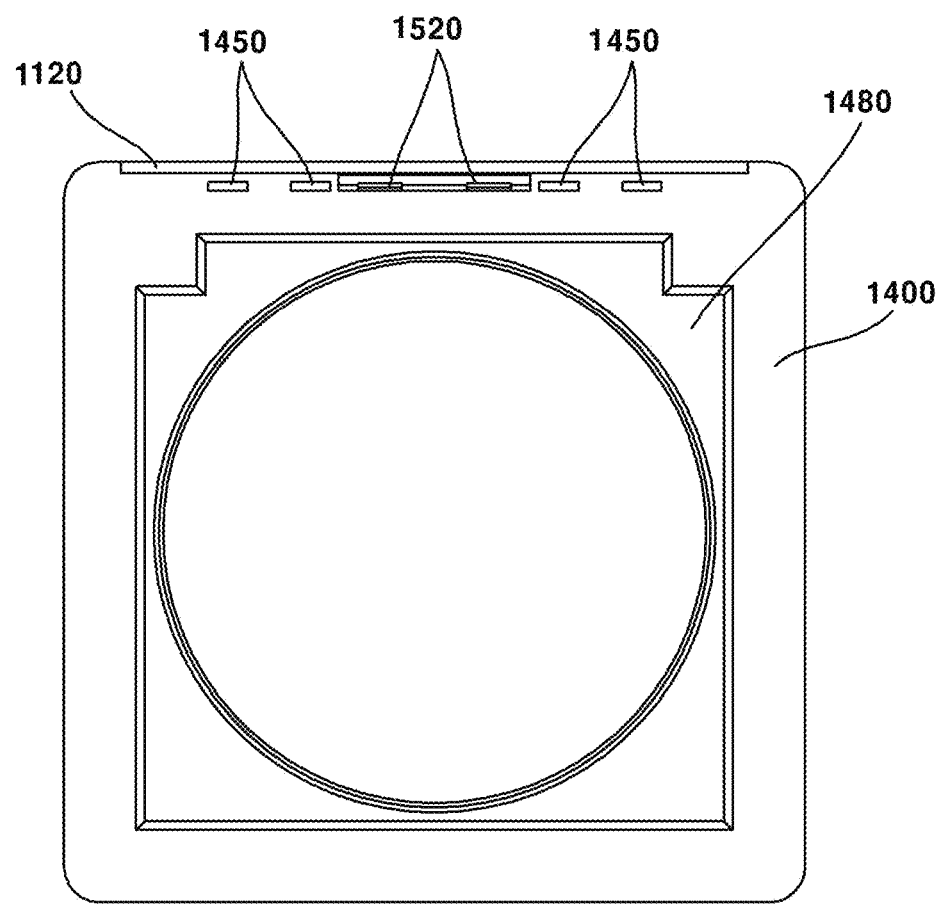
FIG. 22 is a bottom view of the lens moving apparatus shown in FIG. 18.
Figure 23:
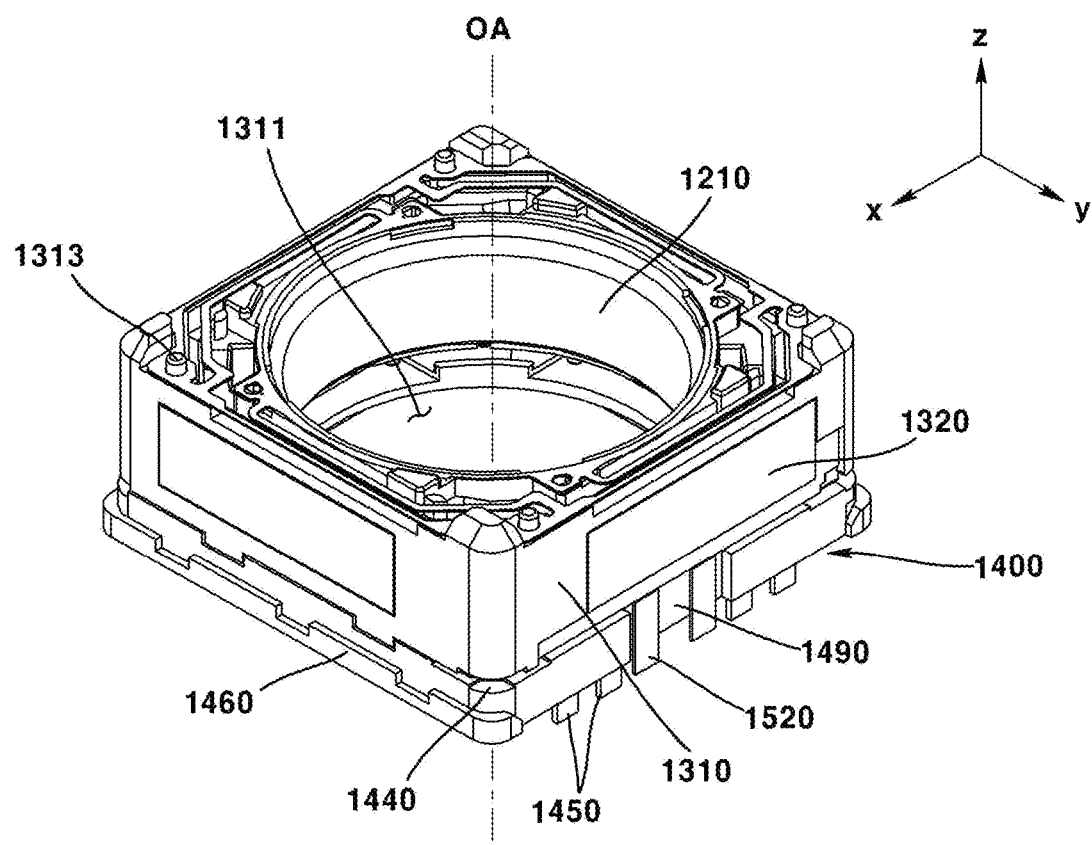
FIG. 23 is a perspective view of the lens moving apparatus shown in FIG. 18 from which a cover is removed.
Figure 24:
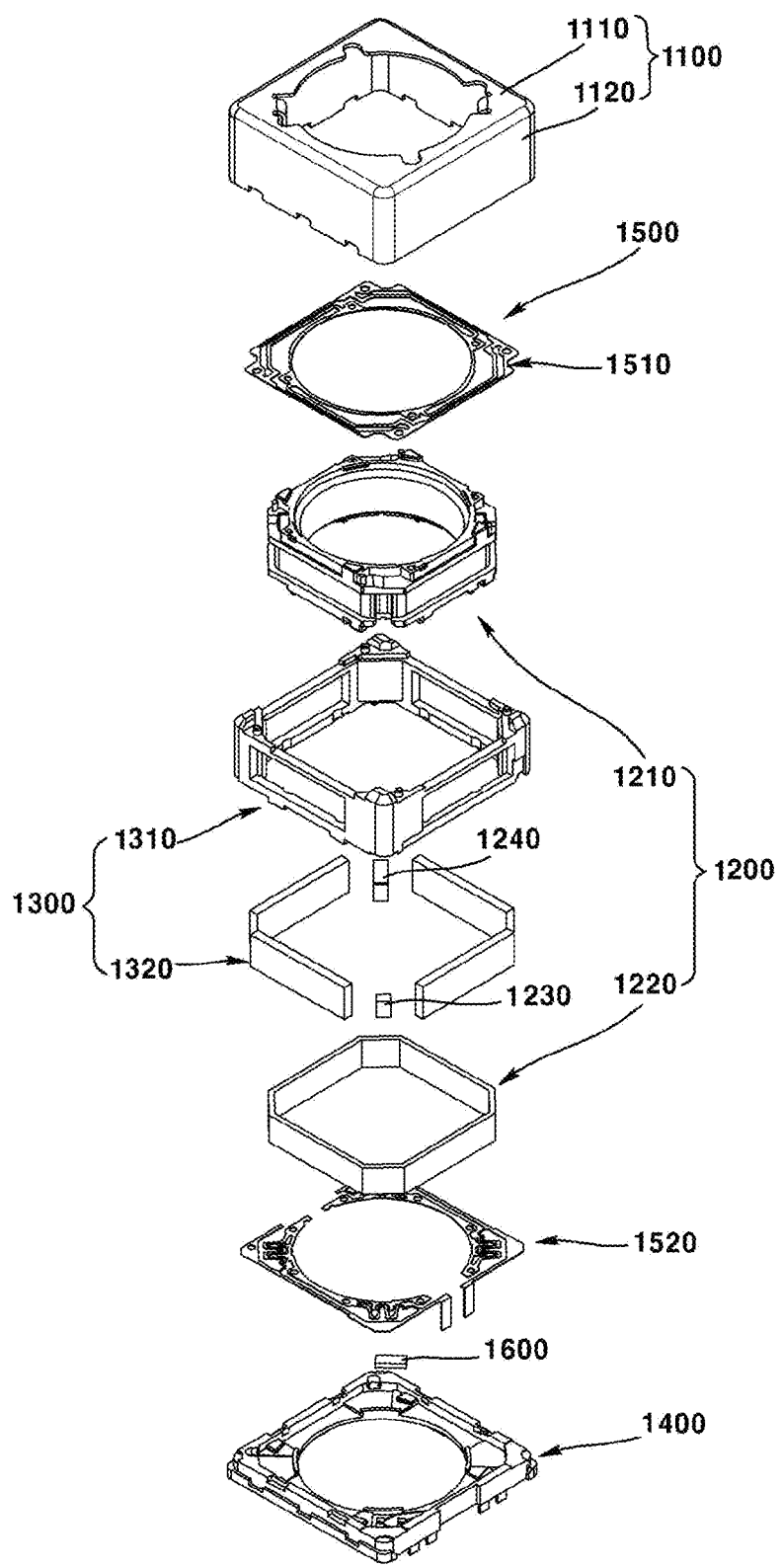
FIG. 24 is an exploded perspective view of the lens moving apparatus shown in FIG. 18.
Figure 25:
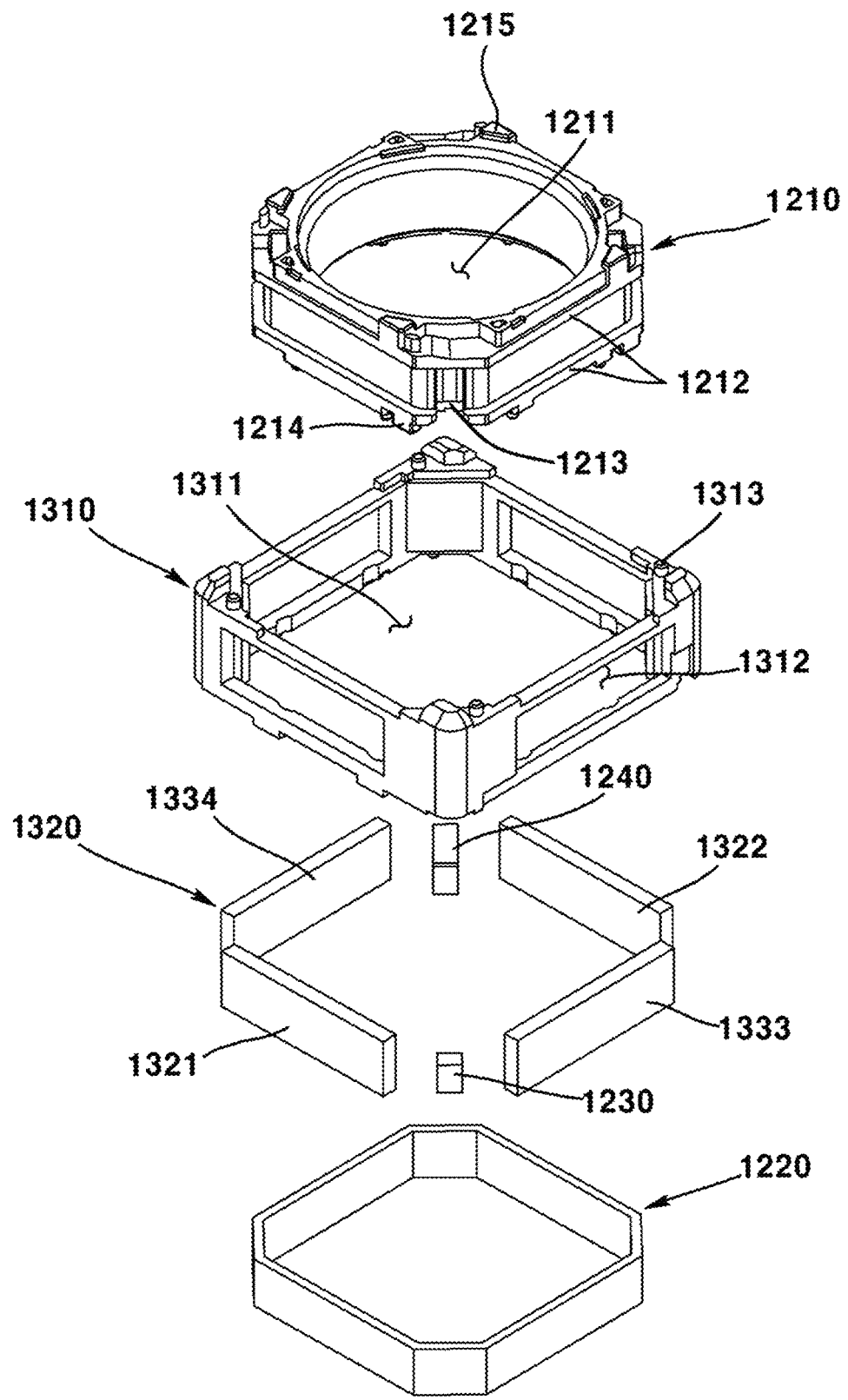
FIGS. 25 and 26 are exploded perspective views of a portion of the lens moving apparatus shown in FIG. 18.
Figure 26:
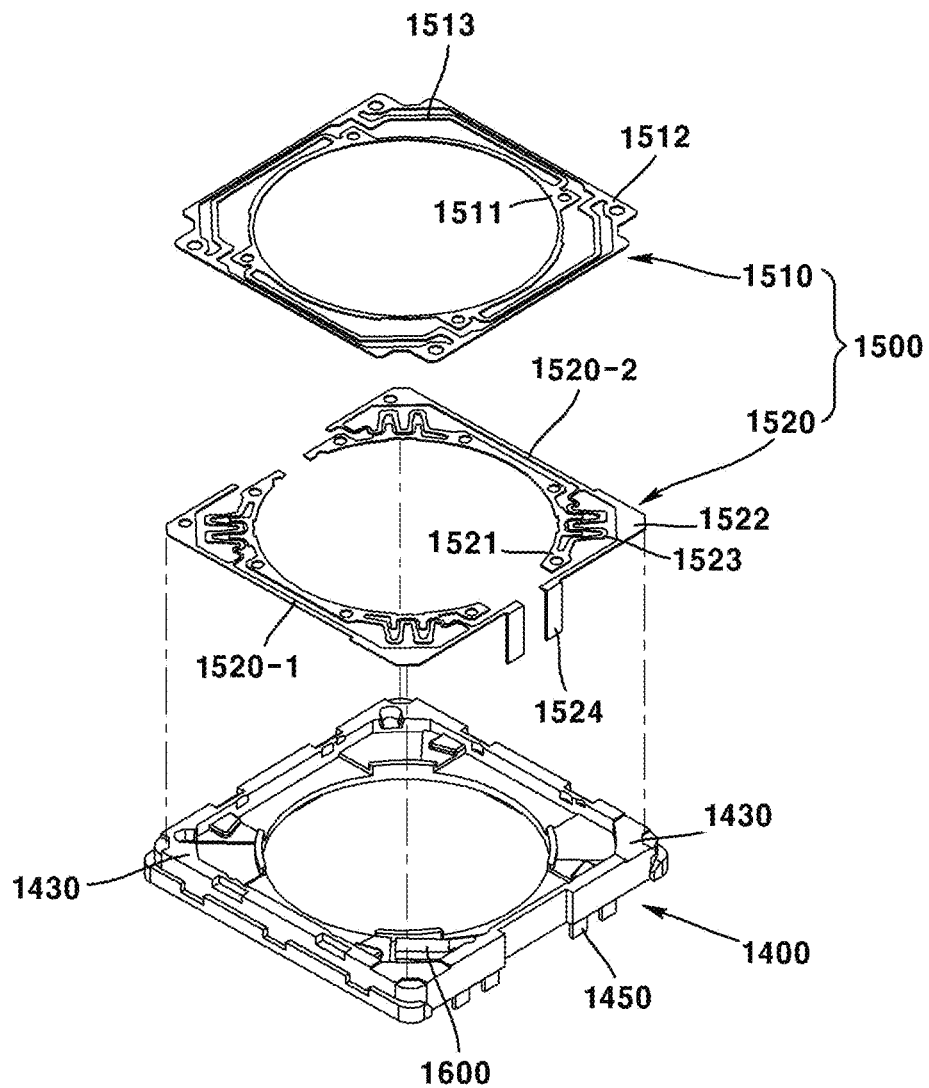
Figure 27:
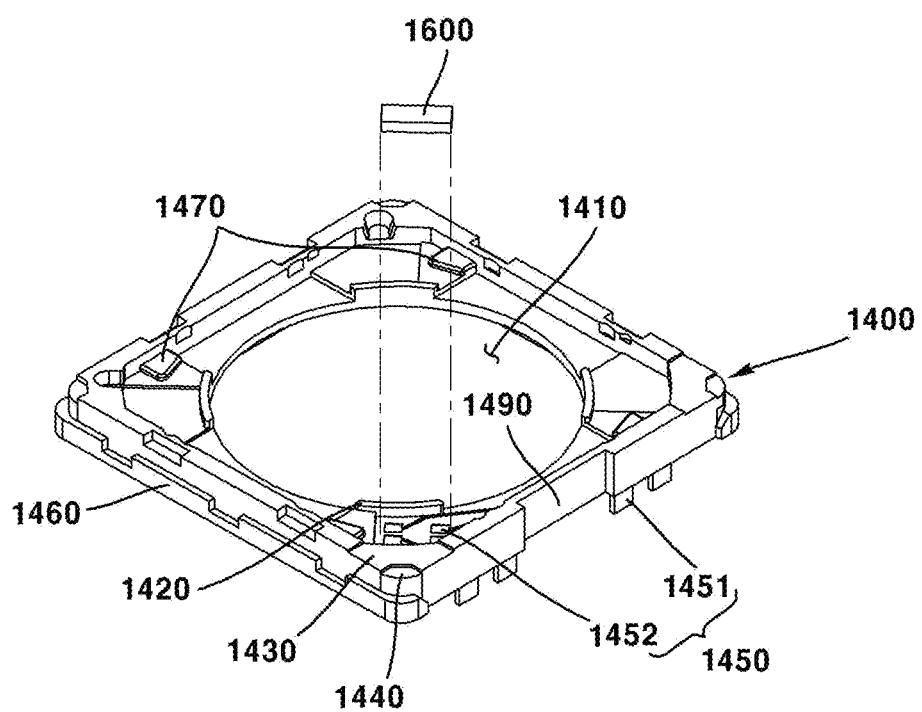
FIG. 27 is an exploded perspective view of a base and a sensor of the lens moving apparatus shown in FIG. 18.

FIG. 18 is a perspective view of a lens moving apparatus according to another embodiment. FIG. 19 is a cross-sectional view taken along line A-A in FIG. 18. FIG. 20 is a cross-sectional view taken along line B-B in FIG. 18. FIG. 21 is a cross-sectional view taken along line C-C in FIG. 18. FIG. 22 is a bottom view of the lens moving apparatus shown in FIG. 18. FIG. 23 is a perspective view of the lens moving apparatus shown in FIG. 18 from which a cover is removed. FIG. 24 is an exploded perspective view of the lens moving apparatus shown in FIG. 18. FIGS. 25 and 26 are exploded perspective views of a portion of the lens moving apparatus shown in FIG. 18. FIG. 27 is an exploded perspective view of a base and a sensor of the lens moving apparatus shown in FIG. 18.

The lens moving apparatus 1010 may be a voice coil motor (VCM). The lens moving apparatus 1010 may be a lens-driving motor. The lens moving apparatus 1010 may be a lens-driving motor. In the embodiment, the lens moving apparatus 1010 may include a closed-loop autofocus (CLAF) actuator or closed-loop autofocus (CLAF) module. For example, the assembly in which the lens moving apparatus 1010 is assembled with the lens, the image sensor and the printed circuit board may be considered to be the camera module.

The lens moving apparatus 1010 may include a cover 1100. The cover 1100 may cover the housing 1310. The cover 1100 may be coupled to the base 1400. The cover 1100 may define the internal space in conjunction with the base 1400. The cover 1100 may accommodate therein the housing 1310. The cover 1100 may accommodate therein the bobbin 1210. The cover 1100 may define the appearance of the camera module. The cover 1100 may be configured to have a hexahedral shape, which is open at the lower surface thereof. The cover 1100 may be a non-magnetic body. The cover 1100 may be made of a metal. The cover 1100 may be embodied as a metal plate. The cover 1100 may be connected to the ground portion of the printed circuit board. Accordingly, the cover 1100 may be grounded. The cover 1100 may block electromagnetic interference (EMI). Here, the cover 1100 may be referred to as a 'shield can' or an 'EMI shield can'.

The cover 1100 may include an upper plate 1100. The cover 1100 may include a side plate 1120. The side plate 1120 may extend from the upper plate 1110. The cover 1100 may include the upper plate 1110 and the side plate 1120 extending downwards from the outer periphery or the edge of the upper plate 1110. The lower end of the side plate 1120 of the cover 1100 may be disposed on a step 1460 of the base 1400. The inner surface of the side plate 1120 of the cover 1100 may be fixed to the base 1400 using an adhesive.

The cover 1100 may include a plurality of side plates. The cover 1100 may include the plurality of side plates and a plurality of corners defined between the plurality of side plates. The cover 1100 may include four side plates and four corners defined between the four side plates. The cover 1100 may include a first side plate, a second side plate disposed opposite the first side plate, and third and fourth side plates, which are disposed between the first side plate and the second side plate and opposite each other. The cover 1100 may include first to fourth corners. The cover 1100 may include a first corner, a second corner that is disposed opposite the first corner, and third and fourth corners, which are disposed opposite each other.

The lens moving apparatus 1010 may include a movable unit 1200. The movable unit 1200 may be coupled to the lens. The movable unit 1200 may be connected to a stationary unit 1300 via an elastic member 1500. The movable unit 1200 may be moved by the interaction with the stationary unit 1300. Here, the movable unit 1200 may be moved together with the lens. The movable unit 1200 may be moved during AF operation. Here, the movable unit 1200 may be referred to as an 'AF movable unit'.

The movable unit 1200 may include the bobbin 1210. The bobbin 1210 may be disposed in the housing 1310. The bobbin 1210 may be movably coupled to the housing 1310. The bobbin 1210 may be movable relative to the housing 1310 in the optical-axis direction.

Referring to FIG. 25, the bobbin 1210 may have a bore 1211 therein. The bore 1211 may be a through hole. The lens may be coupled to the bore 1211. A thread may be formed in the inner circumferential surface of the bore 1211. Alternatively, the inner circumferential surface of the bore 1211 in the bobbin 1210 may be formed so as to have a curved surface rather than being provided with the thread. The bobbin 1210 may include a first protrusion, which is coupled to an upper elastic member 1510. The first protrusion of the bobbin 1210 may be fitted into a corresponding hole in the upper elastic member 1510 and may be coupled thereto. The bobbin 1210 may include a second protrusion, which is coupled to the lower elastic member 1520. The second protrusion of the bobbin 1210 may be fitted into a corresponding hole in the lower elastic member 1520, and may be coupled thereto.

The bobbin 1210 may include a rib 1212. The rib 121 may project from the lateral side surface of the bobbin 1210. The rib 1212 may hold the first coil 1220. The rib 1212 may include an upper rib projecting from the upper portion of the bobbin 1210 and a lower rib projecting from the lower portion of the bobbin 1210. The first coil 1220 may be wound between the upper rib and the lower rib, and may be secured thereto. The description of the rib 1212 may be applied to the bobbin 110 shown in FIG. 3A with or without modification.

The bobbin 1210 may have formed therein grooves 1213. The second magnet 1230 and the third magnet 1240 may be disposed in respective grooves 1213. The second magnet 1230 and the third magnet 1240 may be respectively fitted into the grooves 1213 in the bobbin 1210 from beneath and may be coupled therein. The grooves 1213 may include a first grove, in which the second magnet 1230 is disposed, and a second groove, in which the third magnet 1240 is disposed.

The description of the grooves 1213 in the bobbin 1210 may be applied to the bobbin 110 shown in FIG. 3A with or without modification. Furthermore, the description of the bobbin 110 shown in FIG. 3A may be applied to the bobbin 1210 with or without modification.

The bobbin 1210 may include a lower stopper 1214. The lower stopper 1214 may project from the lower surface of the bobbin 1210. The lower surface of the lower stopper 1214 may define the lower end of the bobbin 1210. Accordingly, when the bobbin 1210 is maximally moved downwards, the lower surface of the lower stopper 1214 may come into contact with the base 1400. The lower stopper 1214 of the bobbin 1210 may overlap a protrusion 1470 of the base 1400 in the optical-axis direction. The description of the lower stopper 1214 of the bobbin 1210 and the protrusion 147 of the base 1400 may be applied to the bobbin 110 and the base 210 shown in FIG. 1 with or without modification.

The bobbin 1210 may include an upper stopper 1215. The upper stopper 1215 may project from the upper surface of the bobbin 1210. The upper surface of the upper stopper 1215 may define the upper end of the bobbin 1210. Accordingly, when the bobbin 1210 is maximally moved upwards, the upper surface of the upper stopper 1215 may come into contact with the upper plate 1110 of the cover 1100. The upper stopper 1215 of the bobbin 1210 may overlap the upper plate 1110 of the cover 1100 in the optical-axis direction.

The bobbin 1210 may be coupled to at least one of the elastic member 1500, the coil 1220, the second magnet 1230 and the third magnet 1240 using an adhesive. Here, the adhesive may be epoxy, which is hardened by at least one of heat, a laser, and ultraviolet (UV) radiation.

The movable unit 1200 may include the coil 1220. The coil 1220 may be an 'AF coil'. The coil 1220 may be disposed on the bobbin 1210. The coil 1220 may be disposed in the state of being in contact with the bobbin 1210. The coil 1220 may be disposed between the bobbin 1210 and the housing 1310. The coil 1220 may be disposed on the outer periphery of the bobbin 1210. The coil 1220 may be wound around the bobbin 1210. The coil 1220 may face the first magnet 1320. The coil 1220 may electromagnetically interact with the first magnet 1320. When current flows in the coil 1220 and thus an electromagnetic field is generated around the coil 1220, the coil 1220 may be moved relative to the first magnet 1320 by virtue of the electromagnetic interaction between the coil 1220 and the first magnet 1320.

The movable unit 1200 may include the second magnet 1230. The second magnet 1230 may be a 'sensing magnet'. The second magnet 1230 may be disposed on the bobbin 1210. The second magnet 1230 may overlap the sensor 1600 in the optical-axis direction. The second magnet 1230 may be disposed adjacent to the sensor 1600. The second magnet 1230 may be oriented so as to face the sensor 1600. The second magnet 1230 may be disposed between the bobbin 1210 and the coil 1220 in a direction perpendicular to the optical-axis direction. The second magnet 1230 may be fitted into the groove 1213 in the bobbin 1210 from a lateral side or from beneath. The second magnet 1230 may be a bipolar magnetized magnet or a tetrapolar magnetized magnet. The second magnet 1230 may be disposed on the portion of the bobbin 1210 that corresponds to the first corner portion of the housing 1310. The second magnet 1230 may be disposed on a corner of the bobbin 1210. By disposing the second magnet 1230 at the corner of the bobbin 1210, magnetic field interference between the first magnet 1320, which is disposed so as to face the side surface of the bobbin 1210, and the second magnet 1230 may be minimized. The second magnet 1230 may be configured to have the form of a hexahedron. The second magnet 1230 may be configured to be smaller than the first magnet 1320.

The movable unit 1200 may include the third magnet 1240. The third magnet 1240 may be a 'compensation magnet'. The third magnet 1240 may be provided so as to establish magnetic equilibrium with the second magnet 1230. The third magnet 1240 may be disposed on the bobbin 1210. The third magnet 1240 may be disposed opposite the second magnet 1230 relative to the optical axis. The third magnet 1240 may be configured to have a size and shape corresponding to those of the second magnet 1230.

The lens moving apparatus 1010 may include the stationary unit 1300. The stationary unit 1300 may movably support the movable unit 120. The stationary unit 1300 may move the movable unit 1200 through the interaction with the movable unit 1200. The stationary unit 1300 may include the housing 1310 and the first magnet 1320. Here, the base and the cover 1100 may also be considered to be the stationary unit 1300. The description of the stationary unit 1300 may be applied to the base 210 and the cover 300 according to the embodiment shown in FIG. 1 with or without modification.

The stationary unit 1300 may include the housing 1310. The housing 1310 may be disposed outside the bobbin 1210. The housing 1310 may receive at least a portion of the bobbin 1210. The housing 1310 may be disposed inside the cover 1100. The housing 1310 may be disposed between the cover 1100 and the bobbin 1210. The housing 1310 may be made of a material different from that of the cover 1100. The housing 1310 may be made of an insulation material. The housing 1310 may be injection-molded. A first magnet 1320 may be disposed on the housing 1310. The housing 1310 may be coupled to the first magnet 1320 using an adhesive. An upper elastic member 1510 may be coupled to the upper portion of the housing 1310. The lower elastic member 1520 may be coupled to the lower portion of the housing 1310. The housing 1310 may be coupled to the elastic member 1500 using thermal fusion and/or an adhesive. The adhesive that is used to couple the housing 1310 to the first magnet 1320 and to the elastic member 1500 may be epoxy, which is hardened by at least one of ultraviolet (UV), heat, and laser radiation.

The housing 1310 may include first and second side portions, which are disposed opposite each other, third and fourth side portions, which are disposed opposite each other, a first corner portion connecting the first side portion to the third side portion, a second corner portion connecting the first side portion to the fourth side portion, a third corner portion connecting the second side portion to the fourth side portion, and a fourth corner portion connecting the second side portion to the third side portion.

The housing 1310 may have therein a first bore 1311. The first bore 1311 may be a through hole. The first bore 1311 may be formed through the center of the housing 1310 in the vertical direction. The bobbin 1210 may be disposed in the first bore 1311 in the housing 1310.

The housing 1310 may have a second hole 1312. The second hole 1312 may be a 'magnet-receiving hole'. The first magnet 1320 may be disposed in the second hole 1312. The second hole 1312 may be formed through the side portion of the housing 1310 in a direction perpendicular to the optical axis. In a modification, the second hole 1312 may be a groove.

The housing 1310 may include a protrusion 1313. The protrusion 1313 may be coupled to the upper elastic member 1500. The protrusion 1313 may be fitted into a corresponding hole in the upper elastic member 1500, and may be coupled thereto.

The housing 1310 may be coupled to at least one of the cover 1100, the base 1400, the elastic member 1500, and the first magnet 1320 using an adhesive. Here, the adhesive may be epoxy, which is hardened by at least one of heat, a laser and ultraviolet (UV) radiation.

The stationary unit 1300 may include the first magnet 1320. The first magnet 1320 may be a 'drive magnet'. The first magnet 1320 may be disposed on the housing 1310. The first magnet 1320 may be disposed between the coil 1220 and the side plate 1120 of the cover 1100. The first magnet 1320 may be disposed between the bobbin 1210 and the housing 1310. The first magnet 1320 may face the coil 1220. The first magnet 1320 may electromagnetically interact with the coil 1220. The first magnet 1320 may be used in AF operation. The first magnet 1320 may be disposed on the side portion of the housing 1310. Here, the first magnet 1320 may be formed as a flat magnet. The first magnet 1320 may be made of a flat plate. The first magnet 1320 may be configured to have the form of a rectangular parallelepiped.

The first magnet 1320 may include a plurality of magnets. The first magnet 1320 may include four magnets. The first magnet 1320 may include first of first to fourth of first magnets 1321, 1322, 1333 and 1334. The first of first magnet 1321 may be disposed on the first side portion of the housing 1310. The second of first magnet 1322 may be disposed on the second side portion of the housing 1310. The third of first magnet 1323 may be disposed on the third side portion of the housing 1310. The fourth of first magnet 1324 may be disposed on the fourth side portion of the housing 1310. In this embodiment, the first of first magnet 1321 may be disposed closer to the second corner portion than to the first corner portion of the housing 1310. Consequently, magnetic field interference between the first of first magnet 1321 and the second magnet 1230 may be minimized. Like the first of first magnet 1321, each of the second of first to fourth of first magnets 1322, 1333 and 1334 may be disposed close to one corner portion of the housing 1310 so as to be spaced apart from the second magnet 1230 or the third magnet 1240.

The description of the four magnets 1321, 1322, 1323 and 1324 of the first magnet 1320 may be applied to the embodiment shown in FIG. 1 with or without modification.

The lens moving apparatus 1010 may include the base 1400. The base 1400 may be disposed under the housing 1310. The base 1400 may be disposed under the bobbin 1210. At least a portion of the base 1400 may be spaced apart from the bobbin 1210. The base 1400 may be coupled to the side plate 1120 of the cover 1100.

The base 1400 may have therein a bore 1410. The bore 1410 may be a through hole. The bore 1410 may be formed through the base 1400 in the optical-axis direction. The light that has passed through the lens and the bore 1410 may be incident on the image sensor 60.

The base 1400 may include a protrusion 1420. The protrusion 1420 may extend from the inner circumferential surface of the bore 1410 in the base 1400. The protrusion 1420 may project from the upper surface of the base 1400. The protrusion 1420 may be formed on the upper surface of the base 1400. The protrusion 1420 may be disposed inside the sensor 1600. The protrusion 1420 may be disposed between the bore 1410 and the sensor 1600. The protrusion 1420 may include a plurality of protrusions. The protrusions 1420 may include four protrusions.

The base 1400 may include a projection 1430. The projection 1430 may extend from the side surface of the base 1400. The projection 1430 may project from the upper surface of the base 1400. The projection 1430 may be formed on the upper surface of the base 1400. The projection 1430 may be disposed outside the sensor 1600. The projection 1430 may be formed around the outer periphery of the base 1400. The outer portion 1522 of the lower elastic member 1520 may be disposed on the upper surface of the projection 1430.

The base 1400 may have formed therein a groove 1440. The groove 1440 may be formed in the upper surface of the projection 1430. The groove 1440 may be formed in a corner of the base 1400. The groove 1440 may be depressed from the outer circumference of the base 1400. An adhesive may be applied to the groove 1440 so as to bond the lower elastic member 1520 to the base 1400. The description of the groove 1440 may be applied to the projection 216 of the base 210 shown in FIG. 1 with or without modification.

The base 1400 may include a step 1460. The step 1460 may be formed on the lateral side surface of the base 1400. The step 1460 may be formed on the outer circumferential surface of the base 1400. The step 1460 may be formed by the lower portion of the lateral side surface of the base, which projects from the lateral side surface. The lower end of the side plate 1120 of the cover 1100 may be disposed on the step 1460.

The base 1400 may include the protrusion 1470. The protrusion 1470 may be formed on the upper surface of the base 1400. The protrusion 1470 may be spaced apart from the protrusion 1420 and the projection 1430. The protrusion 1470 may be spaced apart from the lower stopper 1214 of the bobbin 1210 in the optical-axis direction. Due to movement of the bobbin 1210, the upper surface of the protrusion 1470 of the base may be brought into contact with the lower surface of the lower stopper 1214 of the bobbin 1210.

The lens moving apparatus 1010 may include a terminal 1450. The terminal 1450 may be considered to be a component independent of the base 1400. Alternatively, the terminal 1450 may be considered to be a component of the base 1400. The terminal 1450 may be disposed on the base 1400. The terminal 1450 may be conductively connected to the sensor 1600. The terminal 1450 may be formed at the base 1400 through insert injection molding. The terminal 1450 may be formed integrally with the base 1400.

The terminal 1450 may include a plurality of terminals. The terminals 1450 may include four terminals. The four terminals may be respectively connected to four terminals of the sensor 1600. The connection between the terminals 1450 and the terminals of the sensor 1600 may be implemented via solder or conductive epoxy.

Each of the terminals 1450 may include a first portion 1451 and a second portion 1452. The first portion 1451 may project downwards from the base 1400. The second portion 1452 may extend from the first portion 1451. The lower end of the first portion 1451 may be connected to the terminal of the printed circuit board 1050 via solder or conductive epoxy. The second portion 1452 may be conductively connected to the sensor 1600. At least a portion of the second portion 1452 of the terminal 1450 may extend through the base 1400.

The lens moving apparatus 1010 may include the elastic member 1500. The elastic member 1500 may connect the housing 1310 to the bobbin 1210. The elastic member 1500 may be coupled both to the housing 1310 and to the bobbin 1210. The elastic member 1500 may movably support the bobbin 1210. The elastic member 1500 may elastically support the bobbin 1210. At least a portion of the elastic member 1500 may be elastic. The elastic member 1500 may support movement of the bobbin 1210 during AF operation. Here, the elastic member 1500 may be an "AF support member".

The elastic member 1500 may include the upper elastic member 1510. The upper elastic member 1510 may be coupled both to the upper portion of the bobbin 1210 and to the upper portion of the housing 1310. The upper elastic member 1510 may be coupled to the upper surface of the bobbin 1210. The upper elastic member 1510 may be coupled to the upper surface of the housing 1310. The upper elastic member 1510 may be embodied as a leaf spring.

The upper elastic member 1510 may include an inner portion 1511. The inner portion 1511 may be coupled to the bobbin 1210. The inner portion 1511 may be coupled to the upper surface of the bobbin 1210. The inner portion 1511 may include a hole or a groove coupled to the protrusion of the bobbin 1210. The inner portion 1511 may be fixed to the bobbin 1210 using an adhesive.

The upper elastic member 1510 may include an outer portion 1512. The outer portion 1512 may be coupled to the housing 1310. The outer portion 1512 may be coupled to the upper surface of the housing 1310. The outer portion 1512 may have therein a hole or a groove, which is coupled to the protrusion 1313 of the housing 1310. The outer portion 1512 may be fixed to the housing 1310 using an adhesive.

The upper elastic member 1510 may include a connector 1513. The connector 1513 may connect the outer portion 1512 to the inner portion 1511. The connector 1513 may be elastic. Here, the connector 1513 may be referred to as an "elastic portion". The connector 1513 may include a portion, which is bent twice or more.

The damper 53A to 53D according to the embodiment shown in FIG. 1 may be applied to the embodiment shown in FIG. 18.

For example, the description of the damper and the upper elastic member shown in FIGS. 9 and 12 and FIGS. 14 to 17 may be applied to the embodiment shown in FIG. 18 with or without modification, and the description in FIGS. 10A, 10B, 11 and 13 may also be applied to the embodiment shown in FIG. 18 with or without modification.

The elastic member 1500 may include the lower elastic member 1520. The lower elastic member 1520 may connect the bobbin 1210 to the base 1400. A portion of the lower elastic member 1520 may be disposed on the upper surface of the projection 1430 of the base 1400. The lower elastic member 1520 may be coupled both to the lower portion of the bobbin 1210 and to the lower portion of the housing 1310. The lower elastic member 1520 may be coupled to the lower surface of the bobbin 1210. The lower elastic member 1520 may be coupled to the lower surface of the housing 1310. The lower elastic member 1520 may be embodied as a leaf spring. A portion of the lower elastic member 1520 may be fixed between the housing 1310 and the base 1400.

The lower elastic member 1520 may include a plurality of lower elastic units. The lower elastic member 1520 may include two lower elastic units. The lower elastic member 1520 may include first and second lower elastic units 1520-1 and 1520-2. The first and second lower elastic units 1520-1 and 1520-2 may be spaced apart from each other. The first and second lower elastic units 1520-1 and 1520-2 may be conductively connected to the coil 1220. The first and second lower elastic units 1520-1 and 1520-2 may be used as conductive lines, through which current is applied to the coil 1220.

The lower elastic member 1520 may include an inner portion 1521. The inner portion 1521 may be coupled to the bobbin 1210. The inner portion 1521 may be coupled to the lower surface of the bobbin 1210. The inner portion 1521 may have therein a hole or a groove, which is coupled to the protrusion of the bobbin 1210. The inner portion 1521 may be fixed to the bobbin 1210 using an adhesive.

The lower elastic member 1520 may include the outer portion 1522. The outer portion 1522 may be coupled to the housing 1310. The outer portion 1522 may be coupled to the lower surface of the housing 1310. The outer portion 1522 may have therein a hole or a groove, which is coupled to the protrusion of the housing 1310. The outer portion 1522 may be fixed to the housing 1310 using an adhesive.

The lower elastic member 1520 may include a connector 1523. The connector 1523 may connect the outer portion 1522 to the inner portion 1521. The connector 1523 may be elastic. Here, the connector 1523 may be referred to as an "elastic portion". The connector 1523 may include a portion, which is bent twice or more.

The lower elastic member 1520 may include a terminal portion 1524. The terminal portion 1524 may extend from the outer portion 1522. The terminal portion 1524 may be integrally formed with the outer portion 1522, and may be bent at the outer portion 1522 and then extend downwards. In a modification, the terminal portion 1524 may be formed separately from the lower elastic member 1520. The terminal portion 1524 may include two terminals. The terminal portion 1524 may be coupled to the printed circuit board 1050 via soldering. The terminal portion 1540 may be disposed on the lateral side surface of the base 1400. The terminal portion 1524 may be disposed in the groove in the base 1400. The terminal portion 1524 of the lower elastic member 1520 may be spaced apart from the terminal 1450. The terminal portion 1524 of the lower elastic member 1520 may be disposed between the plurality of terminals. Each of the two lower elastic units may include the terminal 1524.

The lens moving apparatus 1010 may include the sensor 1600. The sensor 1600 may be disposed on the base 1400. The sensor 1600 may detect the second magnet 1230. The sensor 1600 may be disposed on the upper surface of the base 1400. The sensor 1600 may be spaced apart from the housing 1310. The sensor 1600 may be spaced apart from the bobbin 1210. The sensor 1600 may overlap the second magnet 1230 in the optical-axis direction. The sensor 1600 may detect the position of the second magnet 1230 for AF feedback control. The sensor 1600 may be a Hall IC, a Hall element or a Hall sensor. The sensor 1600 may detect the magnetic force of the second magnet 1230.

The sensor 1600 may include a driver IC and a Hall IC configured to control the current applied to the coil 1220. In other words, the sensor 1600 may include a controller. Here, the terminal portion 1524 of the lower elastic member 1520 may not extend downwards from the base 1400, but may be conductively connected to the sensor 1600 in the lens moving apparatus.

In other words, the sensor 1600 may be composed only of a Hall element configured to detect the magnetic force of the second magnet 1230, or may include both a driver IC configured to apply current to the coil 1220 and a Hall element.

The sensor 1600 may be disposed between the protrusion 1420 and the projection 1430 of the base 1400. The upper surface of the sensor 1600 may be positioned at a level higher than the upper surface of the protrusion 1420 of the base 1400 but lower than the upper surface of the projection 1430 of the base 1400.

The sensor 1600 may include a plurality of terminals. The sensor 1600 may include four terminals. The four terminals of the sensor 1600 may include I2C communication terminals SDA and SCL and power terminals VSS and VDD. When the sensor 1600 includes a driver IC, two terminals for connection with the coil 1220 may further be provided.

In a modification, the sensor 1600 may be disposed on the lower surface of the base 1400. Here, the intensity of the magnetic force of the second magnet 1230, which is detected by the sensor 1600, may be reduced compared to the case in which the sensor 1600 is disposed on the upper surface of the base 1400. However, when space is easily ensured on the lower surface of the base 1400, the structure according to this modification is capable of minimizing the height of the lens moving apparatus.

In another modification, the sensor 1600 may be disposed on the printed circuit board 1050. In another modification, the sensor 1600 may be disposed on the printed circuit board 1050 below the base 1400 rather than at the base 1400. Here, the sensor 1600 may include a TMR sensor in order to obtain magnetic force having a higher magnitude.

The lens moving apparatus according to the embodiment may be applied to various fields, for example, those of camera modules or optical devices.

For example, the lens moving apparatus 100 according to the embodiment may be included in an optical instrument, which is designed to form the image of an object in a space using reflection, refraction, absorption, interference, diffraction or the like, which are characteristics of light, to extend eyesight, to record an image obtained through a lens or to reproduce the image, to perform optical measurement, or to propagate or transmit an image. For example, although the optical instrument according to the embodiment may be a mobile phone, cellular phone, smart phone, portable smart instrument, digital camera, laptop computer, digital broadcasting terminal, PDA (Personal Digital Assistant), PMP (Portable Multimedia Player), navigation device, or the like, the disclosure is not limited thereto. Furthermore, any device capable of taking images or photographs is possible.

Figure 28:
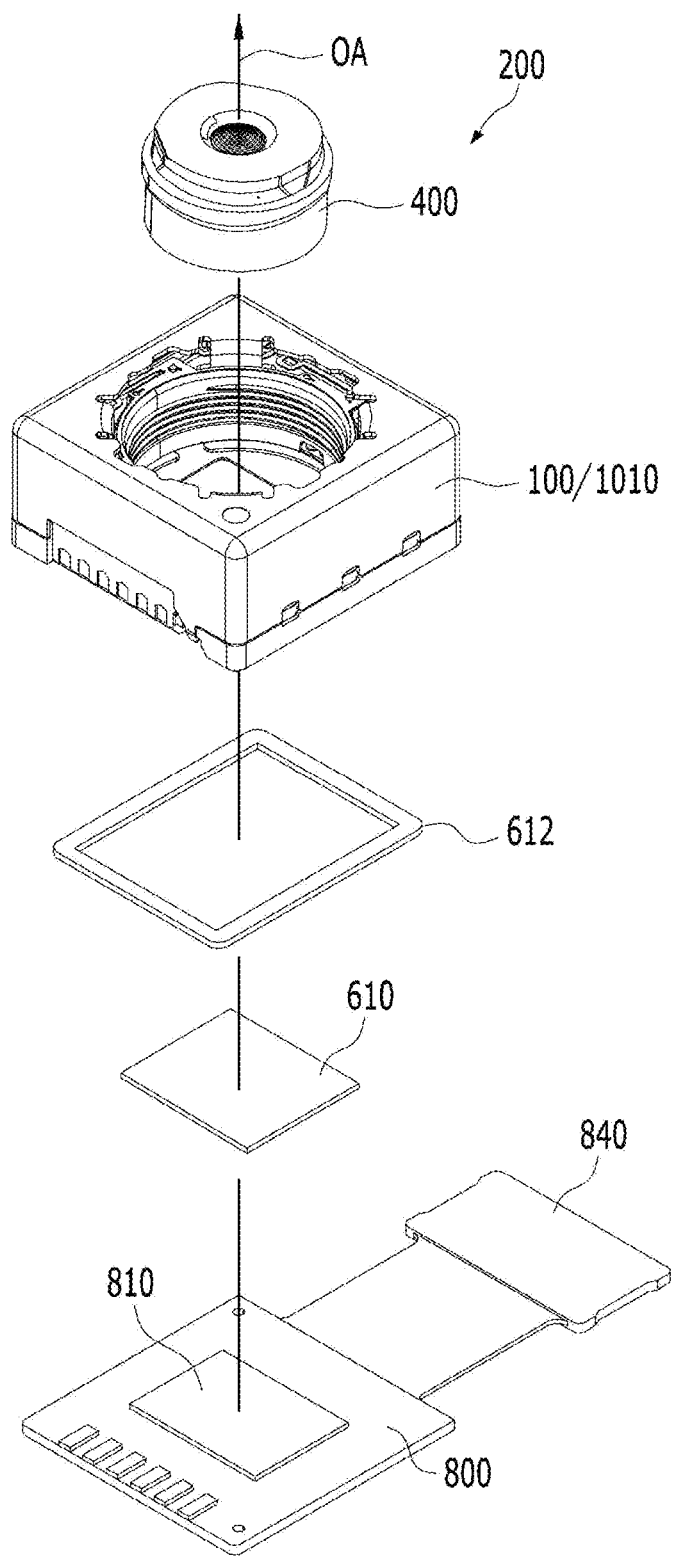
FIG. 28 is an exploded perspective view illustrating a camera module according to an embodiment.

FIG. 28 is an exploded perspective view illustrating a camera module 200 according to an embodiment.

Referring to FIG. 28, the camera module 200 may include a lens module 400, the lens moving apparatus 100 or 1010, an adhesive member 612, a filter 610, a circuit board 800, an image sensor 810, and a connector 840. The camera module may alternatively be referred to as a "camera device".

The lens module 400 may include a lens and/or a lens barrel, and may be mounted in the bobbin 110 of the lens moving apparatus 100.

For example, the lens module 400 may include one or more lenses and a lens barrel configured to accommodate the lenses. However, one component of the lens module is not limited to the lens barrel, and any component may be used, as long as it has a holder structure capable of supporting one or more lenses. The lens module may be coupled to the lens moving apparatus 100 and may be moved therewith.

For example, the lens module 400 may be coupled to the lens moving apparatus 100 or 1010 through threaded engagement. For example, the lens module 400 may be coupled to the lens moving apparatus 100 or 1010 by means of an adhesive (not shown). The light that has passed through the lens module 400 may be radiated to the image sensor 810 through the filter 610.

The adhesive member 612 may couple or attach the base 210 of the lens moving apparatus 100 to the circuit board 800. The adhesive member 612 may be, for example, epoxy, thermohardening adhesive, or ultraviolet hardening adhesive.

The filter 610 may serve to inhibit light within a specific frequency band that passes through the lens barrel 400 from being introduced into the image sensor 810. The filter 610 may be, for example, an infrared-light-blocking filter, without being limited thereto. Here, the filter 610 may be oriented parallel to the X-Y plane.

Here, the infrared-light-blocking filter may be made of a film material or a glass material. For example, the infrared-light-blocking filter may be manufactured by applying an infrared-light-blocking coating material to a plate-shaped optical filter such as a cover glass for protecting an imaging area.

The filter 610 may be disposed below the base 210 or 1400 of the lens moving apparatus 100 or 1010.

For example, the base 210 may be provided on the lower surface thereof with a mounting portion on which the filter 610 is mounted. In another embodiment, an additional sensor base, on which the filter 610 is mounted, may be provided.

The circuit board 800 may be disposed below the lens moving apparatus 100, and the image sensor 810 may be mounted on the circuit board 800. The image sensor 810 may receive an image included in the light introduced through the lens moving apparatus 100 or 1010, and may convert the received image into an electrical signal.

The image sensor 810 may be positioned such that the optical axis thereof is aligned with the optical axis of the lens module 400. Accordingly, the image sensor 810 may obtain the light that has passed through the lens module 400. The image sensor 810 may output the radiated light as an image. The image sensor 810 may be, for example, a CCD (charge coupled device), MOS (metal oxide semi-conductor), CPD or CID. However, the kind of the image sensor is not limited thereto.

The filter 610 and the image sensor 810 may be disposed so as to be spaced apart from each other in the state of facing each other in the first direction.

The connector 840 may be conductively connected to the circuit board 800, and may have a port that is intended to be conductively connected to an external device.

Figure 29:
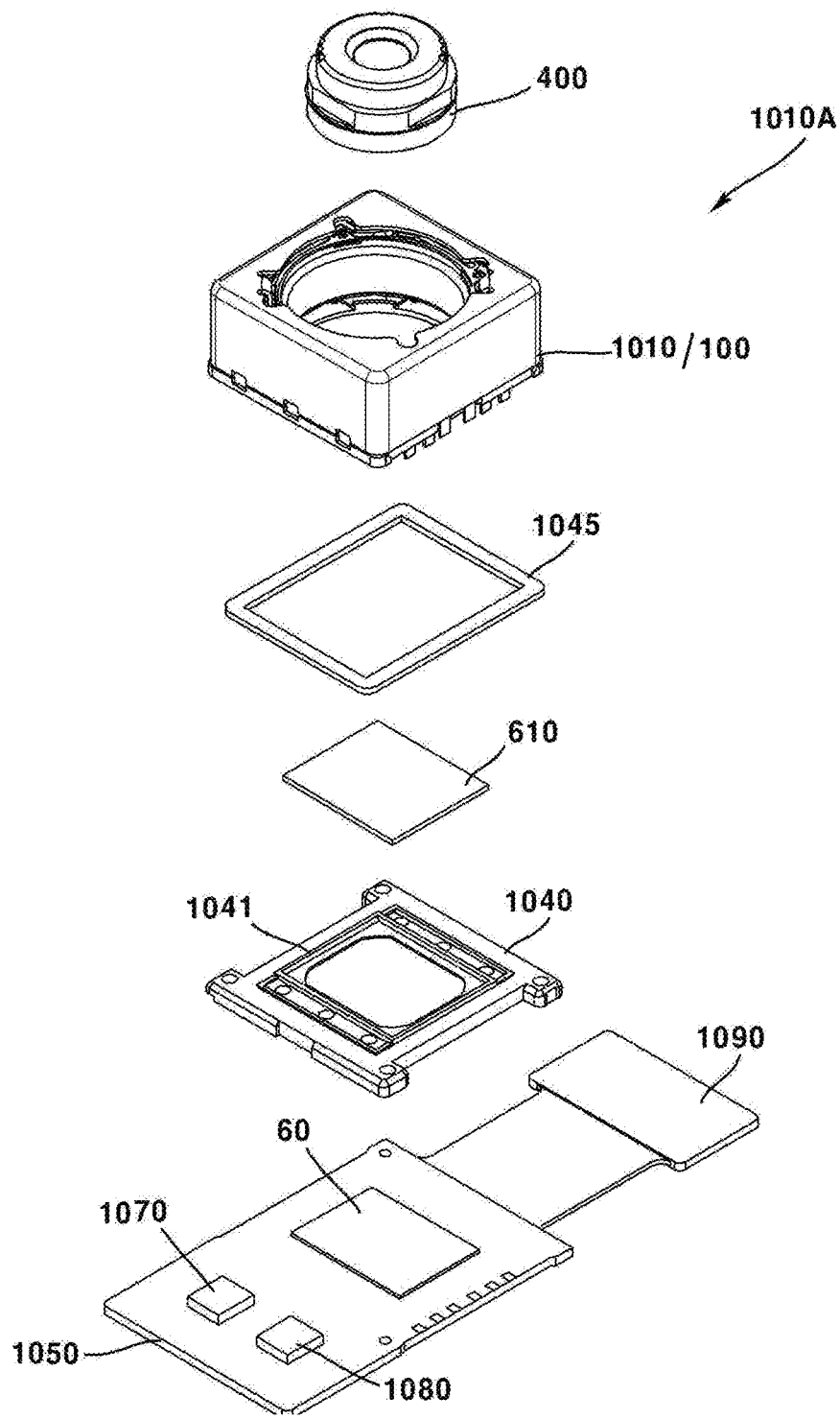
FIG. 29 is an exploded perspective view illustrating a camera module according to another embodiment.

FIG. 29 is an exploded perspective view of a camera module 1010A according to another embodiment.

Referring to FIG. 29, the camera module 1010A may further include a sensor base 1040 in addition to the camera module 200 shown in FIG. 28. The sensor base 1040 may alternatively be referred to as a "holder".

The sensor base 1040 may be disposed between the lens moving apparatus 100 or 1010 and the printed circuit board 1050. The sensor base 1040 may include a projection 1041 on which the filter 610 is disposed. A bore may be formed in the portion of the sensor base 1040 at which the filter 610 is disposed, so as to allow the light that has passed through the filter 610 to be incident on the image sensor 60. The camera module 1010A may include an adhesive member 1045 configured to couple or bond the base 210 or 1400 of the lens moving apparatus 100 or 1010 to the sensor base 1040. The adhesive member 1045 may further serve to inhibit contaminants from entering the lens moving apparatus 100 or 1010. The adhesive member 1045 may include at least one of epoxy, thermohardening adhesive, or ultraviolet hardening adhesive.

The camera module 1010A may include the printed circuit board (PCB) 1050. The PCB 1050 may be a component corresponding to the circuit board 800 shown in FIG. 28. Accordingly, the description of the circuit board 800 may be applied to the printed circuit board 1050 with or without modification, and the description of the printed circuit board 1050 may be applied to the circuit board 800 shown in FIG. 28.

The printed circuit board 1050 may be a substrate or a circuit board.

The lens moving apparatus 100 or 1010 may be disposed on the printed circuit board 1050. The sensor base 40 may be disposed between the printed circuit board 1050 and the lens moving apparatus 100 or 1010. The printed circuit board 1050 may be conductively connected to the lens moving apparatus 100 or 1010. The image sensor 60 may be disposed on the printed circuit board 1050.

The camera module 1010A may include the image sensor 810. The image sensor 810 may be conductively connected to the printed circuit board 1050. For example, the image sensor 810 may be coupled to the printed circuit board 1050 through surface-mounting technology (SMT). Alternatively, the image sensor 810 may be coupled to the printed circuit board 1050 through flip-chip technology. The image sensor 810 may be disposed so as to be aligned with the optical axis. In other words, the optical axis of the image sensor 810 may be aligned with the optical axis of the lens. The image sensor 810 may convert light incident on the effective image area thereof into an electric signal. The camera module 1010A may include a motion sensor 1070. The motion sensor 1070 may be surface-mounted on the printed circuit board 1050. The motion sensor 1070 may be conductively connected to a controller 1080 via a circuit pattern provided at the printed circuit board 1050. The motion sensor 1070 may output rotational angular velocity information of movement of the camera module 1010A. The motion sensor 1070 may include a biaxial or triaxial gyro sensor or an angular velocity sensor.

The camera module 1010A may include the controller 1080. The controller 1080 may be disposed on the printed circuit board 1050. The controller 1080 may be conductively connected to the first and second coils of the lens moving apparatus 100 or 1010. The controller 1080 may separately control the direction, intensity, amplitude, and the like of current supplied to the first and second coils. The controller 1080 may control the lens moving apparatus 100 or 1010 to perform an autofocus function and/or a handshaking correction function. Furthermore, the controller 1080 may perform autofocus feedback control and/or handshaking correction feedback control for the lens moving apparatus 100 or 1010. The camera module 1010A may include a connector 1090. The description of the connector 840 shown in FIG. 28 may be applied to the connector 1090 shown in FIG. 29 with or without modification.

Figure 30:
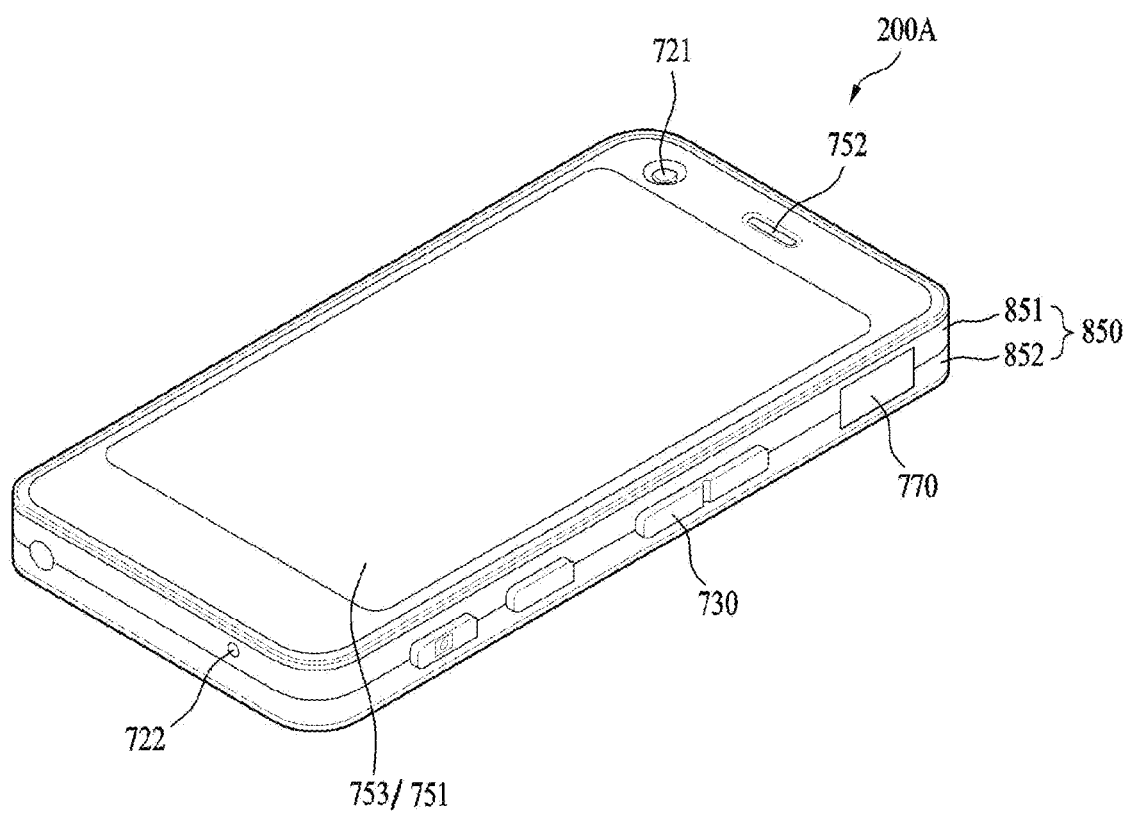
FIG. 30 is a perspective view of a portable terminal according to an embodiment.
Figure 31:
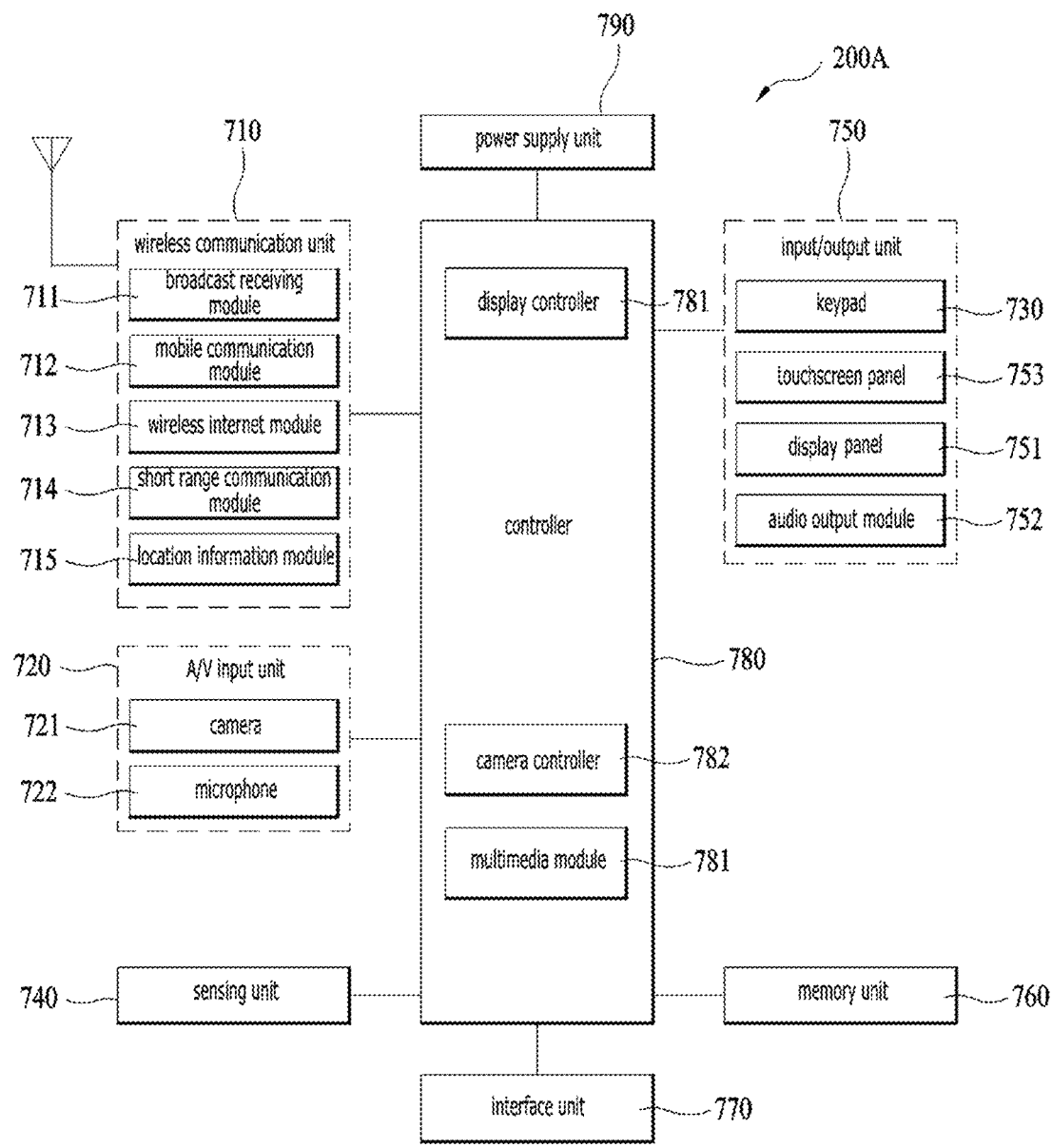
FIG. 31 is a view illustrating the configuration of the portable terminal shown in FIG. 30.

FIG. 30 is a perspective view illustrating an optical device 200A according to an embodiment. FIG. 31 is a view illustrating the configuration of the optical device 200A shown in FIG. 30.

Referring to FIGS. 30 and 31, the optical device 200A (for example, a portable terminal) may include a body 850. The body 850 illustrated in FIG. 30 has a bar shape, without being limited thereto, and may be any of various types, such as, for example, a slide type, a folder type, a swing type, or a swivel type, in which two or more sub-bodies are coupled so as to be movable relative to each other.

For example, the body 850 may include a case (e.g. a casing, housing, or cover) defining the external appearance of the terminal. For example, the body 850 may be divided into a front case 851 and a rear case 852. Various electronic components of the terminal may be accommodated in the space defined between the front case 851 and the rear case 852. A display panel 751 may be disposed on one surface of the body 850. A camera 721 may be disposed on at least one of one surface of the body 850 and the opposite surface of the body 850.

The optical device 200A may include a wireless communication unit 710.

The wireless communication unit 710 may include one or more modules, which enable wireless communication between the optical device 200A and a wireless communication system or between the optical device 200A and a network in which the optical device 200A is located. For example, the wireless communication unit 710 may include at least one of a broadcast-receiving module 711, a mobile communication module 712, a wireless Internet module 713, a short range communication module 714, and a location information module 715.

The optical device 200A may include an A/V input unit 720. The A/V input unit 720 serves to input audio signals or video signals, and may include a camera 721. Furthermore, the A/V input unit 720 may include a microphone 722.

The camera 721 may include the camera module 200 or 1010A according to the embodiment.

The optical device 200A may include a sensing unit 740. The sensing unit 740 may sense the current state of the optical device 200A, such as, for example, the opening or closing of the optical device 200A, the location of the optical device 200A, the presence of a user's touch, the orientation of the optical device 200A, or the acceleration/deceleration of the optical device 200A, and may generate a sensing signal to control the operation of the optical device 200A. When the optical device 200A is, for example, a slide-type cellular phone, the sensing unit 740 may sense whether the slide-type cellular phone is opened or closed. Furthermore, the sensing unit 740 may sense the supply of power from the power supply unit 790, coupling of the interface unit 770 to an external device, and the like.

The optical device 200A may include an input/output unit 750. The input/output unit 750 serves to generate, for example, visual, audible, or tactile input or output. The input/output unit 750 may generate input data to control the operation of the optical device 200A, and may display information processed in the optical device 200A.

For example, the input/output unit 750 may include at least one of a keypad unit 730, a touchscreen panel 753, a display panel 751, and a sound output module 752.

The keypad unit 730 may generate input data in response to input on a keypad.

The touchscreen panel 753 may convert variation in capacitance, caused by a user's touch on a specific region of a touchscreen, into electrical input signals.

The display panel 751 may output an image taken by the camera 721. The display module 751 may include a plurality of pixels, the color of which varies depending on the electrical signals applied thereto. For example, the display panel 751 may include at least one among a liquid crystal display, a thin-film transistor liquid crystal display, an organic light-emitting diode, a flexible display and a 3D display.

The touchscreen panel 753 and the display panel 751 may be separately or integrally constructed. For example, the touchscreen panel 753 may be of an add-on type or an embedded type. The add-on-type touchscreen panel may be attached in the form of a film to the outer surface of the display panel. The embedded-type touchscreen panel may be provided in the display panel. For example, the embedded type may be an in-cell type or an on-cell type.

The sound output module 752 may output audio data received from the wireless communication unit 710 in, for example, a call-signal reception mode, a call mode, a recording mode, a voice recognition mode, or a broadcast reception mode, or may output audio data stored in the memory unit 760.

The optical device 200A may include a memory unit 760. The memory unit 760 may temporarily store programs for the processing and control of the controller 780, and input/output data (for example, telephone numbers, messages, audio data, stationary images, moving images and the like). For example, the memory unit 760 may store images captured by the camera 721, for example, pictures or moving images.

The optical device 200A may include an interface unit 770. The interface unit 770 serves as a path through which the lens moving apparatus is connected to an external device connected to the optical device 200A. The interface unit 770 may receive power or data from the external component, and may transmit the same to respective constituent elements inside the optical device 200A, or may transmit data inside the optical device 200A to the external component. For example, the interface unit 770 may include at least one of a wired/wireless headset port, an external charger port, a wired/wireless data port, a memory card port, a port for connection to a device equipped with an identification module, an audio input/output (I/O) port, a video input/output (I/O) port, and an earphone port.

The optical device 200A may include a controller 780. The controller 780 may control the general operation of the optical device 200A. For example, the controller 780 may perform control and processing related to, for example, voice calls, data communication, and video calls.

The controller 780 may include a display controller 781 configured to control the display panel 751, which is the display of the optical device 200A. The controller 780 may include a camera controller 782 configured to control the camera module 200 or 1010A. The controller 780 may include a multimedia module 783 for multimedia playback. The multimedia module 783 may be embodied in the controller 780, or may be embodied separately from the controller 780. The controller 780 may perform a pattern recognition process capable of recognizing writing input or drawing input carried out on a touch screen as a character and an image, respectively.

The optical device 200A may include a power supply 790. The power supply unit 790 may supply power required to operate the respective constituent elements upon receiving external power or internal power under the control of the controller 780.

The features, configurations, effects and the like described above in the embodiments are included in at least one embodiment, but the invention is not limited only to the embodiments. In addition, the features, configurations, effects and the like exemplified in the respective embodiments may be combined with other embodiments or modified by those skilled in the art. Accordingly, content related to these combinations and modifications should be construed as falling within the scope of the disclosure.

INDUSTRIAL APPLICABILITY

The embodiments are applicable to a lens moving apparatus and a camera module and to an optical device each including the same, which are constructed such that the elastic force in the x-axis direction and the elastic force in the y-axis direction of an elastic member are asymmetrically generated so as to increase the difference between second and third resonant frequencies, thereby inhibiting or suppressing oscillation of an AF operation unit during AF operation.

The invention claimed is:

1. A lens moving apparatus comprising:
a housing;
a bobbin disposed inside the housing;
a coil disposed on the bobbin;
a sensing magnet disposed on the bobbin;
a magnet disposed on the housing;
an upper elastic member comprising an outer portion coupled to an upper portion of the housing, an inner portion coupled to an upper portion of the bobbin and a connector connecting the inner portion to the outer portion;
a position sensor configured to detect an intensity of magnetic field of the sensing magnet for sensing displacement of the bobbin; and
a damper disposed both on the connector of the upper elastic member and on the housing,
wherein the damper is spaced apart from the inner and outer portions of the upper elastic member and contacts the connector,
wherein the connector is disposed in first to fourth quadrants of a plane defined by a first axis and a second axis,
wherein the plane comprises first and second sides facing each other in a direction in parallel to the first axis, and third and fourth sides facing each other in a direction in parallel to the second axis, and
wherein the housing comprises a first side portion corresponding to the first side of the plane, a second side portion corresponding to the second side of the plane, a third side portion corresponding to the third side of the plane, and a fourth side portion corresponding to the fourth side of the plane,
wherein the first axis is perpendicular to an optical axis and extends through a center of the upper elastic member and is in parallel to a direction extending toward the second side portion of the housing from the first side portion of the housing, and the second axis is perpendicular to the first axis and extends through the center of the upper elastic member and is in parallel to a direction extending toward the fourth side portion of the housing from the third side portion of the housing, and the center of the upper elastic member is a spatial center of the upper elastic member when viewed from above,
wherein the sensing magnet is disposed at a side surface of the bobbin corresponding to the third side portion of the housing so as to be aligned with the second axis, and the position sensor is disposed to be aligned with the second axis, and
wherein the damper is disposed closer to the third and fourth sides than to the first and second sides.

2. The lens moving apparatus according to claim 1, wherein the damper is not symmetrical with respect to the first axis.

3. The lens moving apparatus according to claim 1, wherein the damper is not symmetrical with respect to the second axis.

4. The lens moving apparatus according to claim 1, wherein the housing comprises a protrusion corresponding to the connector, and the damper is disposed both on the protrusion and on the connector.

5. The lens moving apparatus according to claim 1, wherein the housing has an escape groove configured to inhibit spatial interference with the connector, at least a portion of the connector is disposed in the escape groove.

6. The lens moving apparatus according to claim 1, wherein the connector comprises a plurality of frame connectors, which are spaced apart from each other, and the damper comprises a plurality of dampers, which are disposed on the plurality of frame connectors.

7. The lens moving apparatus according to claim 6,
wherein the connector comprises a first frame connector, a second frame connector, a third frame connector, and a fourth frame connector.

8. The lens moving apparatus according to claim 6, wherein the housing comprises a plurality of protrusions corresponding to the plurality of frame connectors, respectively.

9. The lens moving apparatus according to claim 1, wherein the damper is disposed closer to the outer portion of the upper elastic member than to the inner portion of the upper elastic member.

10. A lens moving apparatus comprising:
a housing;
a bobbin disposed inside the housing;
a coil disposed on the bobbin;
a sensing magnet disposed on the bobbin;
a balancing magnet disposed on the bobbin;
a magnet disposed on the housing;
an upper elastic member comprising an outer portion coupled to an upper portion of the housing, an inner portion coupled to an upper portion of the bobbin, and a connector connecting the inner portion to the outer portion;
a position sensor configured to detect an intensity of magnetic field of the sensing magnet for sensing displacement of the bobbin; and
a damper disposed both on the connector of the upper elastic member and on the housing,
wherein the damper is spaced apart from the inner and outer portions of the upper elastic member and contacts the connector,
wherein the connector is disposed in first to fourth quadrants of a plane defined by a first axis and a second axis,
wherein the plane comprises:
first and second sides facing each other in a direction in parallel to the first axis; and
third and fourth sides facing each other in a direction in parallel to the second axis,
wherein the damper is disposed in at least one of the first to fourth quadrants of the plane,
wherein the housing comprises a first side portion corresponding to the first side of the plane, a second side portion corresponding to the second side of the plane, a third side portion corresponding to the third side of the plane, and a fourth side portion corresponding to the fourth side of the plane,
wherein the first axis is perpendicular to an optical axis and extends through a center of the upper elastic member and is in parallel to a direction extending toward the second side portion of the housing from the first side portion of the housing, and the second axis is perpendicular to the first axis and extends through the center of the upper elastic member and is in parallel to a direction extending toward the fourth side portion of the housing from the third side portion of the housing, and the center of the upper elastic member is a spatial center of the upper elastic member when viewed from above, wherein the sensing magnet is disposed at a side surface of the bobbin corresponding to the third side portion of the housing so as to be aligned with the second axis, and the position sensor is disposed to be aligned with the second axis, and wherein the balancing magnet is disposed at another side surface of the bobbin opposite to the first side surface of the bobbin on which the sensing magnet is disposed.

11. The lens moving apparatus according to claim 1, comprising a lower elastic member coupled with a lower portion of the housing and a lower portion of the bobbin.

12. The lens moving apparatus according to claim 1, wherein the coil comprises:
   a first coil unit disposed to be opposite to the first magnet unit; and
   a second coil unit disposed to be opposite to the second magnet unit.

13. The lens moving apparatus according to claim 1, comprising a base disposed under the housing.

14. The lens moving apparatus according to claim 13, wherein the position sensor is disposed on the base.

15. The lens moving apparatus according to claim 1, wherein the damper is disposed in at least one of the first to fourth quadrants of the plane.

16. The lens moving apparatus according to claim 1, wherein the magnet comprises:
   a first magnet unit disposed on the first side portion of the housing; and
   a second magnet unit disposed on the second side portion of the housing.

17. The lens moving apparatus according to claim 10, wherein the balancing magnet is disposed to be aligned with the second axis.

18. The lens moving apparatus according to claim 10, comprising a base disposed under the housing,
   wherein the position sensor is disposed on the base.

19. A camera module comprising:
   a lens;
   the lens moving apparatus according to claim 1; and
   an image sensor.

* * * * *